US012409654B2

(12) United States Patent
Tomimatsu

(10) Patent No.: US 12,409,654 B2
(45) Date of Patent: Sep. 9, 2025

(54) LIQUID EJECTING HEAD, SUPPORT BODY, AND LIQUID EJECTING APPARATUS

(71) Applicant: SEIKO EPSON CORPORATION, Tokyo (JP)

(72) Inventor: Shingo Tomimatsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 18/191,665

(22) Filed: Mar. 28, 2023

(65) Prior Publication Data

US 2023/0321980 A1 Oct. 12, 2023

(30) Foreign Application Priority Data

Mar. 29, 2022 (JP) ................................ 2022-053020

(51) Int. Cl.
*B41J 2/14* (2006.01)
*B41J 2/145* (2006.01)

(52) U.S. Cl.
CPC .................................... *B41J 2/145* (2013.01)

(58) Field of Classification Search
CPC ............... B41J 2/14; B41J 2/145; F16B 19/02
See application file for complete search history.

(56) References Cited

U.S. PATENT DOCUMENTS

2006/0182519 A1* 8/2006 Welzel .................... F16B 19/02 411/546
2011/0128323 A1* 6/2011 Saito ........................ B41J 2/155 347/40

FOREIGN PATENT DOCUMENTS

JP 2010-023378 A 2/2010

* cited by examiner

*Primary Examiner* — Jason S Uhlenhake
(74) *Attorney, Agent, or Firm* — WORKMAN NYDEGGER

(57) ABSTRACT

A liquid ejecting head includes a first-positioning-portion into which a first-positioning-pin of a support body is inserted. When a virtual cylinder inserted to a deepest position of the first-positioning-portion and having a maximum cross-sectional area when viewed in a first-direction which is a depth direction of the first-positioning-portion is defined as a first-virtual-cylinder, a side surface of the first-virtual-cylinder includes a first-region, a second-region, and a third-region disposed between the first-region and the second-region. The first-region contacts with the first-positioning-portion on a first-side which is one side in a second-direction orthogonal to the first-direction, and does not contact with the first-positioning-portion on a second-side which is the other side in the second-direction. The second-region does not contact with the first-positioning-portion on the first-side, and contacts with the first-positioning-portion on the second-side. The third-region does not contact with the first-positioning-portion on both the first-side and the second-side.

20 Claims, 22 Drawing Sheets

LIQUID EJECTING HEAD, SUPPORT BODY, AND LIQUID EJECTING APPARATUS

The present application is based on, and claims priority from JP Application Serial Number 2022-053020, filed Mar. 29, 2022, the disclosure of which is hereby incorporated by reference herein in its entirety.

BACKGROUND

1. Technical Field

The present disclosure relates to a liquid ejecting head, a support body, and a liquid ejecting apparatus.

2. Related Art

In the related art, a liquid ejecting apparatus typified by an ink jet type printer generally includes a liquid ejecting head that ejects a liquid such as an ink as a droplet.

For example, JP-A-2010-23378 discloses a liquid ejecting apparatus including a head (liquid ejecting head) having a positioning pin member (positioning pin) and an array base member (support body) having a positioning hole (positioning portion). The head is positioned with respect to the array base member by inserting the positioning pin member into the positioning hole.

SUMMARY

In a configuration in which the liquid ejecting head is positioned with respect to the support body by inserting the positioning pin into the positioning portion as disclosed in JP-A-2010-23378, it is desirable that the liquid ejecting head can be easily attached to and detached from the support body.

According to a preferred aspect of the present disclosure, in order to solve the above-described problems, there is provided a liquid ejecting head supported by a support body having a first positioning pin and ejecting a liquid. The liquid ejecting head includes a first positioning portion that positions the liquid ejecting head with respect to the support body by inserting the first positioning pin. When a virtual cylinder inserted to a deepest position of the first positioning portion and having a maximum cross-sectional area when viewed in a first direction which is a depth direction of the first positioning portion is defined as a first virtual cylinder, a side surface of the first virtual cylinder includes a first region, a second region, and a third region disposed between the first region and the second region, as three regions divided in the first direction. The first region comes into contact with the first positioning portion on a first side which is one side in a second direction orthogonal to the first direction, and does not come into contact with the first positioning portion on a second side which is the other side in the second direction, with respect to a first center line which is a center line of the first virtual cylinder. The second region does not come into contact with the first positioning portion on the first side, and comes into contact with the first positioning portion on the second side, with respect to the first center line. The third region does not come into contact with the first positioning portion on both the first side and the second side, with respect to the first center line.

According to a preferred aspect of the present disclosure, there is provided a support body for supporting a liquid ejecting head ejecting a liquid. The support body includes a first positioning portion that positions the liquid ejecting head with respect to the support body by inserting a first positioning pin provided in the liquid ejecting head. When a virtual cylinder inserted to a deepest position of the first positioning portion and having a maximum cross-sectional area when viewed in a first direction which is a depth direction of the first positioning portion is defined as a first virtual cylinder, a side surface of the first virtual cylinder includes a first region, a second region, and a third region disposed between the first region and the second region, as three regions divided in the first direction. The first region comes into contact with the first positioning portion on a first side which is one side in a second direction orthogonal to the first direction, and does not come into contact with the first positioning portion on a second side which is the other side in the second direction, with respect to a first center line which is a center line of the first virtual cylinder. The second region does not come into contact with the first positioning portion on the first side, and comes into contact with the first positioning portion on the second side, with respect to the first center line. The third region does not come into contact with the first positioning portion on both the first side and the second side, with respect to the first center line.

According to a preferred aspect of the present disclosure, there is provided a liquid ejecting apparatus including the liquid ejecting head according to the above-described aspect, and a support body including the first positioning pin.

According to another preferred aspect of the present disclosure, there is provided a liquid ejecting apparatus including the support body according to the above-described aspect, and a liquid ejecting head including the first positioning pin.

DESCRIPTION OF EXEMPLARY EMBODIMENTS

Figure 1:
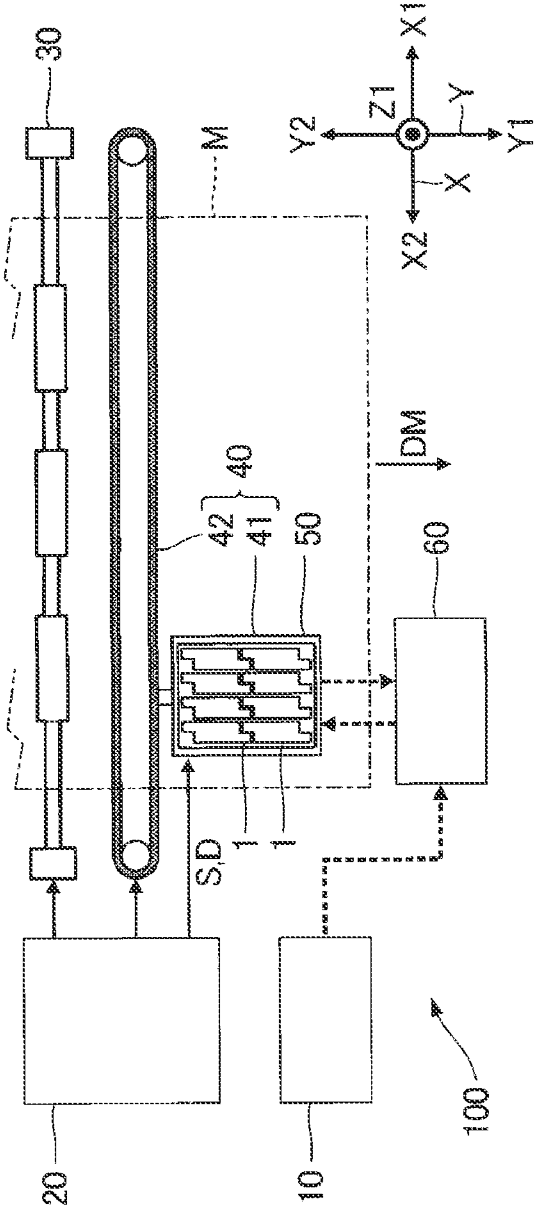
FIG. 1 is a schematic view illustrating a configuration example of a liquid ejecting apparatus according to a first embodiment.

Hereinafter, preferred embodiments according to the present disclosure will be described with reference to the accompanying drawings. In the drawings, dimensions or scales of respective parts are appropriately different from actual ones, and some portions are schematically illustrated to facilitate understanding. In addition, the scope of the present disclosure is not limited to the forms unless the present disclosure is particularly limited in the following description.

The following description will be given by appropriately using an X-axis, a Y-axis, and a Z-axis which intersect with each other. In addition, hereinafter, one direction along the X-axis is an X1 direction, and a direction opposite to the X1 direction is an X2 direction. Similarly, directions opposite to each other along the Y-axis are a Y1 direction and a Y2 direction. In addition, directions opposite to each other along the Z-axis are a Z1 direction and a Z2 direction.

Here, the Z1 direction or the Z2 direction is an example of a "first direction". The Y1 direction or the Y2 direction is an example of a "second direction". The Y2 direction is an example of a "first side which is one side in the second direction", and the Y1 direction is an example of a "second side which is the other side in the second direction". The X1 direction or the X2 direction is an example of a "third direction". Hereinafter, viewing in a direction along the Z-axis may be referred to as a "plan view" in some cases.

1. FIRST EMBODIMENT

1-1. Schematic Configuration of Liquid Ejecting Apparatus

FIG. 1 is a schematic view illustrating a configuration example of a liquid ejecting apparatus 100 according to a first embodiment. The liquid ejecting apparatus 100 is an ink jet type printing apparatus that ejects an ink which is an example of a liquid onto a medium M as a droplet. The medium M is typically a printing sheet. The medium M is not limited to the printing sheet, and may be a printing target having any desired material such as a resin film or a cloth.

The X-axis, Y-axis, and Z-axis in the first embodiment are coordinate axes of a local coordinate system based on a three-dimensionally disposed liquid ejecting head 1 (to be described later). Therefore, FIGS. 1 to 5, FIGS. 12 to 14, and FIG. 20 illustrate the coordinate axes of the local coordinate system based on the liquid ejecting head 1 in a state where the liquid ejecting head 1 is supported by a support body 51 (to be described later). Therefore, in the following description relating to the first embodiment, in some cases, configurations other than the liquid ejecting head 1 may be described by using the local coordinate system based on the liquid ejecting head 1 in the state where the liquid ejecting head 1 is supported by the support body 51.

As illustrated in FIG. 1, the liquid ejecting apparatus 100 has a liquid container 10, a control unit 20, a transport mechanism 30, a moving mechanism 40, a head module 50, and a circulation mechanism 60. Hereinafter, all of these will be briefly described in order with reference to FIG. 1.

The liquid container 10 stores an ink. For example, specific aspects of the liquid container 10 include a cartridge attachable to and detachable from the liquid ejecting apparatus 100, a bag-shaped ink pack formed of a flexible film, and an ink tank refillable with the ink.

Although not illustrated, the liquid container 10 of the present embodiment has a plurality of containers that store inks of mutually different types. The ink stored in the plurality of containers is not particularly limited, and for example, may include an aqueous ink in which a coloring material such as a dye or a pigment is dissolved in an aqueous solvent, a solvent-based ink in which the coloring material is dissolved in an organic solvent, and an ultraviolet ray curable ink.

For example, the control unit 20 includes a processing circuit such as a Central Processing Unit (CPU) or a Field Programmable Gate Array (FPGA) and a storage circuit such as a semiconductor memory, and controls an operation of each element of the liquid ejecting apparatus 100. The control unit 20 controls an ink ejection operation of the head module 50.

The transport mechanism 30 transports the medium M in a transport direction DM which is the Y1 direction under the control of the control unit 20. The moving mechanism 40 causes the head module 50 to reciprocate in the X1 direction and the X2 direction under the control of the control unit 20. In an example illustrated in FIG. 1, the moving mechanism 40 has a substantially box-shaped transport body 41 called a carriage for accommodating the head module 50, and a transport belt 42 to which the transport body 41 is fixed. In addition to the head module 50, the above-described liquid container 10 may be mounted on the transport body 41.

Under the control of the control unit 20, the head module 50 ejects the ink supplied from the liquid container 10 via the circulation mechanism 60 onto the medium M in the Z2 direction respectively from a plurality of nozzles. The ink is simultaneously ejected when the medium M is transported by the transport mechanism 30 and the head module 50 is caused to reciprocate by the moving mechanism 40. In this manner, an image is formed on a surface of the medium M by using the ink. The head module 50 has a plurality of liquid ejecting heads 1. Details of the liquid ejecting head 1 will be described later with reference to FIGS. 2 to 20.

In the example illustrated in FIG. 1, the liquid container 10 is joined to the head module 50 via the circulation mechanism 60. The circulation mechanism 60 is a mechanism for supplying the ink to the head module 50 and collecting the ink discharged from the head module 50 to resupply the ink to the head module 50.

1-2. Liquid Ejecting Head

Figure 2:
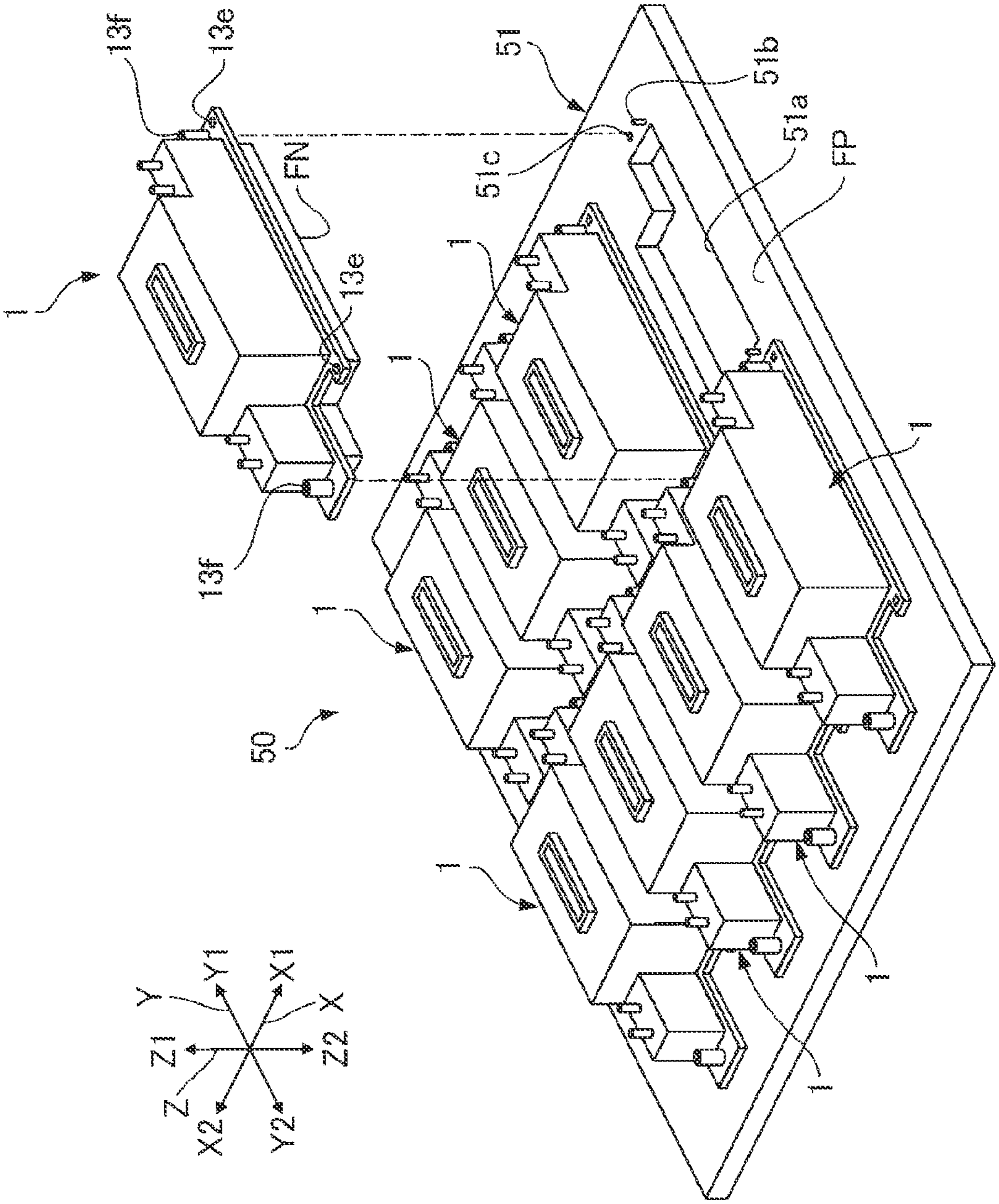
FIG. 2 is a perspective view of a head module having a liquid ejecting head according to the first embodiment.

FIG. 2 is a perspective view of the head module 50 having the liquid ejecting head 1 according to the first embodiment. As illustrated in FIG. 2, the head module 50 has the support body 51 and the plurality of liquid ejecting heads 1. The liquid ejecting head 1 is elongated in a direction along the Y-axis.

The support body 51 is a plate-shaped member that supports the plurality of liquid ejecting heads 1. The support body 51 is provided with a plurality of opening portions 51*a*, a plurality of positioning pins 51*b*, and a plurality of screw holes 51*c*. The support body 51 is fixed to the transport body 41 by fixing means (not illustrated). The support body 51 itself may be the transport body 41. In addition, a shape of the support body 51 may not be the plate shape, and for example, the shape may be a recessed portion shape capable of accommodating the plurality of liquid ejecting heads 1.

The opening portion 51*a* is a hole for inserting the liquid ejecting head 1 while an ejecting surface FN is directed in the Z2 direction, and penetrates the support body 51 in a thickness direction. In an example illustrated in FIG. 2, each opening portion 51*a* extends in a direction along the Y-axis, and two liquid ejecting heads 1 are inserted into one opening portion 51*a*.

The positioning pin 51*b* is a rod-shaped protrusion disposed near a peripheral edge of the opening portion 51*a* and protruding from a protruding surface FP which is a surface of the support body 51 directed in the Z1 direction. A shape of the positioning pin 51*b* in a plan view in the present embodiment is a circular shape, and is specifically a perfect circle. The positioning pin 51*b* is inserted into a positioning portion 13*e* provided in the liquid ejecting head 1 (to be described later) by press fitting. A shape of the positioning portion 13*e* may be a through-hole or a blind hole. In the present embodiment, the shape is the through-hole. In addition, the press fitting will be described in detail later. The press fitting is so-called tight fitting or intermediate fitting. In the example illustrated in FIG. 2, two positioning pins 51*b* are provided for one liquid ejecting head 1. Details of the positioning pin 51*b* will be described later with reference to FIG. 5.

The screw hole 51*c* is a female screw disposed near the peripheral edge of the opening portion 51*a* and provided on a surface of the support body 51 directed in the Z1 direction. A screw (not illustrated) is fitted to the screw hole 51*c*. The screw is inserted into a hole 13*f* of the liquid ejecting head 1 (to be described later), and fixes the liquid ejecting head 1 to the support body 51. In the example illustrated in FIG. 2, two screw holes 51*c* are provided for one liquid ejecting head 1.

As described above, the plurality of liquid ejecting heads 1 are attached to the support body 51. In the example illustrated in FIG. 2, the plurality of liquid ejecting heads 1 are disposed in a matrix along the X-axis and the Y-axis.

The number and the disposition of the liquid ejecting heads 1 included in the head module 50 are not limited to the example illustrated in FIG. 2, and may be set in any desired way. In addition, the shape of the support body 51 is not limited to the example illustrated in FIG. 2, and may be set in any desired way. In addition, the opening portion 51*a* may be provided for every one, three, or more liquid ejecting heads 1.

Figure 3:
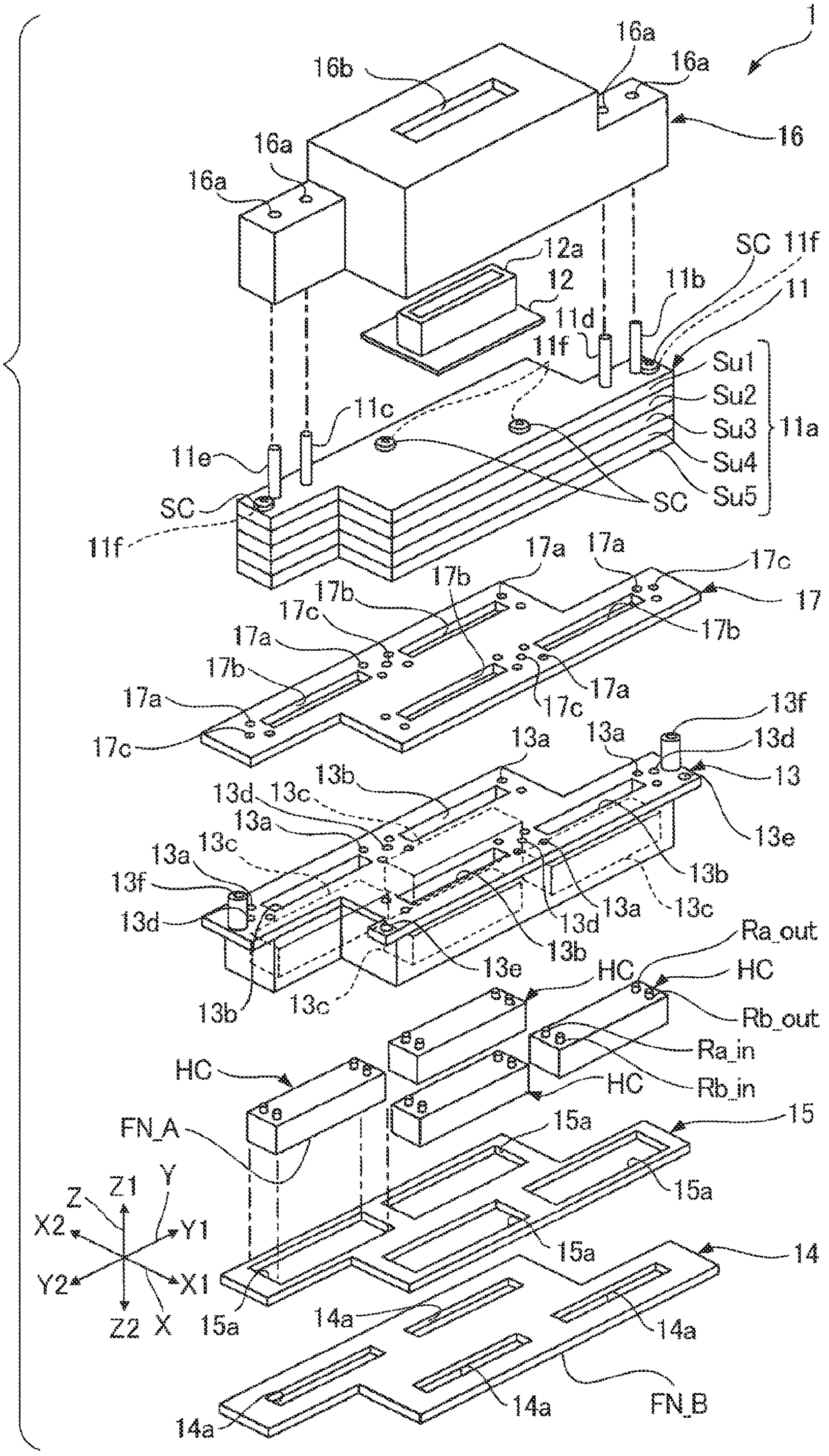
FIG. 3 is an exploded perspective view of the liquid ejecting head according to the first embodiment.

FIG. 3 is an exploded perspective view of the liquid ejecting head 1 according to the first embodiment. As illustrated in FIG. 3, the liquid ejecting head 1 has a flow path structure 11, a wiring substrate 12, a holder 13, four head chips HC, a fixing plate 14, a reinforcing plate 15, a cover 16, and a sealing member 17. All of these are disposed so that the cover 16, the wiring substrate 12, the flow path structure 11, the sealing member 17, the holder 13, the four head chips HC, the reinforcing plate 15, and the fixing plate 14 are aligned in this order in the Z2 direction. The holder 13 is an example of a "first member". Hereinafter, each part of the liquid ejecting head 1 will be sequentially described.

The flow path structure 11 is a structure internally provided with a flow path for supplying the ink from the circulation mechanism 60 to the four head chips HC. The flow path structure 11 has a flow path member 11*a* and four joining tubes 11*b* to 11*e*. Although not illustrated in FIG. 3, the flow path member 11*a* is provided with two supply flow paths for supplying the ink to the four head chips HC and two discharge flow paths for discharging the ink from the four head chips HC. The flow path member 11*a* has a plurality of substrates Su1 to Su5. The substrates are stacked in this order in the Z2 direction, and are bonded to each other with an adhesive, for example. The respective joining tubes 11*b* to 11*e* are tube bodies protruding from a surface of the flow path member 11*a* directed in the Z1 direction. The joining tubes 11*b* and 11*c* are respectively joined to the two supply flow paths described above, and the joining tubes 11*d* and 11*e* are respectively joined to the two discharge flow paths described above. In addition, the flow path member 11*a* is provided with a plurality of holes 11*f*. A screw SC is inserted into each hole 11*f*. The screw SC fixes the flow path member 11*a* to the holder 13.

The wiring substrate 12 is a mounting component for electrically joining the liquid ejecting head 1 to the control unit 20, and is disposed on the flow path structure 11. A connector 12*a* is installed on a surface of the wiring substrate 12 directed in the Z1 direction. The connector 12*a* is a joining component for electrically joining the liquid ejecting head 1 and the control unit 20. In addition, although not illustrated, wires joined to the four head chips HC are joined to the wiring substrate 12.

The holder 13 is a structure that accommodates and supports the four head chips HC. The holder 13 is provided with a plurality of holder flow paths 13*a*, a plurality of wiring holes 13*b*, a plurality of recessed portions 13*c*, a plurality of screw holes 13*d*, a plurality of holes 13*f*, and a plurality of positioning portions 13*e*.

For example, the holder 13 is formed of a resin material or a metal material. In the present embodiment, the positioning pin 51*b* is press-fitted to the positioning portion 13*e*. Therefore, the holder 13 and the positioning pin 51*b* are respectively formed of a metal material. For example, the metal material may include iron, titanium, aluminum, magnesium, or an alloy containing at least one of these metal elements. Examples of the alloy may include stainless steel, 42 alloy, and Inver. A material of the holder 13 and a material of the positioning pin 51*b* of the present embodiment are the same metal material, and are specifically stainless steel. The positioning pin 51*b* and the support body 51 may be integrally formed, or the positioning pin 51*b* and the support body 51 which are separated bodies may be integrally formed by bonding.

The plurality of holder flow paths 13*a* are respectively holes for causing the ink to flow between the head chip HC and the flow path structure 11. The holder flow paths 13*a* are provided to respectively correspond to an introduction port R_in and a discharge port R_out (to be described later). The plurality of wiring holes 13*b* are respectively holes through which wires (not illustrated) for joining the head chip HC and the wiring substrate 12 pass. The plurality of recessed portions 13*c* are respectively open in the Z2 direction, and are spaces in which the head chip HC is disposed. The plurality of screw holes 13*d* are respectively female screws fitted to the screws SC. The screw SC inserted into the hole 11*f* of the flow path member 11*a* is fastened to the screw hole 13*d*. In this manner, the flow path member 11*a* is pressed toward the holder 13. Screws (not illustrated) for fixing the liquid ejecting head 1 to the support body 51 described above are respectively inserted into the plurality of holes 13*f*. The positioning pins 51*b* of the support body 51 described above are respectively inserted into the plurality of positioning portions 13*e*. Details of the plurality of positioning portions 13*e* will be described later with reference to FIGS. 6 to 20.

Each head chip HC ejects the ink. Each head chip HC is provided with the introduction port R_in for introducing the ink and the discharge port R_out for discharging the ink. The introduction port R_in and the discharge port R_out are respectively bonded to the head chip HC and the holder 13 with an adhesive. In this manner, both ports are liquid-tightly joined to the corresponding holder flow path 13*a*.

Figure 4:
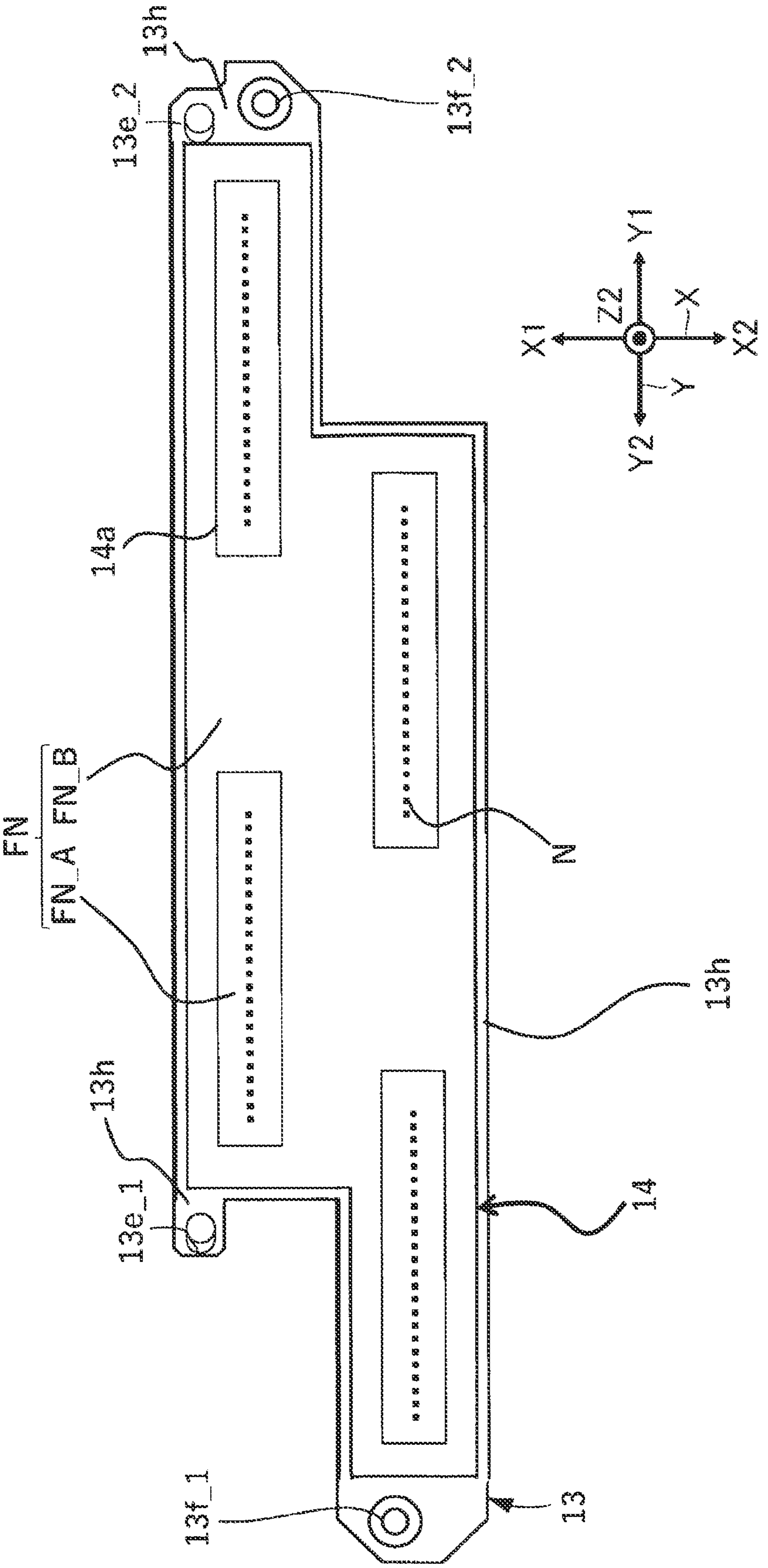
FIG. 4 is a plan view of the liquid ejecting head according to the first embodiment.

FIG. 4 is a plan view of the liquid ejecting head 1 when viewed in the Z1 direction according to the first embodiment. As illustrated in FIG. 4, each head chip HC has a nozzle forming surface FN_A on which a plurality of nozzles N are formed. The nozzle forming surface FN_A is a surface of the nozzle plate directed in the Z2 direction, on which the plurality of nozzles N are formed. The plurality of nozzles N form a nozzle row by being aligned in a direction along the Y-axis. Although not illustrated, for each nozzle N, each head chip HC has a piezoelectric element which is a driving element and a pressure chamber for accommodating the ink supplied from the introduction port R_in. Here, the piezoelectric element discharges the ink from the nozzle corresponding to the pressure chamber by changing a pressure of the ink inside the pressure chamber corresponding to the piezoelectric element. For example, the head chip HC can be obtained in such a manner that a plurality of substrates such as silicon substrates appropriately processed by etching are bonded with an adhesive. As the driving element for discharging the ink from the nozzle, a heater for heating the ink inside the pressure chamber may be used instead of the piezoelectric element.

The fixing plate 14 is a plate member for fixing the four head chips HC to the holder 13. Specifically, the fixing plate 14 is disposed in a state where four head chips HC are pinched between the fixing plate 14 and the holder 13, and is fixed to the holder 13 with an adhesive. For example, the fixing plate 14 is formed of a metal material. The fixing plate 14 is provided with a plurality of opening portions 14*a* for exposing the plurality of nozzles N respectively included in the four head chips HC. Here, a surface FN B of the fixing plate 14 directed in the Z2 direction and four nozzle forming surfaces FN_A form an ejecting surface FN of the liquid ejecting head 1 directed in the Z2 direction. That is, the ejecting surface FN is a surface having the plurality of nozzles N. The plurality of opening portions 14*a* are individually provided for each head chip HC.

The reinforcing plate 15 is a plate-shaped member disposed between the holder 13 and the fixing plate 14 and reinforcing the fixing plate 14. The reinforcing plate 15 is disposed on the fixing plate 14 in an overlapping manner, and is fixed to the fixing plate 14 with an adhesive. The reinforcing plate 15 is provided with a plurality of opening portions 15*a* in which the four head chips HC are disposed. For example, the reinforcing plate 15 is formed of a metal material.

The cover 16 is a box-shaped member that accommodates the flow path member 11*a* of the flow path structure 11 and the wiring substrate 12, and is formed of a resin material, for example. The cover 16 is provided with four through-holes 16*a* and an opening portion 16*b*. Any one of the joining tubes 11*b* to 11*e* is inserted into the four through-holes 16*a*. The connector 12*a* passes outward through the opening portion 16*b* from the inside of the cover 16.

The sealing member 17 is an elastic member for liquid-tightly joining the flow path of the flow path structure 11 and the holder flow path 13*a* of the holder 13. In an example illustrated in FIG. 3, the sealing member 17 has a sheet shape, and is provided with a plurality of ink holes 17*a*, a plurality of wiring holes 17*b*, and a plurality of holes 17*c*. The plurality of ink holes 17*a* are holes for causing the ink to flow between the flow path structure 11 and the holder 13, and are provided to correspond to the introduction port R_in and the discharge port R_out. The plurality of wiring holes 17*b* are respectively holes through which wires (not illustrated) for joining the head chip HC and the wiring substrate 12 pass. The plurality of holes 17*c* are respectively holes for inserting the screw SC.

1-3. Positioning of Liquid Ejecting Head with Respect to Support Body

Figure 5:
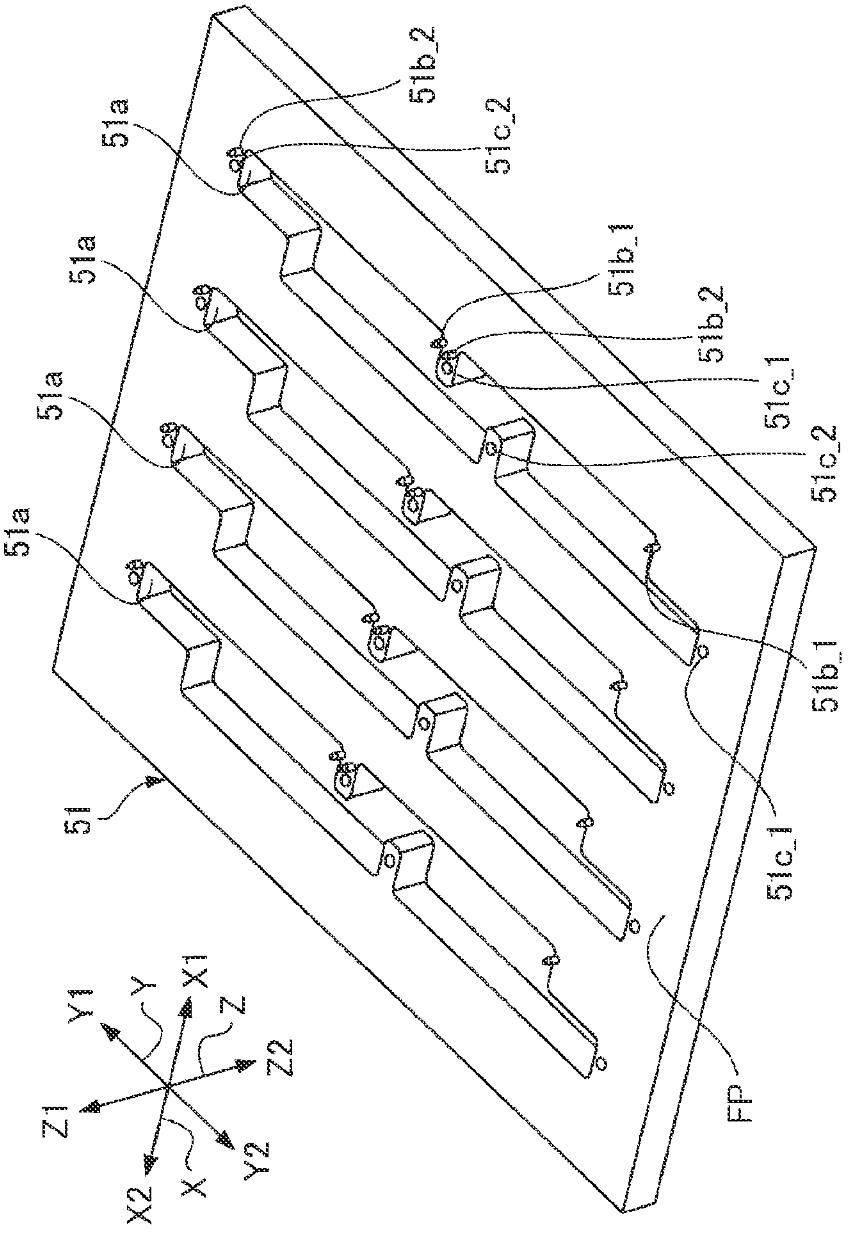
FIG. 5 is a perspective view of a support body according to the first embodiment.

FIG. 5 is a perspective view of the support body 51 according to the first embodiment. As illustrated in FIG. 5, in the support body 51, a plurality of first positioning pins 51*b*_1, a plurality of second positioning pins 51*b*_2, a plurality of screw holes 51*c*_1, and a plurality of screw holes 51*c*_2 are provided near the respective outer edges of the plurality of opening portions 51*a*.

The first positioning pin 51*b*_1 and the second positioning pin 51*b*_2 are respectively positioning pins 51*b* illustrated in FIG. 2 described above. The first positioning pin 51*b*_1 is inserted into the first positioning portion 13*e*_1 (to be described later) of the liquid ejecting head 1. On the other hand, the second positioning pin 51*b*_2 is inserted into the second positioning portion 13*e*_2 (to be described later) of the liquid ejecting head 1.

In an example illustrated in FIG. 5, the first positioning pin 51*b*_1 and the second positioning pin 51*b*_2 are respectively provided one by one for each one liquid ejecting head 1. In addition, the first positioning pin 51*b*_1 and the second positioning pin 51*b*_2 which correspond to one liquid ejecting head 1 are aligned in the direction along the Y-axis. More specifically, the first positioning pin 51*b*_1 is disposed in the Y2 direction with respect to the second positioning pin 51*b*_2.

The screw hole 51*c*_1 and the screw hole 51*c*_2 are respectively screw holes 51*c* illustrated in FIG. 2 described above. A screw corresponding to a hole 13*f*_1 (to be described later) of the liquid ejecting head 1 is fitted to the screw hole 51*c*_1. On the other hand, a screw corresponding to a hole 13*f*_2 (to be described later) of the liquid ejecting head 1 is fitted to the screw hole 51*c*_2.

In the example illustrated in FIG. 5, the screw hole 51*c*_1 and the screw hole 51*c*_2 are respectively provided one by one for each one liquid ejecting head 1. In addition, the screw holes 51*c*_1 and the screw holes 51*c*_2 which correspond to one liquid ejecting head 1 are aligned in the direction along the Y-axis. More specifically, the screw hole 51*c*_1 is disposed in the Y2 direction with respect to the screw hole 51*c*_2. Here, in the positioning pin 51*b* and the screw hole 51*c* which correspond to one liquid ejecting head 1, the first positioning pin 51*b*_1 is located closer to the screw hole 51*c*_1 than the screw hole 51*c*_2, and the second positioning pin 51*b*_2 is located closer to the screw hole 51*c*_2 than the screw hole 51*c*_1.

Figure 6:
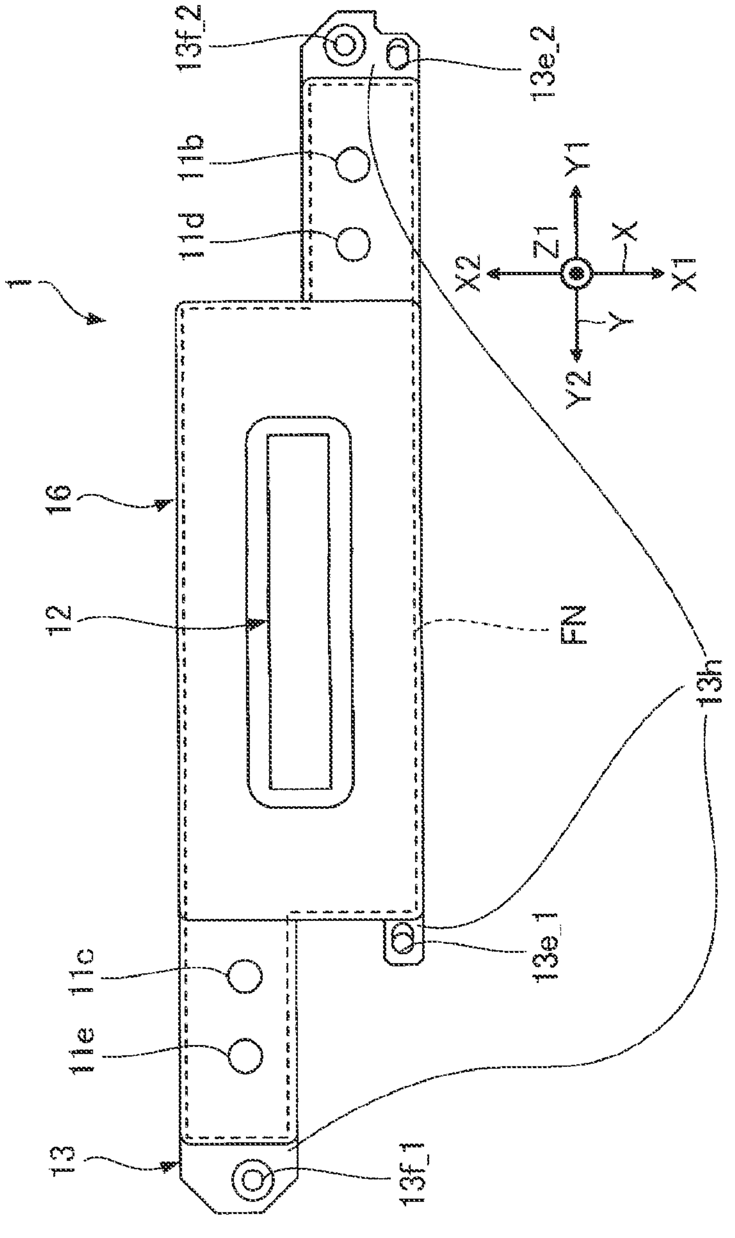
FIG. 6 is a plan view of the liquid ejecting head according to the first embodiment.

FIG. 6 is a plan view of the liquid ejecting head 1 when viewed in the Z2 direction according to the first embodiment. As illustrated in FIG. 6, in the liquid ejecting head 1, the holder 13 has a flange portion 13*h* protruding from the cover 16 when viewed in the Z2 direction. As illustrated in FIG. 4, a shape of the flange portion 13*h* in a plan view when viewed in the Z1 direction protrudes outward from an entire periphery of the side surface of the holder 13. A second surface F2 which is a surface of the flange portion 13*h* directed in the Z2 direction comes into contact with a protruding surface FP which is a surface of the support body 51 directed in the Z1 direction. The flange portion 13*h* is provided with a first positioning portion 13*e*_1, a second positioning portion 13*e*_2, a hole 13*f*_1, and a hole 13*f*_2.

The first positioning portion 13*e*_1 and the second positioning portion 13*e*_2 are respectively positioning portions 13*e* illustrated in FIG. 2 described above. The first positioning pin 51*b*_1 of the support body 51 described above is inserted into the first positioning portion 13*e*_1. On the other hand, the second positioning pin 51*b*_2 of the support body 51 described above is inserted into the second positioning portion 13*e*_2.

In an example illustrated in FIG. 6, the first positioning portion 13*e*_1 and the second positioning portion 13*e*_2 are respectively provided one by one for each one liquid ejecting head 1. In addition, the first positioning portion 13*e*_1 and the second positioning portion 13*e*_2 are aligned in the direction along the Y-axis. More specifically, the first positioning portion 13*e*_1 is disposed in the Y2 direction with respect to the second positioning portion 13*e*_2. In addition, in a plan view when viewed in the Z1 direction, at least a portion of the ejecting surface FN is interposed between the first positioning portion 13*e*_1 and the second positioning portion 13*e*_2.

The hole 13*f*_1 and the hole 13*f*_2 are respectively holes 13*f* illustrated in FIG. 2 described above. A screw fitted to the screw hole 51*c*_1 of the support body 51 described above is inserted into the hole 13*f*_1. On the other hand, a screw fitted to the screw hole 51*c*_2 of the support body 51 described above is inserted into the hole 13*f*_2.

In the example illustrated in FIG. 6, the hole 13*f*_1 and the hole 13*f*_2 are respectively provided one by one for each one liquid ejecting head 1. In addition, the hole 13*f*_1 and the hole 13*f*_2 are aligned in the direction along the Y-axis. More specifically, the hole 13*f*_1 is disposed in the Y2 direction with respect to the hole 13*f*_2. Here, the first positioning portion 13*e*_1 is located closer to the hole 13*f*_1 than the hole 13*f*_2. The second positioning portion 13*e*_2 is located closer to the hole 13*f*_2 than the hole 13*f*_1.

Figure 7:
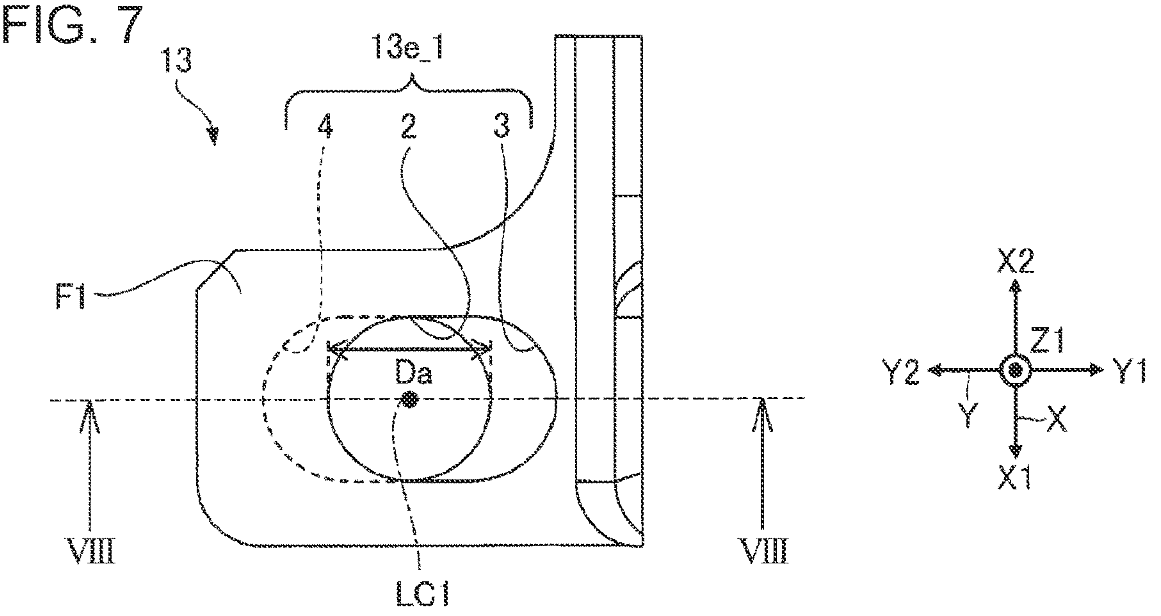
FIG. 7 is a view when a first positioning portion of the liquid ejecting head illustrated in FIG. 6 is viewed in a Z2 direction.
Figure 8:
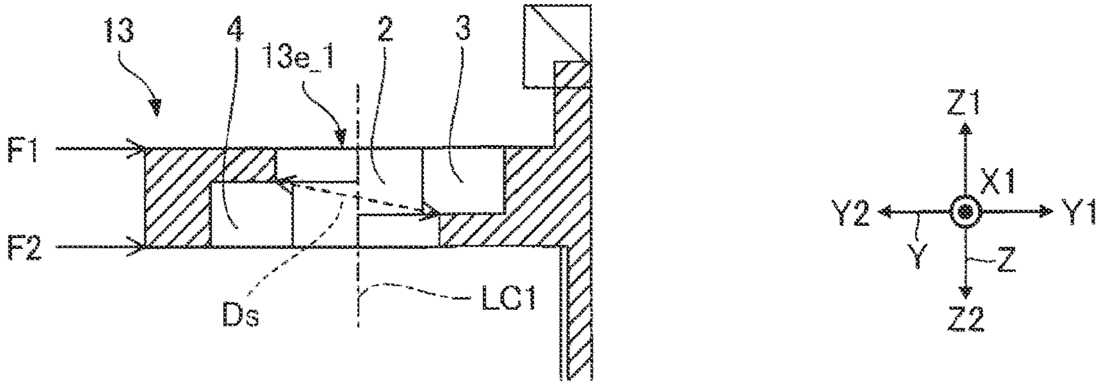
FIG. 8 is a sectional view taken along line VIII-VIII in FIG. 7.
Figure 9:
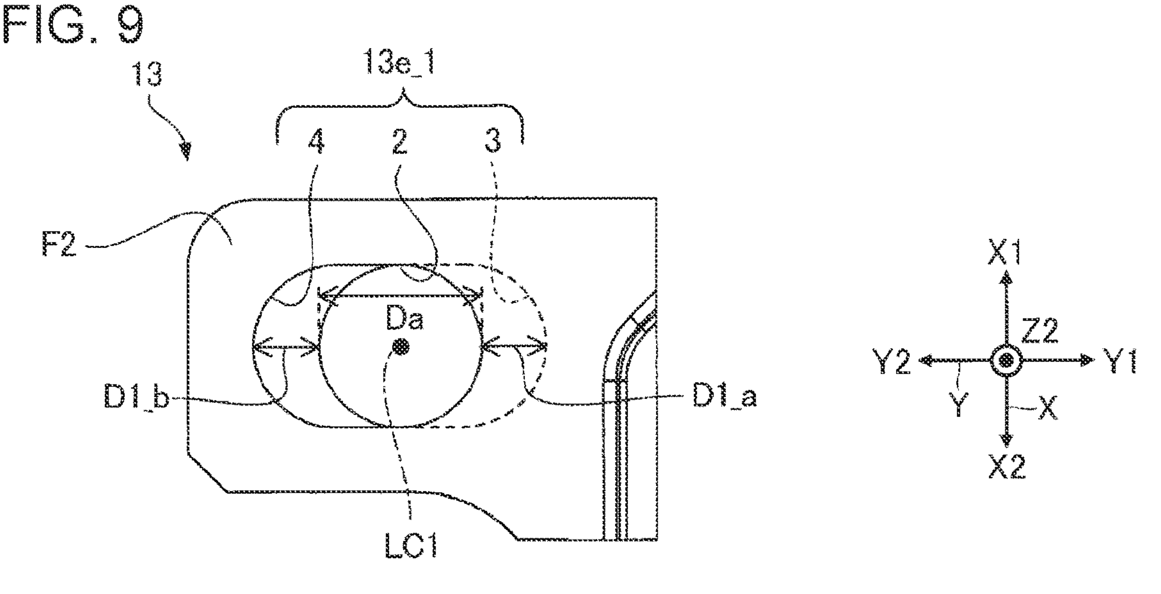
FIG. 9 is a view when the first positioning portion illustrated in FIG. 7 is viewed in a Z1 direction.

FIG. 7 is a view when the first positioning portion 13*e*_1 of the liquid ejecting head 1 illustrated in FIG. 6 is viewed in the Z2 direction. FIG. 8 is a sectional view taken along line VIII-VIII in FIG. 7. FIG. 9 is a view when the first positioning portion 13*e*_1 illustrated in FIG. 7 is viewed in the Z1 direction. As illustrated in FIGS. 7 to 9, the first positioning portion 13*e*_1 has a first through-hole 2, a first recessed portion 3, and a second recessed portion 4. The first through-hole 2 is disposed between the first recessed portion 3 and the second recessed portion 4 in the direction along the Y-axis. More specifically, the first recessed portion 3, the first through-hole 2, and the second recessed portion 4 are aligned in this order in the Y2 direction.

The first through-hole 2 is a hole penetrating the flange portion 13*h* of the holder 13. Here, the flange portion 13*h* has a first surface F1 which is a surface directed in the Z1 direction and a second surface F2 which is a surface directed the Z2 direction. The first through-hole 2 penetrates from the first surface F1 to the second surface F2 in the direction along the Z-axis. In the present embodiment, as illustrated in FIGS. 7 and 9, the first through-hole 2 forms a circular shape in a plan view. A shape of the first through-hole 2 in a plan view is not limited to the examples illustrated in FIGS. 7 and 9.

The first recessed portion 3 is provided on the first surface F1, and is adjacent to a portion of the first through-hole 2 on a side in the Y1 direction in a plan view. On the other hand, the second recessed portion 4 is provided on the second surface F2, and is adjacent to a portion of the first through-hole 2 on a side in the Y2 direction in a plan view.

Here, a total sum of a depth of the first recessed portion 3 and a depth of the second recessed portion 4 is greater than a distance between the first surface F1 and the second surface F2 (that is, a thickness of the flange portion 13*h* of the holder 13). In other words, the total sum of the length of the first contact portion CT1 (to be described later) in the direction along the Z-axis and the length of the second contact portion CT2 in the direction along the Z-axis is smaller than the distance between the first surface F1 and the second surface F2 (that is, the thickness of the flange portion 13*h* of the holder 13). A shape of the first recessed portion 3 in a plan view is not limited to the example illustrated in FIG. 7, and may be set in any desired way. In addition, a shape of the second recessed portion 4 in a plan view is not limited to the example illustrated in FIG. 9, and may be set in any desired way.

Figure 10:
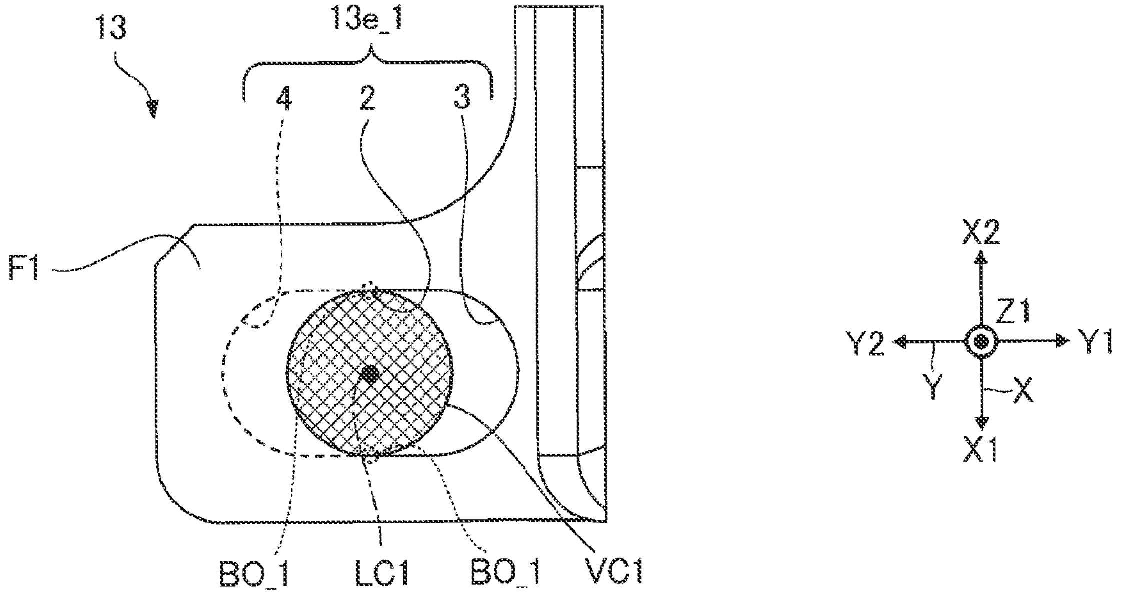
FIG. 10 is a plan view for describing a first virtual cylinder set in the first positioning portion illustrated in FIG. 7.
Figure 11:
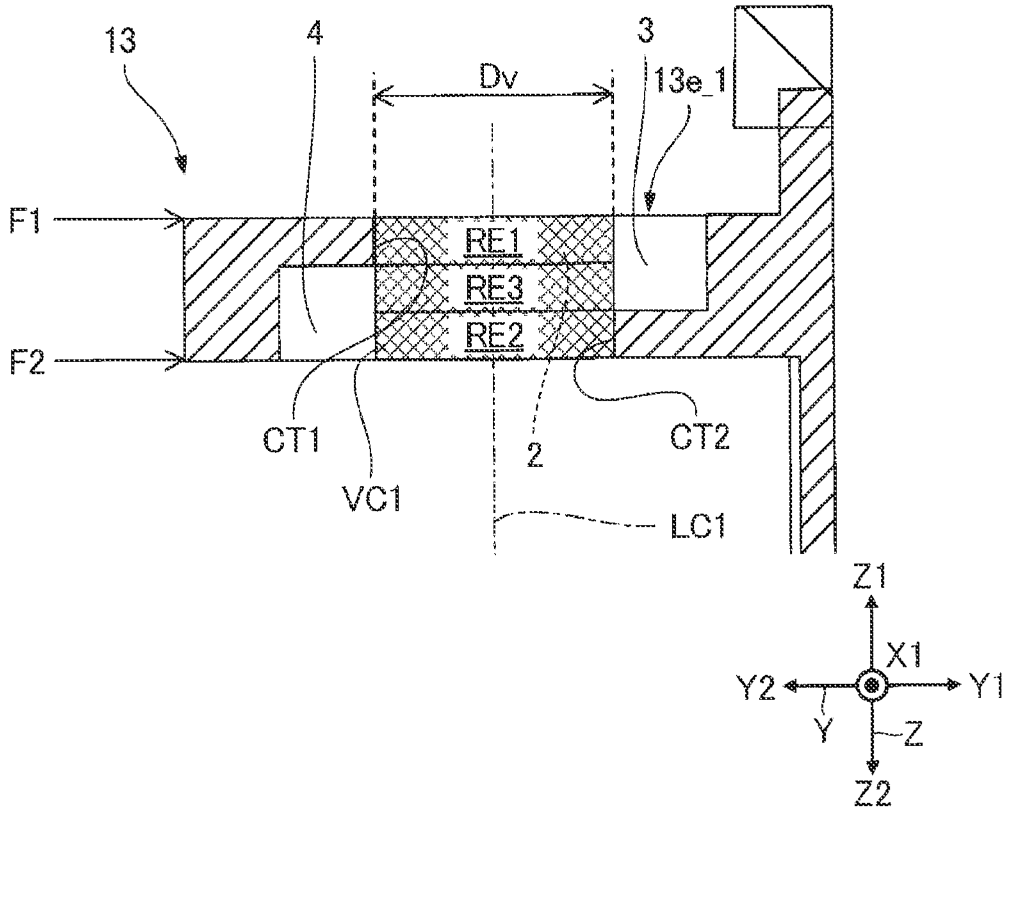
FIG. 11 is a sectional view for describing the first virtual cylinder set in the first positioning portion illustrated in FIG. 7.

FIG. 10 is a plan view for describing a first virtual cylinder VC1 set in the first positioning portion 13*e*_1 illustrated in FIG. 7. FIG. 11 is a sectional view for describing the first virtual cylinder VC1 set in the first positioning portion 13*e*_1 illustrated in FIG. 7. The first virtual cylinder VC1 is a virtual cylinder inserted to a deepest position of the first positioning portion 13*e*_1 and having a maximum cross-sectional area when viewed in a depth direction (direction along the Z-axis) of the first positioning portion 13*e*_1. The first virtual cylinder VC1 is not an oblique cylinder, and is a right cylinder. In an example illustrated in FIG. 10, a shape of the first virtual cylinder VC1 in a plan view is a perfect circle. That is, a bottom surface of the first virtual cylinder VC1 is a perfect circle. The shape of the first virtual cylinder VC1 in a plan view is defined based on the shape of the first positioning portion 13*e*_1 in a plan view. Therefore, the first virtual cylinder VC1 may have an elliptical shape in some cases. In this case, the first virtual cylinder VC1 may be an elliptical cylinder.

As illustrated in FIG. 11, a side surface of the first virtual cylinder VC1 includes a first region RE1, a second region RE2, and a third region RE3 disposed between the first region RE1 and the second region RE2, as three regions divided in the direction along the Z-axis. In the present embodiment, the second region RE2 is disposed in the Z2 direction which is a direction in which the ejecting surface FN faces the first region RE1 in the direction along the Z-axis.

The first region RE1 is a region which comes into contact with the first positioning portion 13*e*_1 on a side in the Y2 direction, and does not come into contact with the first positioning portion 13*e*_1 on a side in the Y1 direction, with respect to a first center line LC1 which is a center line of the first virtual cylinder VC1. The second region RE2 is a region which does not come into contact with the first positioning portion 13*e*_1 on the side in the Y2 direction, and comes into contact with the first positioning portion 13*e*_1 on the side in the Y1 direction, with respect to the first center line LC1. The third region RE3 is a region which does not come into contact with the first positioning portion 13*e*_1 on both sides in the Y2 direction and the Y1 direction, with respect to the first center line LC1. The first center line LC1 is a straight line passing through the center of the bottom surface of the first virtual cylinder VC1 and extending in the direction along the Z-axis.

Here, the first recessed portion 3 is adjacent to a portion of the first region RE1 on the side in the Y1 direction with respect to the first center line LC1. The second recessed portion 4 is adjacent to a portion of the second region RE2 on the side in the Y2 direction with respect to the first center line LC1. The first recessed portion 3 and the second recessed portion 4 are respectively adjacent to the third region RE3. The first virtual cylinder VC1 extends from the first surface F1 to the second surface F2 along the first through-hole 2. The first virtual cylinder VC1 of the present embodiment extends from one end to the other end of the first through-hole 2 in the direction along the Z-axis, and corresponds to a shape of the first through-hole 2. That is, the deepest position of the first positioning portion 13*e*_1 is an end portion of the first through-hole 2 in the Z1 direction (that is, a position of the first surface F1 on the Z-axis), when the first virtual cylinder VC1 is inserted in the Z1 direction from an opening of the first positioning portion 13*e*_1 formed on the second surface F2, and is an end portion of the first through-hole 2 in the Z2 direction (that is, a position of the second surface F2 on the Z-axis), when the first virtual cylinder VC1 is inserted in the Z2 direction from an opening of the first positioning portion 13*e*_1 formed on the first surface F1.

In an example illustrated in FIG. 11, the length of the first region RE1 along the Z-axis and the length of the second region RE2 along the Z-axis are equal to each other. The lengths may be different from each other. However, from a viewpoint of easily inserting and removing the first positioning pin 51*b*_1 into and from the first positioning portion 13*e*_1 while ensuring rigidity of the first positioning portion 13*e*_1 which is required for preventing damage to the first positioning portion 13*e*_1 due to a pressure acting on the first positioning portion 13*e*_1 when the first positioning pin 51*b*_1 is press-fitted, the lengths of the first region RE1 and the second region RE2 along the Z-axis are preferably 20% or more and 45% or less of the length of the first virtual cylinder VC1 in the direction along the Z-axis, more preferably 25% or more and 40% or less, and much more preferably 28% or more and 38% or less. In addition, the length of the third region RE3 along the Z-axis is preferably 10% or more and 60% or less of the length of the first virtual cylinder VC1 along the Z-axis, more preferably 20% or more and 50% or less, and much more preferably 24% or more and 44% or less.

In this way, the first positioning portion 13*e*_1 does not come into contact with the respective portions of the second region RE2 and the third region RE3 on the side in the Y2 direction with respect to the first center line LC1, comes into contact with the portion of the first region RE1 on the side in the Y1 direction with respect to the first center line LC1, does not come into contact with the respective portions of the first region RE1 and the third region RE3 on the side in the Y2 direction with respect to the first center line LC1, and comes into contact with the portion of the second region RE2 on the side in the Y1 direction with respect to the first center line LC1.

Therefore, the first positioning portion 13*e*_1 has a first contact portion CT1 which comes into contact with the portion of the first region RE1 on the side in the Y2 direction with respect to the first center line LC1, and a second contact portion CT2 which comes into contact with the portion of the second region RE2 on the side in the Y1 direction with respect to the first center line LC1. The first contact portion CT1 and the second contact portion CT2 of the present embodiment respectively and continuously extend in the direction along the Z-axis.

In addition, due to the presence of the third region RE3 as described above, in a cross section illustrated in FIG. 11, a shortest distance Ds (refer to FIG. 8) between the first contact portion CT1 and the second contact portion CT2 is equal to or greater than a maximum length Da (refer to FIG. 13) of the first positioning pin. 51*b*_1 in the direction along the Y-axis. The shortest distance Ds is preferably greater than the maximum length Da. A cross section illustrated in FIG. 11 is a cross section obtained by cutting the first positioning portion 13*e*_1*a* in a plane orthogonal to the Z-axis at a position where the first virtual cylinder VC1 has the maximum length in the direction along the Y-axis in a plan view, at positions in the direction along the X-axis.

In addition, the maximum length Da in the present embodiment is equal to or greater than a maximum dimension Dv of the first virtual cylinder VC1 in the direction along the Y-axis. The maximum dimension Dv corresponds to a diameter of a cross section of the first virtual cylinder VC1 which is perpendicular to the Z-axis direction. Furthermore, the shortest distance Ds is greater than the maximum dimension Dv. The shortest distance Ds, the maximum length Da, and the maximum dimension Dv represent the distance, the length or the dimension measured before the first positioning pin 51*b*_1 is inserted into the first positioning portion 13*e*_1, that is, in a state where the first positioning pin 51*b*_1 is inserted into the first positioning portion 13*e*_1.

Here, a fact that the positioning pin 51*b* is press-fitted to the positioning portion 13*e* indicates that the maximum length of the positioning pin 51*b* when viewed in the depth direction of the positioning portion 13*e* is equal to or greater than the diameter of the cross section perpendicular to the depth direction of a virtual regular cylinder inserted to the deepest position of the positioning portion 13*e* and having the maximum cross-sectional area when viewed in the depth direction of the positioning portion 13*e*. When the positioning portion 13*e* is press-fitted to the positioning pin 51*b*, the positioning portion 13*e* generally deforms outward with respect to the positioning pin 51*b* so that the positioning portion 13*e* can be inserted.

As illustrated in FIG. 10, the first positioning portion 13*e*_1 has two boundary portions BO_1 facing each other in the direction along the X-axis. In a plan view when viewed in the direction along the Z-axis, the boundary portion BO_1 is a boundary between a portion in which a thin portion of the first positioning portion 13*e*_1 defining the bottom surface of the second recessed portion 4 defines the first through-hole 2 and a portion in which a thin portion of the first positioning portion 13*e*_1 defining the bottom surface of the first recessed portion 3 defines the first through-hole 2, that is, a boundary between the first contact portion CT1 and the second contact portion CT2. The two boundary portions BO_1 respectively and linearly extend from the first surface F1 to the second surface F2 along the Z-axis direction. Therefore, a portion on the side in the Y1 direction and a portion on the side in the Y2 direction of the first virtual cylinder VC1 (in other words, each of the first region RE1, the second region RE2, and the third region RE3) with respect to the first center line LC1 do not respectively include the two boundary portions BO_1.

Figure 12:
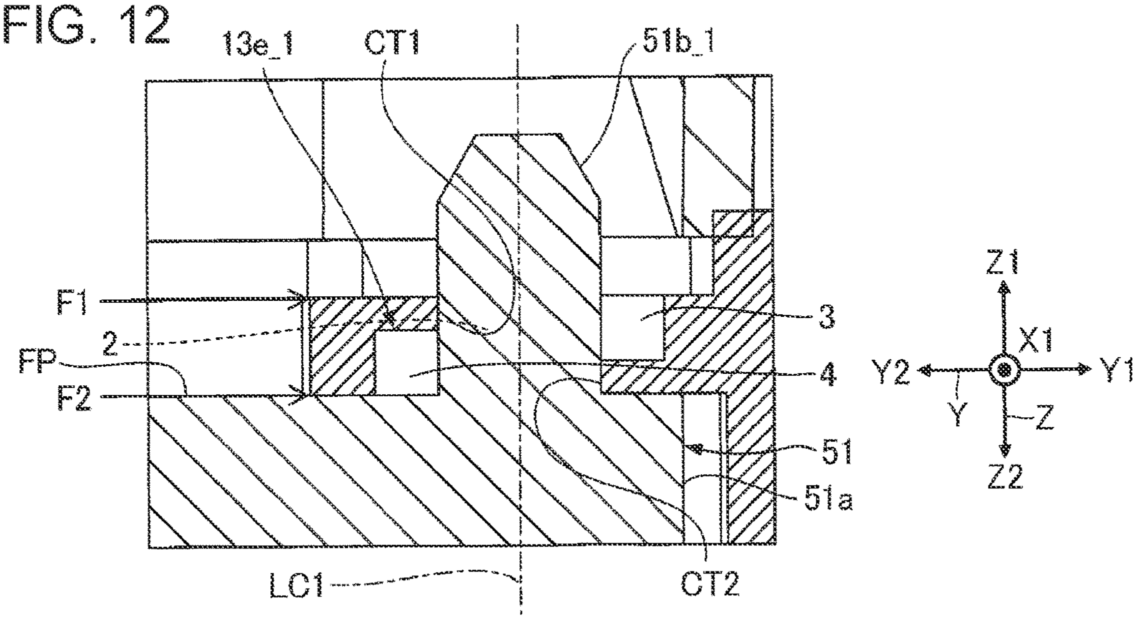
FIG. 12 is a view illustrating a state where a first positioning pin of the support body is inserted into the first positioning portion illustrated in FIG. 7.
Figure 13:
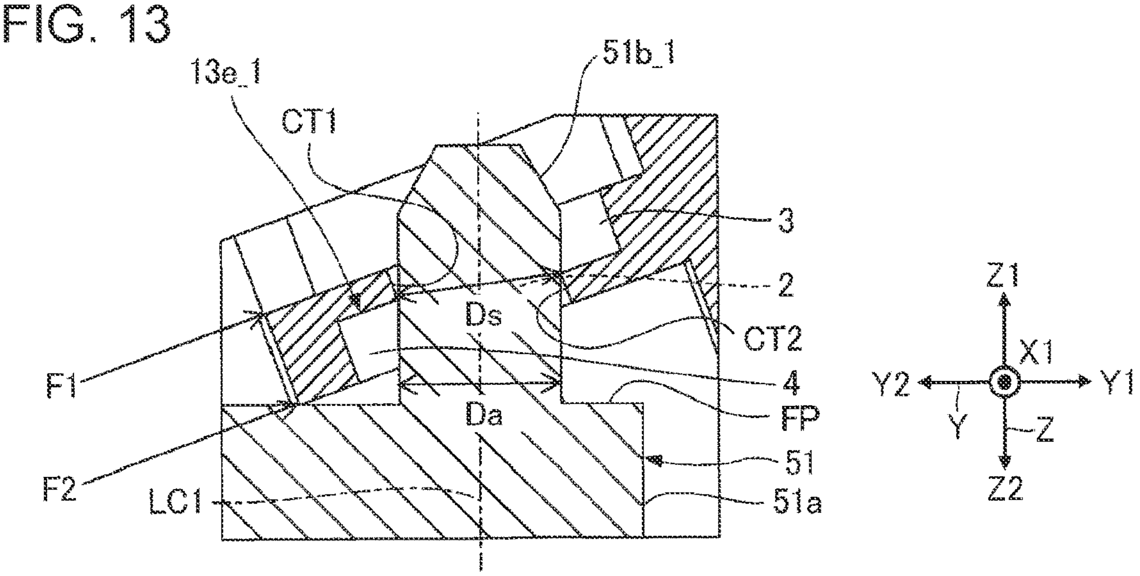
FIG. 13 is a view illustrating a state where the first positioning portion illustrated in FIG. 7 is inclined with respect to the first positioning pin of the support body.
Figure 14:
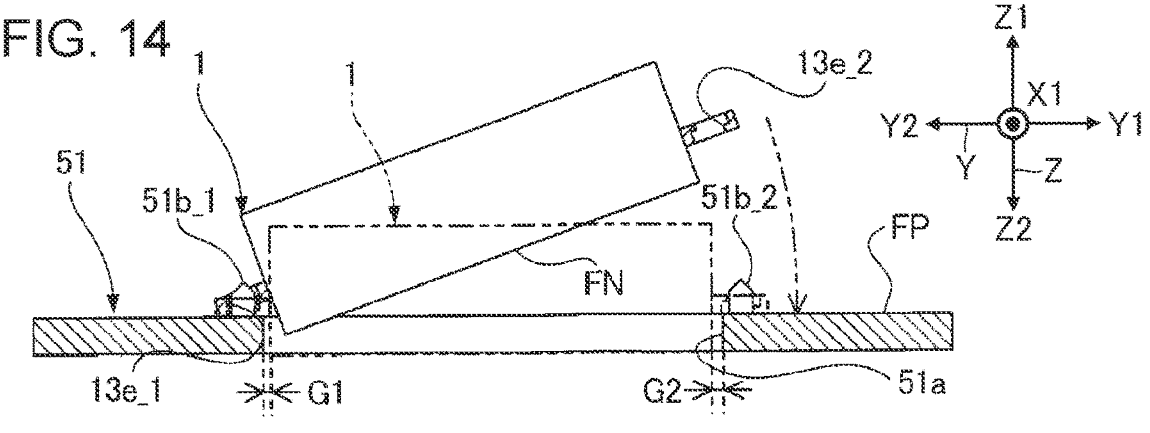
FIG. 14 is a schematic view for describing an example in which the liquid ejecting head according to the first embodiment is attached to and detached from the support body.

FIG. 12 is a view illustrating a state where the first positioning pin 51*b*_1 of the support body 51 is inserted into the first positioning portion 13*e*_1 illustrated in FIG. 7. FIG. 13 is a view illustrating a state where the first positioning portion 13*e*_1 illustrated in FIG. 7 is inclined with respect to the first positioning pin 51*b*_1 of the support body 51. FIG. 14 is a schematic view for describing an example in which the liquid ejecting head 1 according to the first embodiment is attached to and detached from the support body 51.

FIG. 12 illustrates a state where the first positioning pin 51*b*_1 is completely inserted into the first positioning portion 13*e*_1 when the side surface of the first positioning pin 51*b*_1 has a portion which coincides with the side surface of the first virtual cylinder VC1 described above. In this state, as illustrated in FIG. 12, the first contact portion CT1 and the second contact portion CT2 respectively come into contact with the side surface of the first positioning pin 51*b*_1. In addition, although not illustrated, the two boundary portions BO_1 also respectively come into contact with the side surface of the first positioning pin 51*b*_1. Through the contact, the first positioning portion 13*e*_1 is positioned with respect to the first positioning pin 51*b*_1. In the present embodiment, the first positioning pin 51*b*_1 and the first through-hole 2 are fitted to each other in this state. Therefore, a movement of the liquid ejecting head 1 with respect to the support body 51 is restricted in a plane orthogonal to the Z-axis by inserting the first positioning pin 51*b*_1 into the first positioning portion 13*e*_1.

In a state illustrated in FIG. 12, a gap is provided between the first positioning pin 51*b*_1 and the first positioning portion 13*e*_1 by the first recessed portion 3 and the second recessed portion 4. Therefore, as illustrated in FIG. 13, the first positioning pin 51*b*_1 can be inserted into the first positioning portion 13*e*_1 by inclining the first positioning portion 13*e*_1 in an extending direction of the first positioning pin 51*b*_1.

Therefore, as illustrated in FIG. 14, when the liquid ejecting head 1 is attached to the support body 51, the first positioning portion 13*e*_1 can be inserted into the first positioning pin 51*b*_1 before the second positioning portion 13*e*_2 is inserted into the second positioning pin 51*b*_2. In addition, when the liquid ejecting head 1 is detached from the support body 51, the second positioning portion 13*e*_2 can be detached from the second positioning pin 51*b*_2 before the first positioning portion 13*e*_1 is detached from the first positioning pin 51*b*_1. Hereinafter, a configuration example of the second positioning portion 13*e*_2 in which the liquid ejecting head 1 is easily attached to and detached from the support body 51 will be described.

Figure 15:
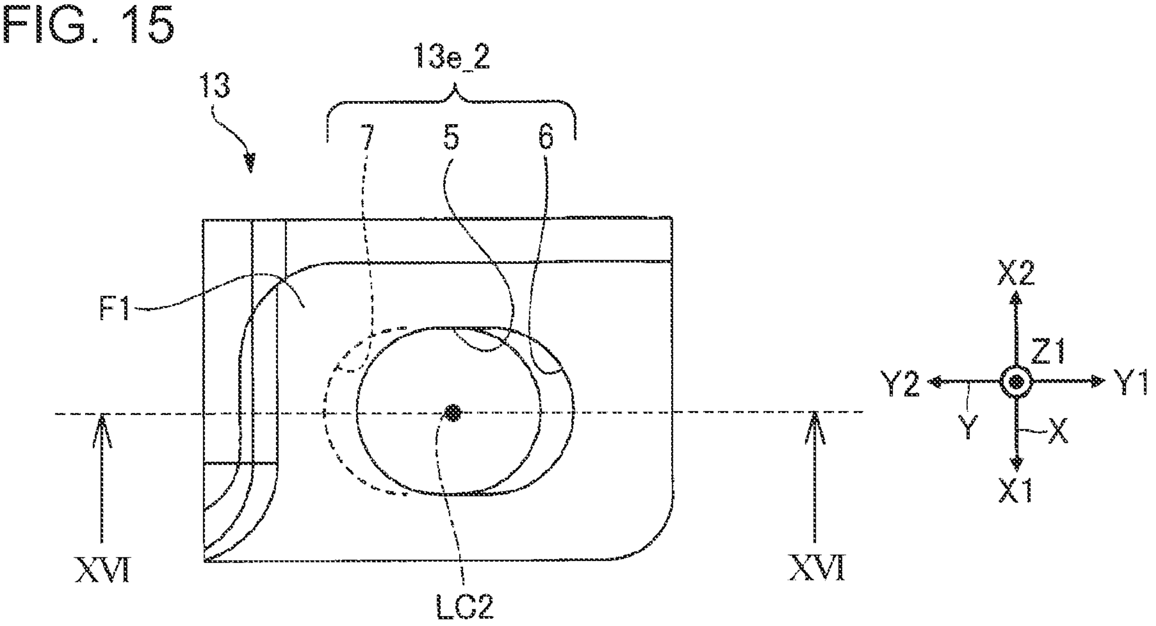
FIG. 15 is a view when a second positioning portion of the liquid ejecting head illustrated in FIG. 6 is viewed in a Z2 direction.
Figure 16:
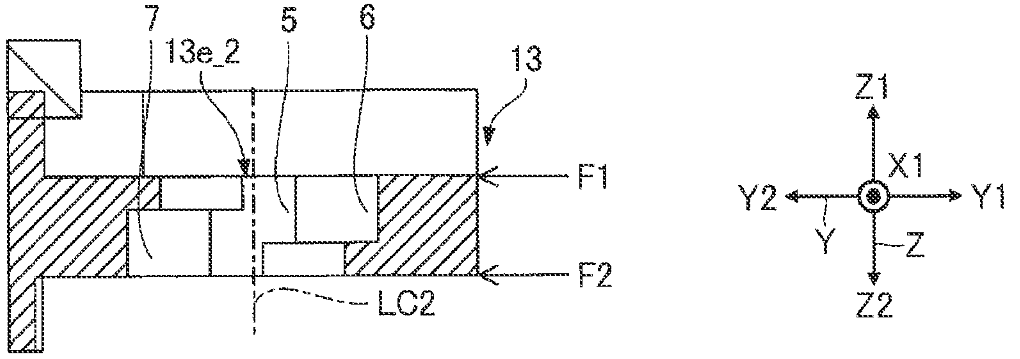
FIG. 16 is a sectional view taken along line XVI-XVI in FIG. 15.
Figure 17:
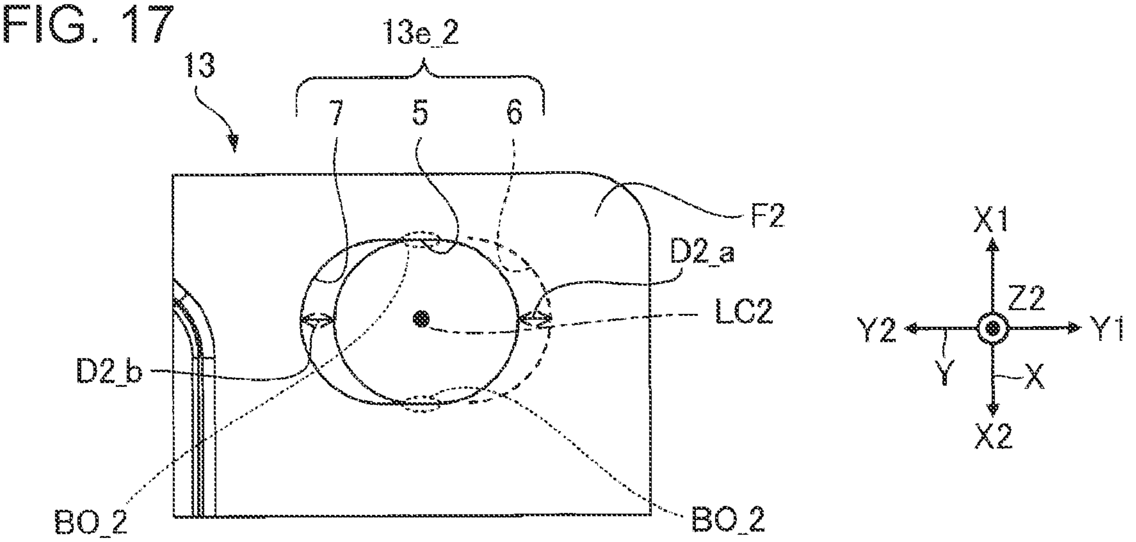
FIG. 17 is a view when the second positioning portion illustrated in FIG. 15 is viewed in the Z1 direction.

FIG. 15 is a view when the second positioning portion 13*e*_2 of the liquid ejecting head 1 illustrated in FIG. 6 is viewed in the Z2 direction. FIG. 16 is a sectional view taken along line XVI-XVI in FIG. 15. FIG. 17 is a view when the second positioning portion 13*e*_2 illustrated in FIG. 15 is viewed in the Z1 direction. As illustrated in FIGS. 15 to 17, the second positioning portion 13*e*_2 has a second through-hole 5, a third recessed portion 6, and a fourth recessed portion 7. The second through-hole 5 is disposed between the third recessed portion 6 and the fourth recessed portion 7 in the direction along the Y-axis. More specifically, the third recessed portion 6, the second through-hole 5, and the fourth recessed portion 7 are aligned in this order in the Y2 direction.

The second through-hole 5 is a hole penetrating the flange portion 13*h* of the holder 13. Here, the second through-hole 5 penetrates from the first surface F1 to the second surface F2 in the direction along the Z-axis. In the present embodiment, as illustrated in FIGS. 15 and 17, the second through-hole 5 has a substantially oval shape whose direction along the Y-axis is set as a longitudinal direction in a plan view. That is, the length of the second through-hole 5 in the direction along the Y-axis is longer than the length of the second through-hole 5 in the direction along the X-axis. Here, the length of the second through-hole 5 in the direction along the X-axis is equal to the length of the first through-hole 2 in the direction along the X-axis described above. In addition, the length of the second through-hole 5 in the direction along the Y-axis is longer than the length of the above-described first through-hole 2 in the direction along the Y-axis. In addition, the first positioning pin 51*b*_1 and the second positioning pin 51*b*_2 of the present embodiment have substantially the same shape. Therefore, even when the first positioning pin 51*b*_1 and the second positioning pin 51*b*_2 which correspond to one liquid ejecting head 1 illustrated in FIG. 5 are displaced in the Y-axis direction due to a manufacturing error, the direction of the second through-hole 5 along the Y-axis in a plan view is set as the longitudinal direction. Therefore, the manufacturing error can be absorbed. A shape of the second through-hole 5 in a plan view is not limited to the examples illustrated in FIGS. 15 and 17. A magnitude correlation of the dimensions of the first through-hole 2 and the second through-hole 5 in a plan view differs depending on a magnitude correlation of the dimensions of the first positioning pin 51*b*_1 and the second positioning pin 51*b*_2 in a plan view. The dimensions are not limited to the examples illustrated in FIGS. 15 and 17.

The third recessed portion 6 is provided on the first surface F1, and is adjacent to a portion of the second through-hole 5 on the side in the Y1 direction in a plan view. On the other hand, the fourth recessed portion 7 is provided on the second surface F2, and is adjacent to a portion of the second through-hole 5 on the side in the Y2 direction in a plan view.

Here, the total sum of the depth of the third recessed portion 6 and the depth of the fourth recessed portion 7 is greater than the distance between the first surface F1 and the second surface F2 (that is, the thickness of the flange portion 13*h* of the holder 13). In other words, the total sum of the length of the third contact portion CT3 (to be described later) in the direction along the Z-axis and the length of the fourth contact portion CT4 in the direction along the Z-axis is smaller than the distance between the first surface F1 and the second surface F2 (that is, the thickness of the flange portion 13*h* of the holder 13). A shape of the third recessed portion 6 in a plan view is not limited to the example illustrated in FIG. 15, and may be set in any desired way. In addition, a shape of the fourth recessed portion 7 in a plan view is not limited to the example illustrated in FIG. 17, and may be set in any desired way. In addition, the depths of the third recessed portion 6 and the fourth recessed portion 7 are not particularly limited, and may be set in any desired way. When the depths of the first recessed portion 3 and the third recessed portion 6 are equal to each other, and the depths of the second recessed portion 4 and the fourth recessed portion 7 are equal to each other, there is an advantage in that the holder 13 can be more simply manufactured and designed.

Figure 18:
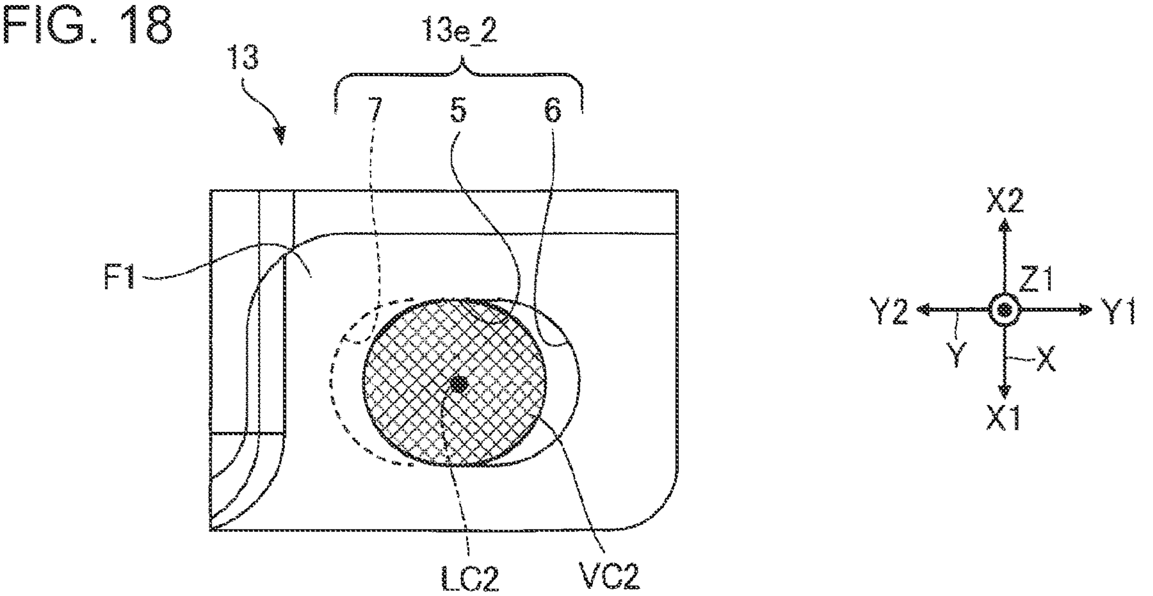
FIG. 18 is a plan view for describing a second virtual cylinder set in the second positioning portion illustrated in FIG. 15.
Figure 19:
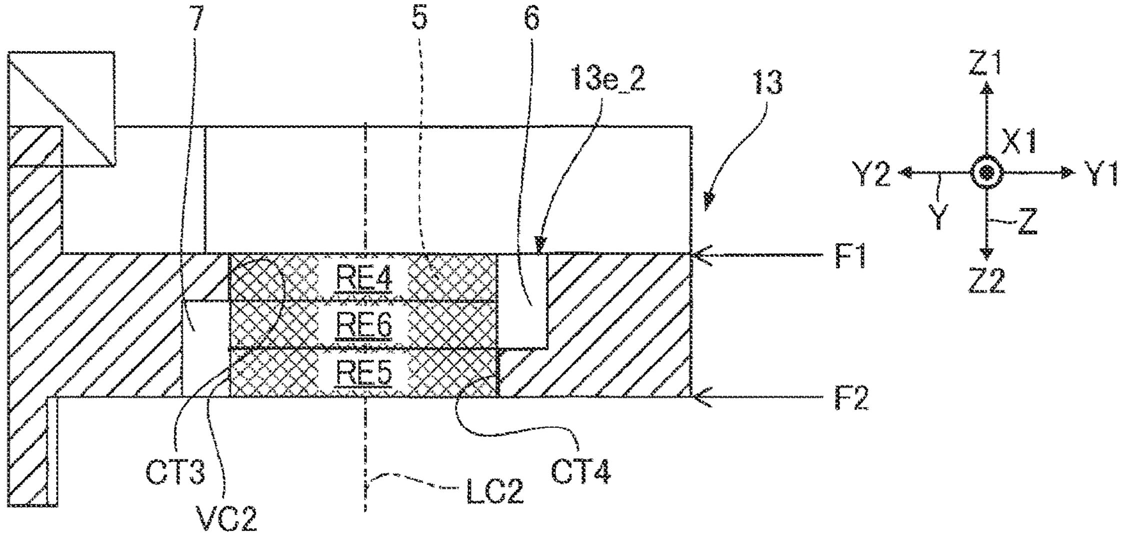
FIG. 19 is a sectional view for describing the second virtual cylinder set in the second positioning portion illustrated in FIG. 15.
Figure 20:
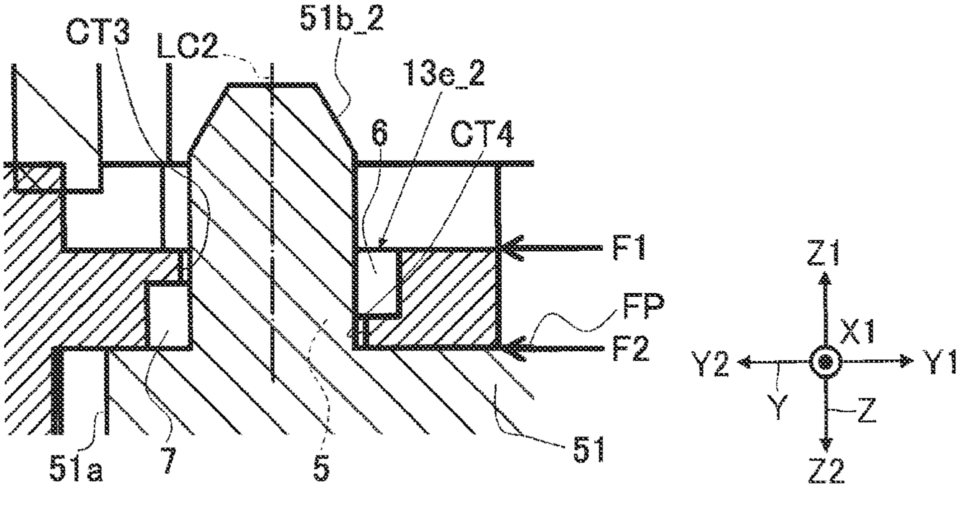
FIG. 20 is a view illustrating a state where a second positioning pin of the support body is inserted into the second positioning portion illustrated in FIG. 15.

FIG. 18 is a plan view for describing a second virtual cylinder VC2 set in the second positioning portion 13*e*_2 illustrated in FIG. 15. FIG. 19 is a sectional view for describing the second virtual cylinder VC2 set in the second positioning portion 13*e*_2 illustrated in FIG. 15. FIG. 20 is a view illustrating a state where the second positioning pin 51*b*_2 of the support body 51 is inserted into the second positioning portion 13*e*_2 illustrated in FIG. 15. The second virtual cylinder VC2 is a virtual cylinder inserted to the deepest position of the second positioning portion 13*e*_2 and having the maximum cross-sectional area when viewed in the depth direction (direction along the Z-axis) of the second positioning portion 13*e*_2. The second virtual cylinder VC2 is a right cylinder as in the first virtual cylinder VC1. In an example illustrated in FIG. 18, a shape of the second virtual cylinder VC2 in a plan view is an elliptical shape. That is, the bottom surface of the second virtual cylinder VC2 is an ellipse. A shape of the second virtual cylinder VC2 in a plan view is defined, based on a shape of the second positioning portion 13*e*_2 in a plan view. Accordingly, the shape may be a perfect circle in some cases. In this case, the second virtual cylinder VC2 is a regular cylinder.

As illustrated in FIG. 18, the side surface of the second virtual cylinder VC2 has a fourth region RE4, a fifth region RE5, and a sixth region RE6 disposed between the fourth region RE4 and the fifth region RE5, as three regions divided in the direction along the Z-axis. In the present embodiment, the fifth region RE5 is disposed in the Z2 direction which is a direction in which the ejecting surface FN faces the fourth region RE4 in the direction along the Z-axis.

The fourth region RE4 is a region which comes into contact with the second positioning portion 13*e*_2 on the side in the Y2 direction, and does not come into contact with the second positioning portion 13*e*_2 on the side in the Y1 direction, with respect to a second center line LC2 which is a center line of the second virtual cylinder VC2. The fifth region RE5 is a region which does not come into contact with the second positioning portion 13*e*_2 on the side in the Y2 direction, and comes into contact with the second positioning portion 13*e*_2 on the side in the Y1 direction, with respect to the second center line LC2. The sixth region RE6 is a region which does not come into contact with the second positioning portion 13*e*_2 on both sides in the Y2 direction and the Y1 direction, with respect to the second center line LC2. The second center line LC2 is a straight line passing through the center of the bottom surface of the second virtual cylinder VC2 and extending in the direction along the Z-axis.

Here, the third recessed portion 6 is adjacent to a portion of the fourth region RE4 on the side in the Y1 direction with respect to the second center line CL2. The fourth recessed portion 7 is adjacent to a portion of the fifth region RE5 on the side in the Y2 direction with respect to the second center line CL2. The third recessed portion 6 and the fourth recessed portion 7 are respectively adjacent to the sixth region RE6. The second virtual cylinder VC2 extends from the first surface F1 to the second surface F2 along the second through-hole 5. The second virtual cylinder VC2 of the present embodiment extends from one end to the other end of the second through-hole 5 in the Z-axis direction. That is, the deepest position of the second positioning portion 13*e*_2 is an end portion of the second through-hole 5 in the Z1 direction (that is, a position of the first surface F1 on the Z-axis) when the second virtual cylinder VC2 is inserted in the Z1 direction from an opening of the second positioning portion 13*e*_2 formed on the second surface F2, and is an end portion of the second through-hole 5 in the Z2 direction (that is, a position of the second surface F2 on the Z-axis) when the second virtual cylinder VC2 is inserted in the Z2 direction from an opening of the second positioning portion 13*e*_2 formed on the first surface F1.

In an example illustrated in FIG. 18, the length of the fourth region RE4 in the direction along the Z-axis and the length of the fifth region RE5 in the direction along the Z-axis are equal to each other. The lengths may be different from each other. However, the respective lengths of the fourth region RE4 and the fifth region RE5 along the Z-axis are preferably 20% or more and 45% or less of the length of the second virtual cylinder VC2 along the Z-axis, more preferably 25% or more and 40% or less, and much more preferably 28% or more and 38% or less. In addition, the length of the sixth region RE6 along the Z-axis is preferably 10% or more and 60% or less of the length of the second virtual cylinder VC2 along the Z-axis, more preferably 20% or more and 50% or less, and much more preferably 24% or more and 44% or less.

In this way, the second positioning portion 13$e$_2 comes into contact with the portion of the fourth region RE4 on the side in the Y2 direction with respect to the second center line LC2 without coming into contact with the respective portions of the fifth region RE5 and the sixth region RE6 on the side in the Y2 direction with respect to the second center line LC2, and comes into contact with the portion of the fifth region RE5 on the side in the Y1 direction with respect to the second center line LC2 without coming into contact with the respective portions of the fourth region RE4 and the sixth region RE6 with respect to the second center line LC2.

Therefore, the second positioning portion 13$e$_2 has a third contact portion CT3 which comes into contact with the portion of the fourth region RE4 on the side in the Y2 direction with respect to the second center line LC2, and a fourth contact portion CT4 which comes into contact with the portion of the fifth region RE5 on the side in the Y1 direction with respect to the second center line LC2. The third contact portion CT3 and the fourth contact portion CT4 respectively and continuously extend in the direction along the Z-axis.

As illustrated in FIG. 17, the second positioning portion 13$e$_2 has two boundary portions BO_2 facing each other in the direction along the X-axis. In a plan view when viewed in the direction along the Z-axis, the boundary portion BO_2 is a boundary between a portion in which a thin portion of the second positioning portion 13$e$_2 defining the bottom surface of the third recessed portion 6 defines the second through-hole 5 and a portion in which a thin portion of the second positioning portion 13$e$_2 defining the bottom surface the fourth recessed portion 7 defines the second through-hole 5, that is, a boundary between the third contact portion CT3 and the fourth contact portion CT4. The two boundary portions BO_2 respectively have a predetermined length in the direction along the Y-axis in a plan view. Therefore, the two boundary portions BO_2 extend in a planar manner from the first surface F1 to the second surface F2 along the Z-axis direction. Therefore, a portion on the side in the Y1 direction and a portion on the side in the Y2 direction of the second virtual cylinder VC2 (in other words, each of the fourth region RE4, the fifth region RE5, and the sixth region RE6) with respect to the second center line LC2 do not respectively include the two boundary portions BO_2.

Here, as described above, the length of the second through-hole 5 in the direction along the Y-axis is longer than the length of the second through-hole 5 in the direction along the X-axis. Therefore, when a shape of the second positioning pin 51$b$_2 in a plan view is a circular shape, as illustrated in FIG. 20, one or both of the third contact portion CT3 and the fourth contact portion CT4 do not come into contact with the side surface of the second positioning pin 51$b$_2. That is, the length of the second through-hole 5 in the direction along the Y-axis is longer than the maximum length of the second positioning pin 51$b$_2 in the direction along the Y-axis. Therefore, the liquid ejecting head can be easily attached to and detached from the support body 51 as illustrated in FIG. 14 described above.

Moreover, due to the presence of the fourth region RE4 and the sixth region RE6 as described above, the shortest distance between the third contact portion CT3 and the fourth contact portion CT4 in a cross section illustrated in FIG. 18 is greater than the maximum length of the second virtual cylinder VC2 in the direction along the Y-axis. Therefore, the liquid ejecting head 1 can be more easily attached to and detached from the support body 51 as illustrated in FIG. 14 described above. The shortest distance between the third contact portion CT3 and the fourth contact portion CT4 and the maximum length of the second positioning pin 51$b$_2 in the direction along the Y-axis represents a length or a distance measured before the second positioning pin 51$b$_2 is inserted into the second positioning portion 13$e$_2, that is, in a state where the second positioning pin 51$b$_2 is not inserted into the second positioning portion 13$e$_2.

In addition, in a state where the second positioning pin 51$b$_2 is inserted into the second positioning portion 13$e$_2, the second positioning portion 13$e$_2 comes into contact with both ends of the side surface of the second positioning pin 51$b$_2 in the direction along the X-axis. Through this contact, the movement of the second positioning portion 13$e$_2 with respect to the second positioning pin 51$b$_2 in the direction along the X-axis is restricted. In addition to inserting the first positioning pin 51$b$_1 into the first positioning portion 13$e$_1 described above, the second positioning pin 51$b$_2 is inserted into the second positioning portion 13$e$_2. In this manner, the rotation of the liquid ejecting head 1 with respect to the support body 51 is restricted in a plane orthogonal to the Z-axis.

As described above, the liquid ejecting apparatus 100 includes the liquid ejecting head 1 and the support body 51 including the first positioning pin 51$b$_1. The liquid ejecting head 1 is supported by the support body 51 having the first positioning pin 51$b$_1, and ejects the ink which is an example of a "liquid". Here, as described above, the liquid ejecting head 1 includes the first positioning portion 13$e$_1 that positions the liquid ejecting head 1 with respect to the support body 51 by inserting the first positioning pin 51$b$_1.

When the first virtual cylinder inserted to the deepest position of the first positioning portion 13$e$_1 and having the maximum cross-sectional area when viewed in the first direction (direction along the Z-axis) which is the depth direction of the first positioning portion 13$e$_1 is defined as the first virtual cylinder VC1, the side surface of the first virtual cylinder VC1 has the first region RE1, the second region RE2, and the third region RE3 disposed between the first region RE1 and the second region RE2, as three regions divided in the first direction.

The first region RE1 comes into contact with the first positioning portion 13$e$_1 on a first side (side in the Y2 direction) which is one side in a second direction (direction along the Y-axis) orthogonal to the first direction, and does not come into contact with the first positioning portion 13$e$_1 on a second side (side in the Y1 direction) which is the other side in the second direction, with respect to the first center line LC1 which is the center line of the first virtual cylinder VC1. The second region RE2 does not come into contact with the first positioning portion 13$e$_1 on the first side (side in the Y2 direction), and comes into contact with the first positioning portion 13$e$_1 on the second side (side in the Y1 direction), with respect to the first center line LC1. The third region RE3 does not come into contact with the first positioning portion 13$e$_1 on both the first side (side in the Y2 direction) and the second side (side in the Y1 direction), with respect to the first center line LC1.

In the above-described liquid ejecting head 1, the first region RE1 comes into contact with the first positioning portion 13$e$_1 on the first side (side in the Y2 direction) with respect to the first center line LC1, and the second region RE2 comes into contact with the first positioning portion 13$e$_1 on the second side (side in the Y1 direction) with respect to the first center line LC1. Therefore, when the side surface of the first positioning pin 51$b$_1 corresponds to the side surface of the first virtual cylinder VC1, the first positioning pin 51$b$_1 is inserted into the first positioning portion 13$e$_1. In this manner, the liquid ejecting head 1 can be positioned with respect to the support body 51.

Here, a comparative example may be assumed as follows. The positioning portion of the liquid ejecting head into which the positioning pin of the support body is inserted is configured to include only the through-hole extending in the direction along the Z-axis. The comparative example does not have the first recessed portion 3 or the second recessed portion 4 as in the first positioning portion 13$e$_1. Therefore, in the comparative example, in order that the positioning portion is inserted into and removed from the positioning pin, the liquid ejecting head needs to be slidably moved with respect to the support body along a protruding direction of the positioning pin. In this comparative example, inserting/removing performance of the positioning portion with respect to the positioning pin is poor. Specifically, as a gap between the positioning pin and the positioning portion is narrower in a state where the positioning pin is inserted into the positioning portion, the inserting/removing performance is poorer. In particular, when the positioning pin is inserted into the positioning portion by press-fitting, friction occurs between the positioning pin and the positioning portion when inserted and removed. Therefore, the positioning pin needs to be inserted and removed with a strong force. In addition, when the positioning pin is inserted into the positioning portion, the two positioning pins need to be respectively inserted into the two positioning portions at the same time. However, this work is not easy. Furthermore, in this case, an operator is less likely to visually recognize a position of the ejecting surface of the liquid ejecting head. Therefore, there is a possibility that the ejecting surface may be damaged by hitting the positioning pin.

On the other hand, in the present embodiment, the first region RE1 does not come into contact with the first positioning portion 13$e$_1 on the second side (side in the Y1 direction) with respect to the first center line LC1, the second region RE2 does not come into contact with the first positioning portion 13$e$_1 on the first side (side in the Y2 direction) with respect to the first center line LC1, and the third region RE3 does not come into contact with the first positioning portion 13$e$_1 on both the first side (side in the Y2 direction) and the second side (side in the Y1 direction) with respect to the first center line LC1. Therefore, the liquid ejecting head 1 can be attached to and detached from the support body 51 by inclining the liquid ejecting head 1 with respect to the extending direction of the first positioning pin 51$b$_1. That is, according to this configuration, the shortest distance Ds between the first contact portion CT1 and the second contact portion CT2 is greater than the maximum dimension Dv (corresponding to the maximum dimension of the first through-hole 2 in the direction along the Y-axis) in the direction along the Y-axis of the first virtual cylinder VC1. Therefore, compared to the above-described comparative example, the first positioning portion 13$e$_1 is excellent in the inserting/removing performance with respect to the first positioning pin 51$b$_1. Therefore, attachability/detachability of the liquid ejecting head 1 with respect to the support body 51 can be improved. In addition, the first positioning portion 13$e$_1 can be inserted into the first positioning pin 51$b$_1 before the second positioning portion 13_2 is inserted into the second positioning pin 51$b$_2. Therefore, unlike the comparative example, the two positioning portions no longer need to be inserted into the two positioning pins at the same time, and the attachability/detachability of the liquid ejecting head 1 with respect to the support body 51 can be improved. Furthermore, when the liquid ejecting head 1 is attached to or detached from the support body 51, the operator is likely to visually recognize the position of the ejecting surface FN by inclining the liquid ejecting head 1 with respect to the extending direction of the first positioning pin 51$b$_1. Therefore, it is possible to reduce a possibility that the ejecting surface FN may come into contact with the positioning pin 51$b$.

As described above, the liquid ejecting head 1 includes the holder 13 which is an example of a "first member". The holder 13 has the first positioning portion 13$e$_1, the first surface F1, and the second surface F2 on a side opposite to the first surface F1. The first positioning portion 13$e$_1 has the first through-hole 2 penetrating from the second surface F2 to the first surface F1 in the first direction (Z1 direction), the first recessed portion 3 provided on the first surface F1, and the second recessed portion 4 provided on the second surface F2.

Here, the first through-hole 2 is disposed between the first recessed portion 3 and the second recessed portion 4 in the second direction (direction along the Y-axis). The first recessed portion 3 is adjacent to the second side (side in the Y1 direction) of the first region RE1 with respect to the first center line LC1. The second recessed portion 4 is adjacent to the first side (side in the Y2 direction) of the second region RE2 with respect to the first center line LC1. The first recessed portion 3 and the second recessed portion 4 are respectively adjacent to the third region RE3. The first virtual cylinder VC1 extends from the first surface F1 to the second surface F2 along the first through-hole 2. Therefore, the first through-hole 2, the first recessed portion 3, and the second recessed portion 4 can be formed by processing both surfaces of the first surface F1 and the second surface F2. As a result, the liquid ejecting head 1 can be more simply manufactured, compared to a configuration in which the first positioning portion 13$e$_1 is a blind hole (bottomed hole).

In addition, as described above, the length of the first region RE1 along the first direction (direction along the Z-axis) and the length of the second region RE2 along the first direction (direction along the Z-axis) are equal to each other. Therefore, rigidity of the first contact portion CT1 and rigidity of the second contact portion CT2 of the first positioning portion 13$e$_1 can be equal, and thus, it is possible to preferably prevent a possibility that one of the first contact portion CT1 and the second contact portion CT2 may have insufficient rigidity compared to the other.

Furthermore, as described above, the respective lengths of the first region RE1 and the second region RE2 along the first direction (direction along the Z-axis) are 20% or more and 45% or less of the length of the first virtual cylinder VC1 along the first direction (direction along the Z-axis). Therefore, the rigidity of the first positioning portion 13$e$_1 can be improved while the inserting/removing performance of the first positioning pin 51$b$_1 with respect to the first positioning portion 13$e$_1 can be satisfactorily achieved.

In addition, as described above, the first positioning portion 13*e*_1 has the first contact portion CT1 which comes into contact with the first side (side in the Y2 direction) of the first region RE1 with respect to the first center line LC1, and the second contact portion CT2 which comes into contact with the second side (side in the Y1 direction) of the second region RE2 with respect to the first center line LC1. The first contact portion CT1 and the second contact portion CT2 respectively and continuously extend in the first direction (direction along the Z-axis). Therefore, the first contact portion CT1 and the second contact portion CT2 can be respectively brought into surface contact with the first positioning pin 51*b*_1 along the first direction (direction along the Z-axis). As a result, the liquid ejecting head 1 can be highly accurately positioned with respect to the support body 51.

Here, as described above, in a cross section obtained by cutting the first positioning portion 13*e*_1 on a plane along both the first direction (direction along the Z-axis) and the second direction (direction along the Y-axis) at the position where the first virtual cylinder VC1 has the maximum length along the second direction (direction along the Y-axis) when viewed in the first direction (direction along the Z-axis), at positions in the third direction (direction along the X-axis) orthogonal to the first direction (direction along the Z-axis) and the second direction (direction along the Y-axis), the shortest distance Ds between the first contact portion CT1 and the second contact portion CT2 is equal to or longer than the maximum length Da of the first positioning pin 51*b*_1 along the second direction (direction along the Y-axis). Therefore, compared to a case where the shortest distance Ds is smaller than the maximum length Da, when the first positioning portion 13*e*_1 is inclined with respect to the extending direction of the first positioning pin 51*b*_1, a tightening allowance between the first positioning portion 13*e*_1 and the first positioning pin 51*b*_1 can be reduced. As a result, the attachability/detachability of the liquid ejecting head 1 with respect to the support body 51 can be improved. The shortest distance Ds is more preferably greater than the maximum length Da. In this manner, when the first positioning portion 13*e*_1 is inclined with respect to the extending direction of the first positioning pin 51*b*_1, a gap is provided between the first positioning portion 13*e*_1 and the first positioning pin 51*b*_1. Therefore, the attachability/detachability of the liquid ejecting head 1 with respect to the support body 51 can be further improved.

Furthermore, as described above, the liquid ejecting head 1 includes the ejecting surface FN having the plurality of nozzles N for ejecting the ink, and the ejecting surface FN is disposed on the second side (side in the Y1 direction) when viewed from the first positioning portion 13*e*_1. The second region RE2 is disposed in the direction (Z2 direction) facing the ejecting surface FN with respect to the first region RE1 in the first direction (direction along the Z-axis). In other words, the second region RE2 is closer to the protruding surface FP than the first region RE1 in the first direction (direction along the Z-axis). In this manner, the liquid ejecting head 1 can be attached to and detached from the support body 51 so that the liquid ejecting head 1 is inclined with respect to the extending direction of the first positioning pin 51*b*_1. In addition, it is preferable that the longitudinal direction of the liquid ejecting head 1 is the direction along the Y-axis as in the present embodiment. In this case, visibility of the ejecting surface FN is further improved in combination with the above-described configuration. As illustrated in FIGS. 4 and 6, when the ejecting surface FN is not disposed on the first side (side in the Y2 direction) when viewed from the first positioning portion 13*e*_1, a portion of the ejecting surface FN may exist at a position shifted in the direction along the X-axis with respect to the first positioning portion 13*e*_1.

In addition, as described above, the liquid ejecting head 1 further includes the second positioning portion 13*e*_2 that positions the liquid ejecting head 1 with respect to the support body 51 by inserting the second positioning pin 51*b*_2 provided in the support body 51. The first positioning portion 13*e*_1 and the second positioning portion 13*e*_2 are aligned in the second direction (direction along the Y-axis). Therefore, a position and a posture of the liquid ejecting head 1 with respect to the support body 51 can be restricted by the first positioning portion 13*e*_1 and the second positioning portion 13*e*_2. In addition, the second positioning pin 51*b*_2 can be inserted into the second positioning portion 13*e*_2 after the first positioning pin 51*b*_1 is inserted into the first positioning portion 13*e*_1. Therefore, the attachability/detachability of the liquid ejecting head 1 with respect to the support body 51 can be improved. As illustrated in FIGS. 4 and 6, in order to achieve highly accurate positioning, it is preferable that the second direction (direction along the Y-axis) in which the first positioning portion 13*e*_1 and the second positioning portion 13*e*_2 are aligned coincides with the longitudinal direction (direction along the Y-axis) of the liquid ejecting head 1.

Furthermore, as described above, the second positioning portion 13*e*_2 is disposed on the second side (side in the Y1 direction) with respect to the first positioning portion 13*e*_1. The second region RE2 is disposed closer to the protruding surface FP on which the first positioning pin 51*b*_1 of the support body 51 protrudes than the first region RE1 in the first direction (direction along the Z-axis).

In addition, as described above, when the virtual cylinder inserted to the deepest position of the second positioning portion 13*e*_2 and having the maximum cross-sectional area when viewed in the first direction (direction along the Z-axis) is defined as the second virtual cylinder VC2, the side surface of the second virtual cylinder VC2 includes the fourth region RE4, the fifth region RE5, the sixth region RE6 disposed between the fourth region RE4, and the fifth region RE5, as three regions divided in the first direction (direction along the Z-axis).

The fourth region RE4 comes into contact with the second positioning portion 13*e*_2 on the first side (side in the Y2 direction), and does not come into contact with the second positioning portion 13*e*_2 on the second side (side in the Y1 direction), with respect to the second center line LC2 which is the center line of the second virtual cylinder VC2. The fifth region RE5 does not come into contact with the second positioning portion 13*e*_2 on the first side (side in the Y2 direction), and comes into contact with the second positioning portion 13*e*_2 on the second side (side in the Y1 direction), with respect to the second center line LC2. The sixth region RE6 does not come into contact with the second positioning portion 13*e*_2 on both the first side (side in the Y2 direction) and the second side (side in the Y1 direction), with respect to the second center line LC2. A direction from the second region RE2 toward the first region RE1 is the same as a direction from the fifth region RE5 toward the fourth region RE4. Therefore, the second positioning portion 13*e*_2 is excellent in inserting/removing performance with respect to the second positioning pin 51*b*_2. Therefore, the attachability/detachability of the liquid ejecting head 1 with respect to the support body 51 can be improved.

As described above, in the first embodiment, the second positioning portion 13*e*_2 is configured to include the second through-hole 5, the third recessed portion 6, and the fourth recessed portion 7. However, a configuration may be adopted so that the second positioning portion 13*e*_2 includes only the second through-hole 5 without providing the third recessed portion 6 and the fourth recessed portion 7. The reason is as follows. The second positioning portion 13*e*_2 is elongated in the direction along the Y-axis, and is provided with respect to the ejecting surface FN in a state where the liquid ejecting head 1 is supported by the support body 51. An inclination angle of the ejecting surface FN when the second positioning pin 51*b*_2 is inserted into the second positioning portion 13*e*_2 is smaller than an inclination angle of the ejecting surface FN when the first positioning pin 51*b*_1 is inserted into the first positioning portion 13*e*_1. In this manner, a structure of the second positioning portion 13*e*_2 can be simplified.

In addition, in the above-described first embodiment, the first recessed portion 3 and the second recessed portion 4 are point-symmetrical with respect to the center of the first positioning portion 13*e*_1. Therefore, the maximum dimension D1_*a* of the first recessed portion 3 in the direction along the Y-axis coincides with the maximum dimension D1_*b* of the second recessed portion 4 in the direction along the Y-axis. In addition, the maximum dimensions D1_*a* are equal at all positions on the X-axis. The same applies to the maximum dimension D1_*b*. In addition, the third recessed portion 6 and the fourth recessed portion 7 are point-symmetrical with respect to the center of the second positioning portion 13*e*_2. Therefore, the maximum dimensions D2_*a* of the third recessed portion 6 in the direction along the Y-axis coincides with the maximum dimension D2_*b* of the fourth recessed portion 7 in the direction along the Y-axis. In addition, the maximum dimensions D2_*a* are equal at all positions on the X-axis. The same applies to the maximum dimension D2_*b*.

In addition, as described above, the second positioning portion 13*e*_2 is elongated in the direction along the Y-axis, and is provided with respect to the second ejecting surface FN in a state where the liquid ejecting head 1 is supported by the support body 51. The inclination angle of the ejecting surface FN when the second positioning pin 51*b*_2 is inserted into the second positioning portion 13*e*_2 is smaller than the inclination angle of the ejecting surface FN when the first positioning pin 51*b*_1 is inserted into the first positioning portion 13*e*_1. Therefore, the maximum dimension D2_*a* and the maximum dimension D2_*b* can be respectively reduced than the maximum dimension D1_*a* and the maximum dimension D1_*b*, and the dimension of the second positioning portion 13*e*_2 along the Y-axis direction can be reduced.

As illustrated in FIG. 14, it is preferable that a gap G2 between the side surface of the liquid ejecting head 1 directed in the Y1 direction and the inner peripheral surface of the opening portion 51*a* is larger than a gap G1 between the side surface of the liquid ejecting head 1 directed in the Y2 direction and the inner peripheral surface of the opening portion 51*a*. In addition, it is preferable that the positioning portion 13*e* is disposed closer to the ejecting surface FN than the center of the liquid ejecting head 1 in the direction along the Z-axis. According to this configuration, the liquid ejecting head 1 can be easily attached to and detached from the support body 51 to be inclined with respect to the extending direction of the first positioning pin 51*b*_1.

2. SECOND EMBODIMENT

Hereinafter, a second embodiment of the present disclosure will be described. Hereinafter, differences from the first embodiment will be mainly described. As in the first embodiment, the second to sixth embodiments and Modification Examples 1 to 4 (to be described later) will be described with reference to the coordinate axes based on the local coordinate system based on the liquid ejecting head.

Figure 21:
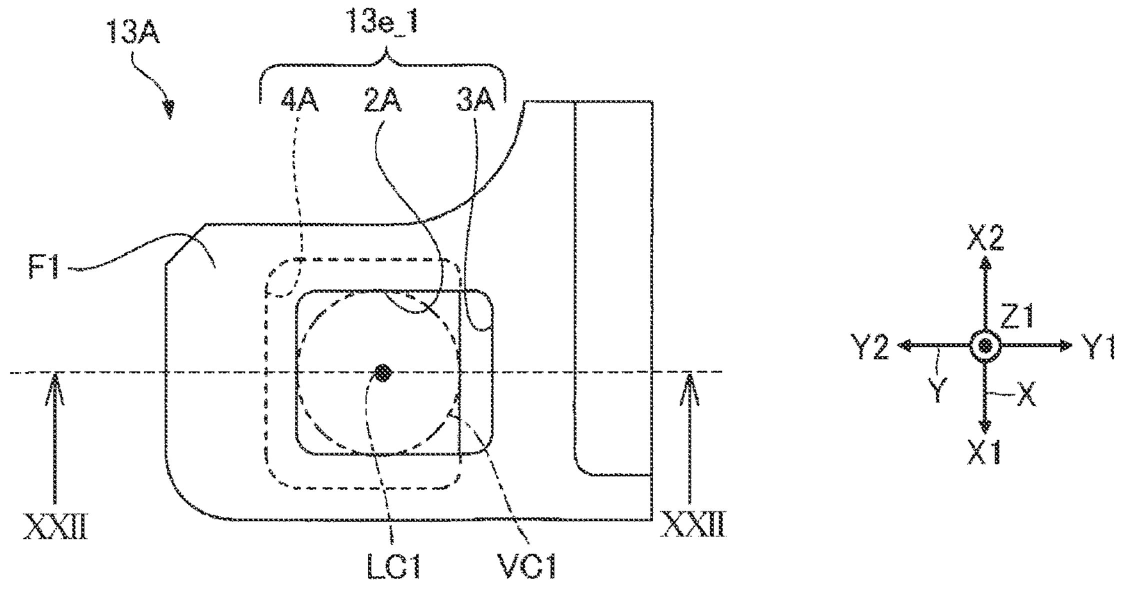
FIG. 21 is a view when a first positioning portion of a liquid ejecting head according to a second embodiment is viewed in the Z2 direction.
Figure 22:
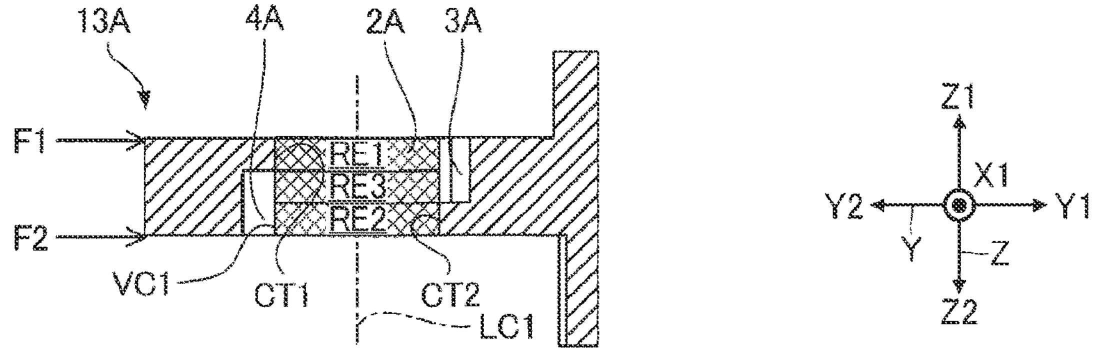
FIG. 22 is a sectional view taken along line XXII-XXII in FIG. 21.
Figure 23:
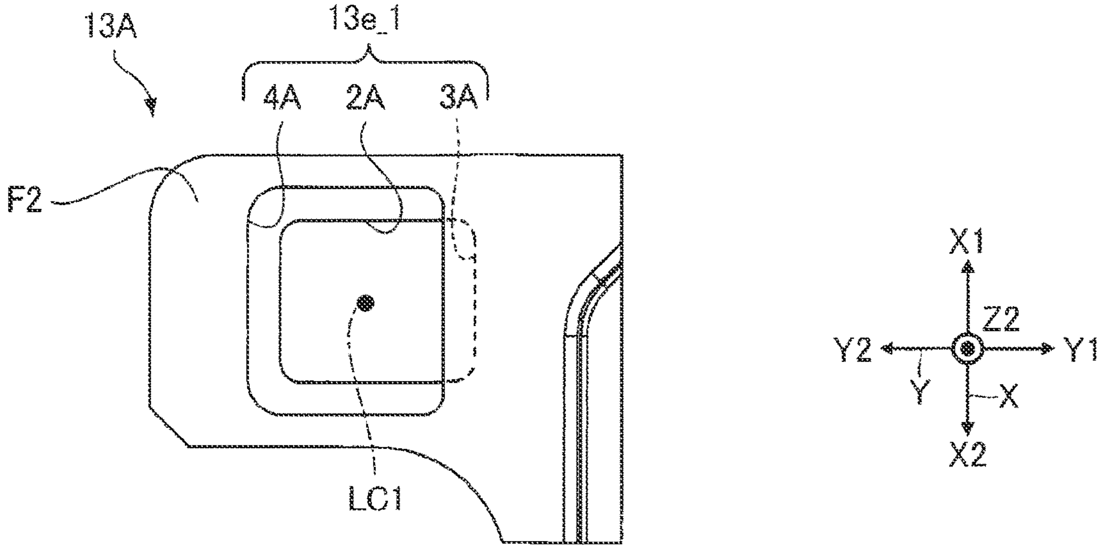
FIG. 23 is a view when the first positioning portion illustrated in FIG. 21 is viewed in the Z1 direction.

FIG. 21 is a view when the first positioning portion 13*e*_1 of the liquid ejecting head according to the second embodiment is viewed in the Z2 direction. FIG. 22 is a sectional view taken along line XXII-XXII in FIG. 21. FIG. 23 is a view when the first positioning portion 13*e*_1 illustrated in FIG. 21 is viewed in the Z1 direction. The first positioning portion 13*e*_1 of the present embodiment is configured in the same manner as the first positioning portion 13*e*_1 of the first embodiment, except that the configuration has a first through-hole 2A, a first recessed portion 3A, and a second recessed portion 4A instead of the first through-hole 2, the first recessed portion 3, and the second recessed portion 4. FIGS. 21 to 23 illustrate a portion of the holder 13A having the first through-hole 2A, the first recessed portion 3A, and the second recessed portion 4A.

The first through-hole 2A is configured in the same manner as the first through-hole 2 of the first embodiment, except that a shape in a plan view is different. The shape of the first through-hole 2A in a plan view is a substantially square shape. Here, the first through-hole 2A has a pair of sides along the Y-axis and a pair of sides along the X-axis in a plan view. In addition, the length of the first through-hole 2A in the direction along the Y-axis is equal to the length of the first through-hole 2A in the direction along the X-axis. For example, the substantially square shape indicates a shape in which corners of the square shape are R-chamfered or C-chamfered. The shape of the first through-hole 2A in a plan view may be a substantially quadrangular shape, a quadrangular shape, or a square shape.

FIG. 21 illustrates the first virtual cylinder VC1 by using a two-dot chain line. In the present embodiment, the first virtual cylinder VC1 comes into contact with four locations in both ends in the direction along the X-axis and both ends in the direction along the Y-axis of the first positioning portion 13*e*_1. Specifically, in a plan view, the first region RE1 comes into point contact with the first positioning portion 13*e*_1 in each portion on the side in the Y2 direction, on the side in the X1 direction, and on the side in the X2 direction with respect to the first center line LC1, and does not come into contact with the first positioning portion 13*e*_1 in a portion on the side in the Y1 direction with respect to the first center line LC1. In a plan view, the second region RE2 comes into point contact with the first positioning portion 13*e*_1 in a portion on the side in the Y1 direction with respect to the first center line LC1, and does not come into contact with the first positioning portion 13*e*_1 in each portion on the side in the Y2 direction, on the side in the X1 direction, and on the side in the X2 direction with respect to the first center line LC1. In a plan view, the third region RE3 comes into point contact with the first positioning portion 13*e*_1 in each portion on the side in the X1 direction and on the side in the X2 direction with respect to the first center line LC1, and does not come into contact with the first positioning portion 13*e*_1 in each portion on the side in the Y1 direction and on the side in the Y2 direction with respect to the first center line LC1.

Therefore, the first contact portion CT1 and the second contact portion CT2 can be respectively brought into line contact with the first positioning pin 51*b*_1 illustrated in the first embodiment along the direction along the Z-axis. Therefore, the first through-hole 2A having this shape in a plan view can also restrict the movement of the first positioning portion 13*e*_1 with respect to the first positioning pin 51*b*_1 in a plane orthogonal to the Z-axis. A magnitude correlation between the length of the first through-hole 2A in the direction along the Y-axis and the length of the first through-hole 2A in the direction along the X-axis is determined according to the shape of the first positioning pin 51*b*_1, and is not particularly limited.

The first recessed portion 3A is configured in the same manner as the first recessed portion 3 of the first embodiment, except that the shape in a plan view is different. The shape of the first recessed portion 3A in a plan view is substantially a quadrangular shape. Here, the first recessed portion 3A has a longitudinal shape along the side of the first through-hole 2A in the Y1 direction. In addition, the first recessed portion 3A has a pair of sides along the Y-axis and a pair of sides along the X-axis in a plan view. Furthermore, the length of the first recessed portion 3A in the direction along the Y-axis is shorter than the length of the first recessed portion 3A in the direction along the X-axis. In addition, the length of the first recessed portion 3A in the direction along the X-axis is equal to the length of the first through-hole 2A in the direction along the X-axis. The magnitude correlation between the lengths is not particularly limited.

The second recessed portion 4A is configured in the same manner as the second recessed portion 4 of the first embodiment, except that the shape in a plan view is different. The shape of the second recessed portion 4A in a plan view is a substantially C-shape along three sides other than the side of the first through-hole 2A in the Y1 direction.

According to the second embodiment as described above, the attachability/detachability can also be improved while required positioning accuracy of the liquid ejecting head with respect to the support body 51 can be secured.

3. THIRD EMBODIMENT

Hereinafter, a third embodiment of the present disclosure will be described. Hereinafter, differences from the first embodiment will be mainly described.

Figure 24:
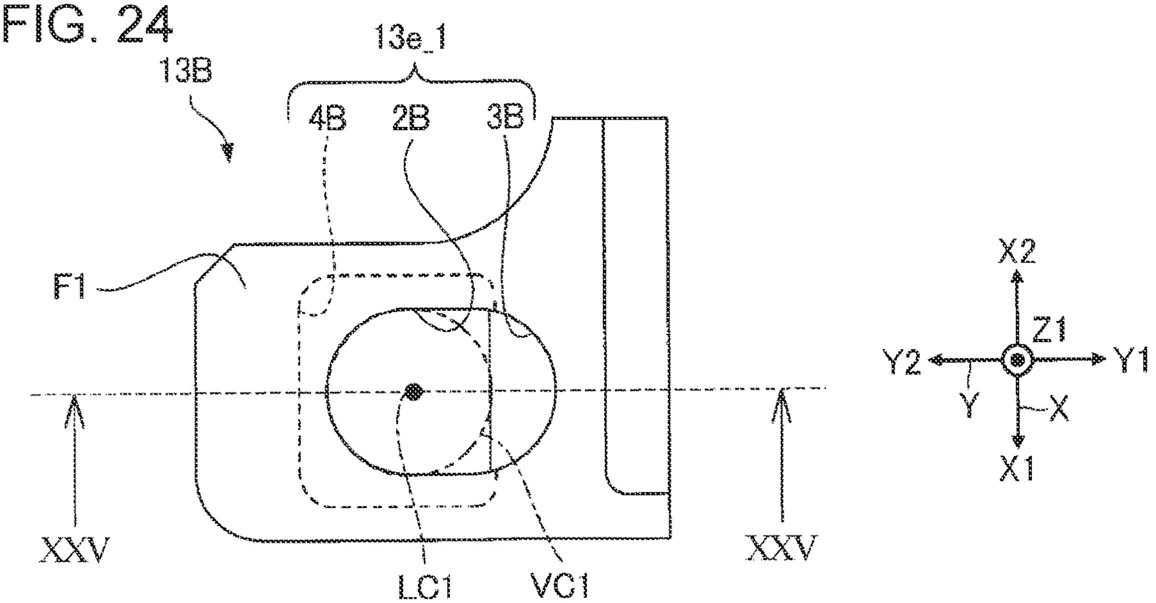
FIG. 24 is a view when a first positioning portion of a liquid ejecting head according to a third embodiment is viewed in the Z2 direction.
Figure 25:
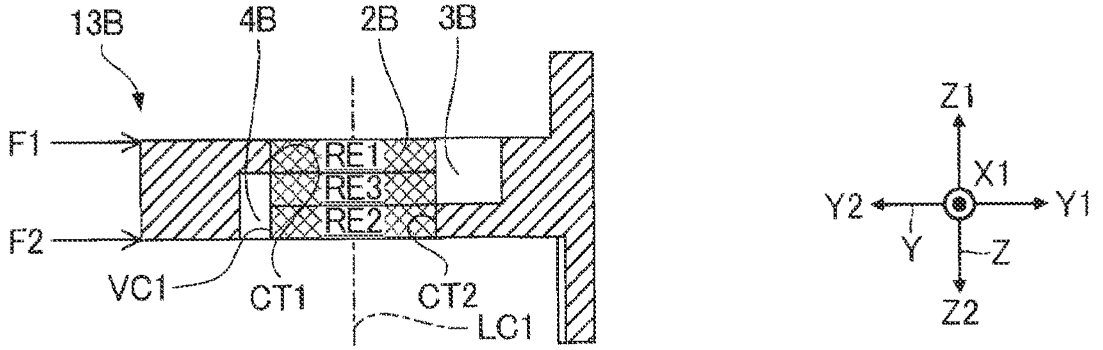
FIG. 25 is a sectional view taken along line XXV-XXV in FIG. 24.
Figure 26:
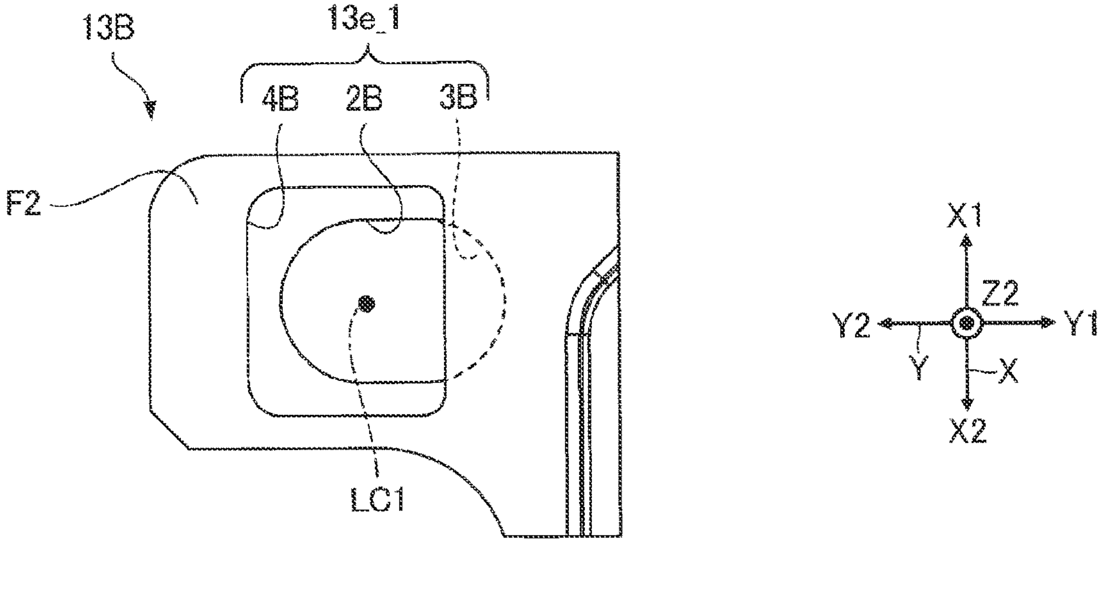
FIG. 26 is a view when the first positioning portion illustrated in FIG. 24 is viewed in the Z1 direction.

FIG. 24 is a view when the first positioning portion 13*e*_1 of the liquid ejecting head according to the third embodiment is viewed in the Z2 direction. FIG. 25 is a sectional view taken along line XXV-XXV in FIG. 24. FIG. 26 is a view when the first positioning portion 13*e*_1 illustrated in FIG. 24 is viewed in the Z1 direction. The first positioning portion 13*e*_1 of the present embodiment is configured in the same manner as the first positioning portion 13*e*_1 of the first embodiment, except that the configuration has a first through-hole 2B, a first recessed portion 3B, and a second recessed portion 4B instead of the first through-hole 2, the first recessed portion 3, and the second recessed portion 4. FIGS. 24 to 26 illustrate a portion of the holder 13B having the first through-hole 2B, the first recessed portion 3B, and the second recessed portion 4B.

The first through-hole 2B is configured in the same manner as the first through-hole 2 of the first embodiment, except that the shape in a plan view is different. The shape of the first through-hole 2B in a plan view is a shape obtained by combining a semicircle and a quadrangular shape. Here, in a plan view, the first through-hole 2B has a pair of sides along the Y-axis, one side joining ends in the Y1 direction of the pair of sides along the Y-axis to each other along the X-axis, and a convex arc joining ends in the Y2 direction of the pair of sides along the Y-axis to each other. In FIG. 24, the first virtual cylinder VC1 is illustrated by a two-dot chain line. The first through-hole 2B having this shape in a plan view can also restrict the movement of the first positioning portion 13*e*_1 with respect to the first positioning pin 51*b*_1 in a plane orthogonal to the Z-axis.

The first recessed portion 3B is configured in the same manner as the first recessed portion 3 of the first embodiment, except that the shape in a plan view is different. The shape of the first recessed portion 3B in a plan view is a semicircular shape. The first positioning portion 13*e*_1 has the first contact portion CT1 which comes into contact with a portion of the first region RE1 on the side in the Y2 direction with respect to the first center line LC1.

The second recessed portion 4B is configured in the same manner as the second recessed portion 4 of the first embodiment, except that the shape in a plan view is different. The shape of the second recessed portion 4B in a plan view is a substantially C-shape along the peripheral edge of the first through-hole 2B other than the side in the Y1 direction. The first positioning portion 13*e*_1 has the second contact portion CT2 which comes into contact with a portion of the second region RE2 on the side in the Y1 direction with respect to the first center line LC1.

According to the third embodiment as described above, the attachability/detachability can also be improved while required positioning accuracy of the liquid ejecting head with respect to the support body 51 can be secured.

4. FOURTH EMBODIMENT

Hereinafter, a fourth embodiment of the present disclosure will be described. Hereinafter, differences from the first embodiment will be mainly described.

Figure 27:
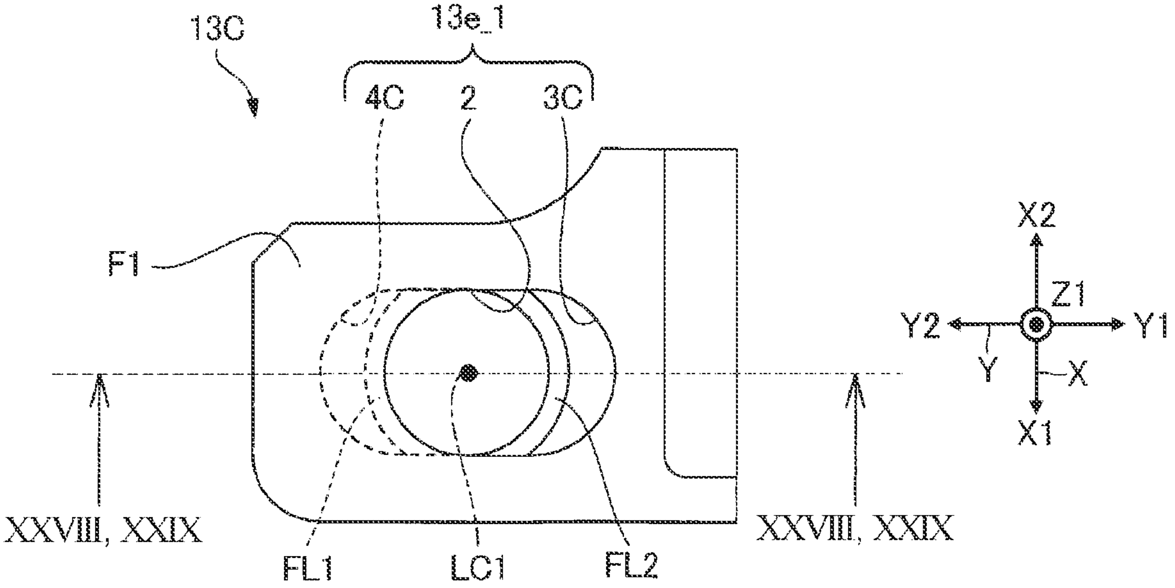
FIG. 27 is a view when a first positioning portion of a liquid ejecting head according to a fourth embodiment is viewed in the Z2 direction.
Figure 28:
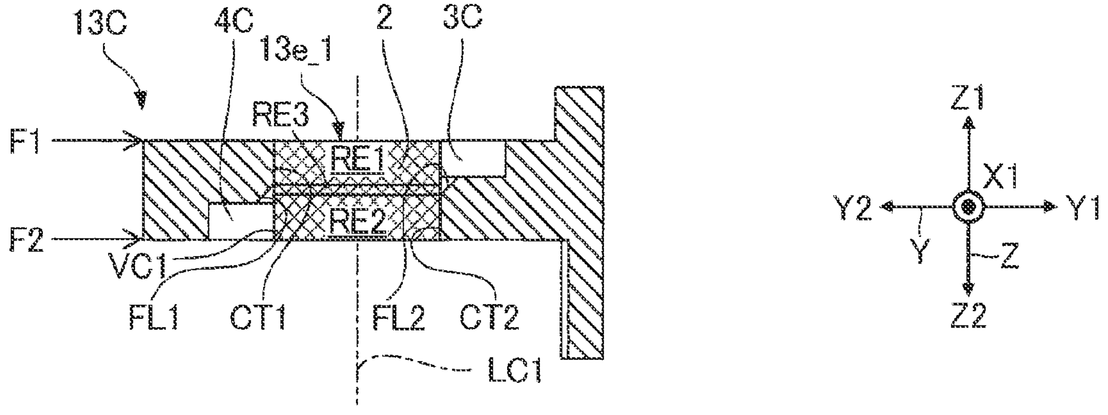
FIG. 28 is a sectional view taken along line XXVIII-XXVIII in FIG. 27.
Figure 29:
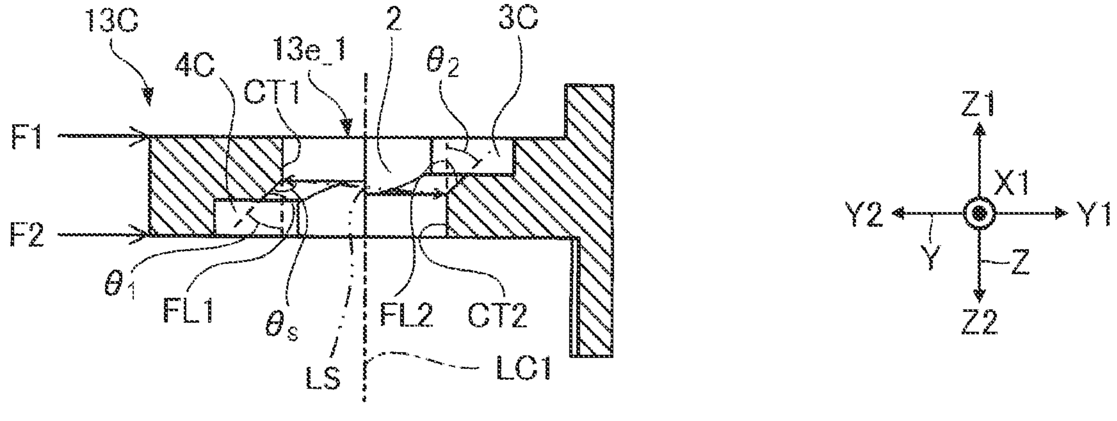
FIG. 29 is a sectional view taken along line XXIX-XXIX in FIG. 27.

FIG. 27 is a view when the first positioning portion 13*e*_1 of the liquid ejecting head according to the fourth embodiment is viewed in the Z2 direction. FIGS. 28 and 29 are sectional views taken along line XXVIII-XXVIII in FIG. 27. The first positioning portion 13*e*_1 of the present embodiment is configured in the same manner as the first positioning portion 13*e*_1 of the first embodiment, except that the configuration has a first recessed portion 3C and a second recessed portion 4C instead of the first recessed portion 3 and the second recessed portion 4. FIGS. 27 to 29 illustrate a portion of the holder 13C having the first through-hole 2, the first recessed portion 3C, and the second recessed portion 4C.

The first recessed portion 3C is configured in the same manner as the first recessed portion 3 of the first embodiment, except that chamfering is performed near the boundary with the first through-hole 2. The second recessed portion 4C is configured in the same manner as the second recessed portion 4 of the first embodiment, except that chamfering is performed near the boundary with the first through-hole 2. In the illustration, the chamfering is C-chamfering. However, without being limited thereto, for example, the chamfering may be R-chamfering.

In the present embodiment, the first positioning portion 13*e*_1 includes the first contact portion CT1 which comes into contact with the first side (side in the Y2 direction) of the first region RE1 with respect to the first center line LC1, and the first inclined surface FL1 continuous with the first contact portion CT1 and extending in a direction intersecting with the first direction (direction along the Z-axis) without being orthogonal to the first direction. Therefore, when the first positioning portion 13*e*_1 is inclined with respect to the extending direction of the first positioning pin 51*b*_1, a gap between the first positioning portion 13*e*_1 and the first positioning pin 51*b*_1 can be increased, compared to a configuration having no first inclined surface FL1. As a result, the attachability/detachability of the liquid ejecting head with respect to the support body 51 can be improved.

Here, the first positioning portion 13*e*_1 has the second contact portion CT2 which comes into contact with the second side (side in the Y1 direction) of the second region RE2 with respect to the first center line LC1, and the second inclined surface FL2 continuous with the second contact portion CT2 and extending in a direction intersecting with the first direction (direction along the Z-axis) without being orthogonal to the first direction. The first inclined surface FL1 and the second inclined surface FL2 are parallel to each other. The first inclined surface FL1 and the second inclined surface FL2 have an advantage in that a wall thickness of a member forming the first positioning portion 13*e*_1 is easily secured. The first positioning portion 13*e*_1 may be provided with only one of the first inclined surface FL1 and the second inclined surface FL2.

In addition, the first inclined surface FL1 and the second inclined surface FL2 have portions overlapping each other when viewed in the second direction (direction along the Y-axis). The first inclined surface FL1 and the second inclined surface FL2 have an advantage in that a wall thickness of a member forming the first positioning portion 13*e*_1 is easily secured. In the present embodiment, a portion of the first inclined surface FL1 and a portion of the second inclined surface FL2 overlap each other when viewed in the second direction (direction along the Y-axis). However, all of the first inclined surface FL1 and all of the second inclined surface All of FL2 may overlap each other when viewed in the second direction (direction along the Y-axis). The first inclined surface FL1 and the second inclined surface FL2 may not overlap each other when viewed in the second direction (direction along the Y-axis).

In addition, it is preferable that the length of the first inclined surface FL1 and the length of the second inclined surface FL2 are the same as each other. Furthermore, as illustrated in FIG. 28, it is preferable that a side wall defining the second recessed portion 4C of the first positioning portion 13*e*_1 is not provided on an extension line of the first inclined surface FL1 which extends along the first inclined surface FL1. Similarly, it is preferable that a side wall defining the first recessed portion 3C of the first positioning portion 13*e*_1 is not provided on an extension line of the second inclined surface FL2.

In addition, it is preferable that an angle $\theta_1$ formed by the first inclined surface FL1 and a straight line along the Z-axis is equal to an angle $\theta_2$ formed by the second inclined surface FL2 and the straight line along the Z-axis. As illustrated in FIG. 29, the formed angle $\theta_1$ is a sharp angle, in other words, a rotation angle obtained by rotating the first inclined surface FL1 to be parallel to the Z-axis while the boundary portion between the first inclined surface FL1 and the first contact portion CT1 is used as a rotation axis. The formed angle $\theta_2$ is also defined in the same manner.

Furthermore, in a cross section obtained by cutting the first positioning portion 13*e*_1 on a plane parallel to both the first direction (direction along the Z-axis) and the second direction (direction along the Y-axis) at the position where the first virtual cylinder VC1 has the maximum length along the second direction (direction along the Y-axis) when viewed in the first direction (direction along the Z-axis), at the positions in the third direction (direction along the X-axis) orthogonal to the first direction (direction along the Z-axis) and the second direction (direction along the Y-axis), an angle $\theta_s$ formed by a line segment LS joining the first contact portion CT1 and the second contact portion CT2 and the first inclined surface FL1 at a shortest time is 90 degrees or larger. Therefore, when the first positioning portion 13*e*_1 is inclined with respect to the extending direction of the first positioning pin 51*b*_1, a gap between the first positioning portion 13*e*_1 and the first positioning pin 51*b*_1 can be increased, compared to a configuration in which the angle is smaller than 90 degrees. As a result, the attachability/detachability of the liquid ejecting head with respect to the support body 51 can be improved. The line segment LS of the present embodiment is a line segment joining the boundary portion between the first inclined surface FL1 and the first contact portion CT1 and the boundary portion between the second inclined surface FL2 and the second contact portion CT2.

In other words, the formed angle $\theta_s$ is the rotation angle obtained by rotating the first inclined surface FL1 to be parallel to the line segment LS while the boundary portion between the first inclined surface FL1 and the first contact portion CT1 is used as the rotation axis. It is preferable that the angle $\theta_s$ is approximately 90 degrees. In this manner, rigidity of the first positioning portion 13*e*_1 can be secured. In addition, approximately 90 degrees indicates 90 degrees±2 degrees in view of a manufacturing error. In addition, approximately 90 degrees include 90 degrees.

Figure 30:
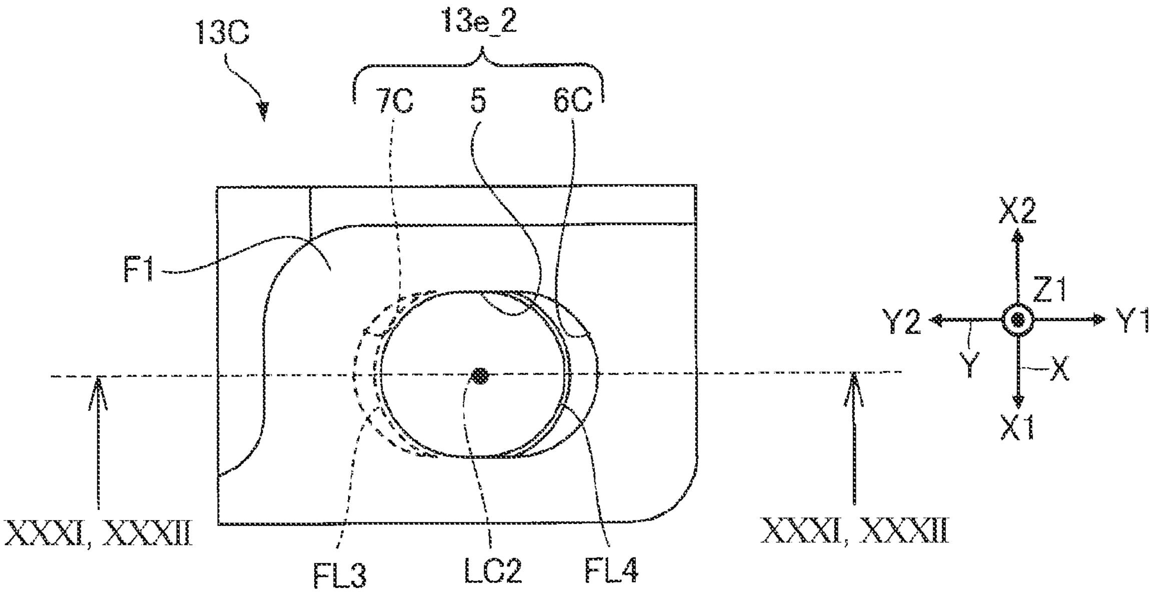
FIG. 30 is a view when a second positioning portion of the liquid ejecting head according to the fourth embodiment is viewed in the Z2 direction.
Figure 31:
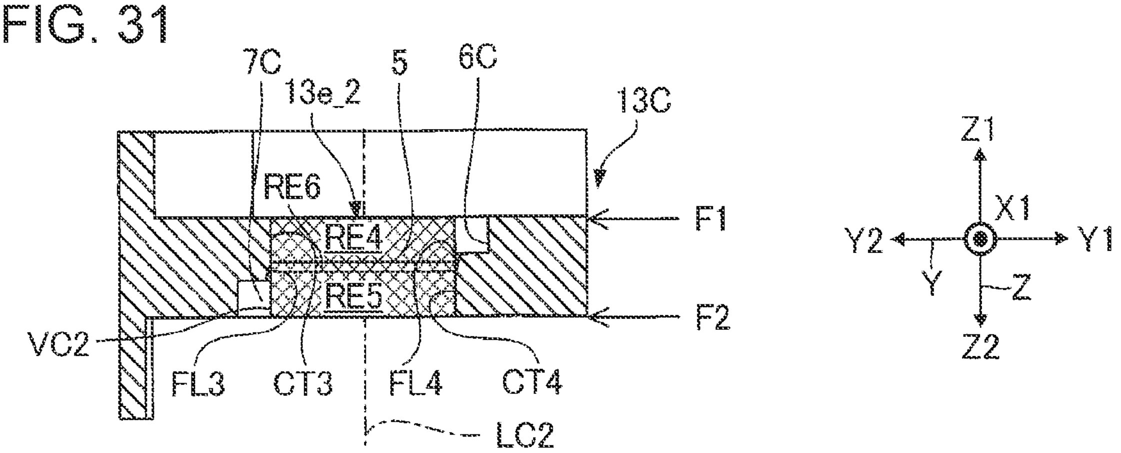
FIG. 31 is a sectional view taken along line XXXI-XXXI in FIG. 30.
Figure 32:
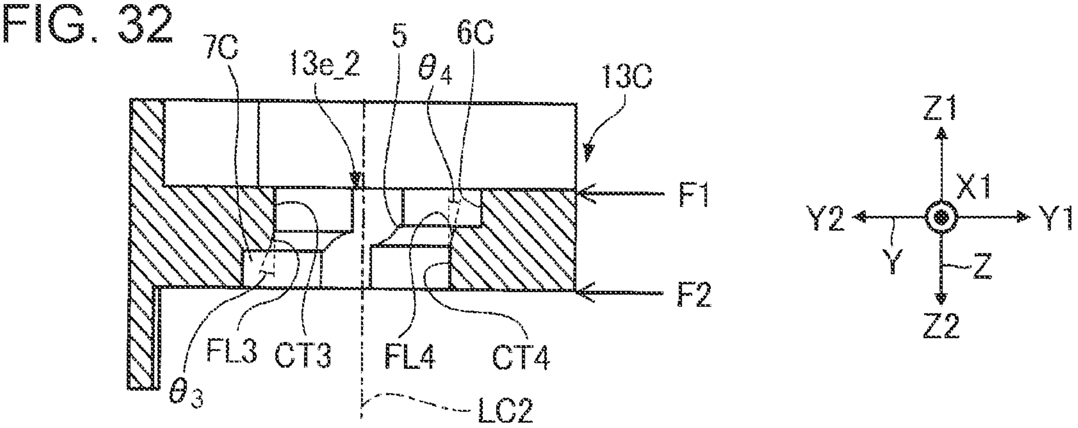
FIG. 32 is a sectional view taken along line XXXII-XXXII in FIG. 30.

FIG. 30 is a view when the second positioning portion 13*e*_2 of the liquid ejecting head according to the fourth embodiment is viewed in the Z2 direction. FIGS. 31 and 32 are sectional views taken along line XXXI-XXXI in FIG. 30. The second positioning portion 13*e*_2 of the present embodiment is the same as the second positioning portion 13*e*_2 of the first embodiment, except that the configuration has a third recessed portion 6C and a fourth recessed portion 7C instead of the third recessed portion 6 and the fourth recessed portion 7. FIGS. 30 and 31 illustrate a portion of the holder 13C having the second through-hole 5, the third recessed portion 6C, and the fourth recessed portion 7C.

The third recessed portion 6C is configured in the same manner as the third recessed portion 6 of the first embodiment, except that the chamfering is performed near the boundary with the second through-hole 5. In addition, the fourth recessed portion 7C is configured in the same manner as the fourth recessed portion 7 of the first embodiment, except that chamfering is performed near the boundary with the second through-hole 5. In the illustration, the chamfering is C-chamfering. However, without being limited thereto, for example, the chamfering may be R-chamfering.

The second positioning portion 13*e*_2 includes the third contact portion CT3 which comes into contact with the first side (side in the Y2 direction) of the fourth region RE4 with respect to the second center line LC2, the fourth contact portion CT4 which comes into contact with the second side (side in the Y1 direction) of the fifth region RE5 with respect to the second center line LC2, the third inclined surface FL3 continuous with the third contact portion CT3 and extending in a direction intersecting with the first direction (direction along the Z-axis) without being orthogonal to the first direction, and the fourth inclined surface FL4 continuous with the fourth contact portion CT4 and extending in a direction intersecting with the first direction (direction along the Z-axis) without being orthogonal to the first direction.

In addition, it is preferable that an angle $\theta_3$ formed by the third inclined surface FL3 and the straight line along the Z-axis is equal to an angle $\theta_4$ formed by the fourth inclined surface FL4 and the straight line along the Z-axis. In addition, it is preferable that the formed angle $\theta_3$ and the formed angle $\theta_4$ are respectively smaller than the formed angle $\theta_1$ and the formed angle $\theta_2$. In this manner, rigidity of the second positioning portion 13*e*_2 can be secured without impairing the inserting/removing performance of the second positioning portion 13_e__2 with respect to the second positioning pin 51_b__2. The formed angle $\theta_3$ and the formed angle $\theta_4$ are defined in the same manner as the formed angle $\theta_1$.

According to the fourth embodiment as described above, the attachability/detachability can also be improved while required positioning accuracy of the liquid ejecting head with respect to the support body 51 can be secured.

5. FIFTH EMBODIMENT

Hereinafter, a fifth embodiment of the present disclosure will be described. Hereinafter, differences from the first embodiment will be mainly described.

Figure 33:
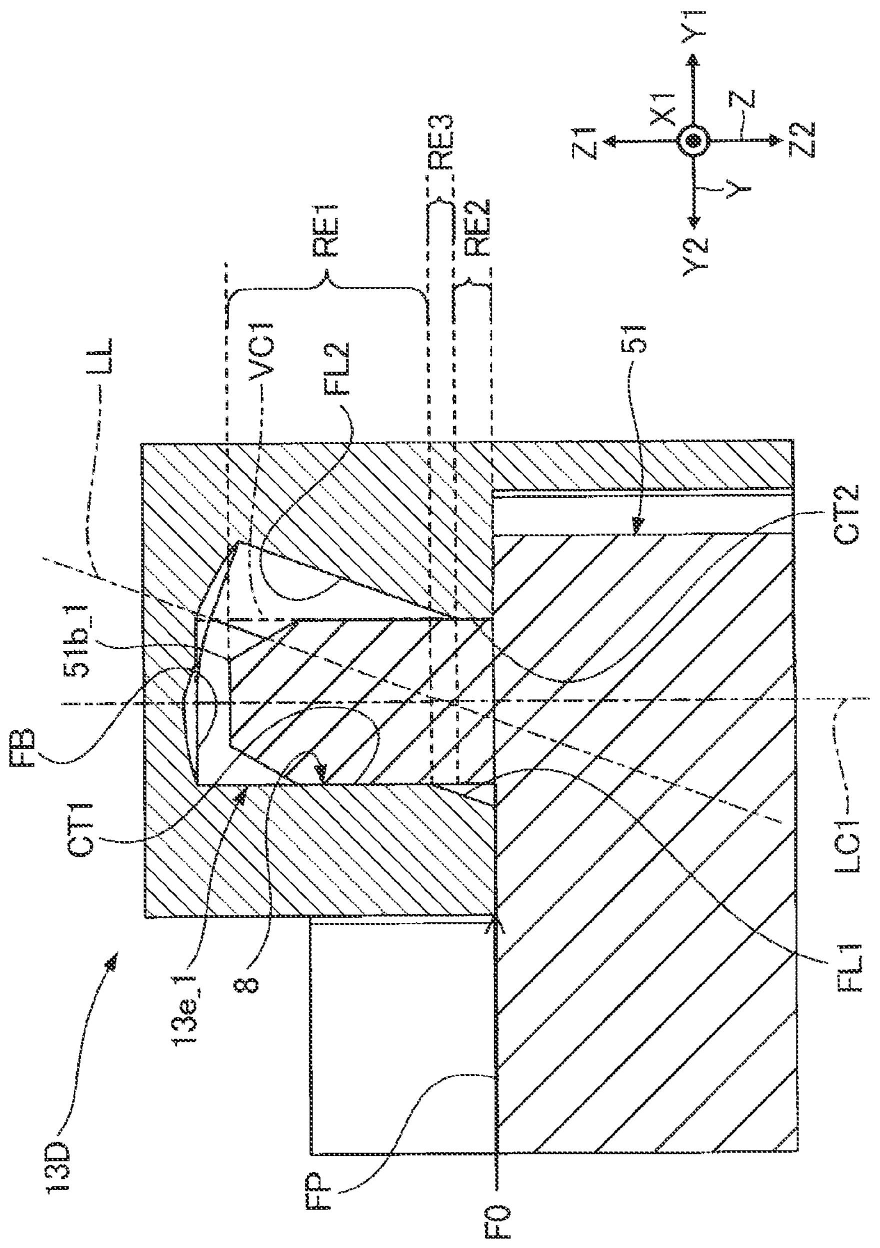
FIG. 33 is a sectional view illustrating a state where a first positioning pin is inserted into a first positioning portion of a liquid ejecting head according to a fifth embodiment.

FIG. 33 is a sectional view illustrating a state where the first positioning pin 51_b__1 is inserted into the first positioning portion 13_e__1 of the liquid ejecting head according to the fifth embodiment. The first positioning portion 13_e__1 of the present embodiment is configured in the same manner as the first positioning portion 13_e__1 of the first embodiment, except that the configuration includes a bottomed hole 8 having a bottom wall FB. FIG. 33 illustrates a portion of the holder 13D having the bottomed hole 8.

The bottomed hole 8 is a hole having a shape obtained by combining a substantially cylindrical bottomed hole in which the first center line LC1 serves as a central axis and a substantially cylindrical bottomed hole in which an axis line LL inclined around the X-axis with respect to the first center line LC1 serves as the center. The bottomed hole 8 is formed in a hole forming surface FO facing the protruding surface FP of the support body 51 of the holder 13D. Here, the first center line LC1 and the axis line LL intersect with each other, and an intersection thereof is located inside the bottomed hole 8. In an example illustrated in FIG. 33, the depths of the bottomed holes are equal to each other. In addition, the cross-sectional shapes of the bottomed holes are equal to each other. The depths of the bottomed holes may be different from each other, and the cross-sectional shapes of the bottomed holes may be different from each other. The bottom wall FB of the substantially cylindrical bottomed hole in which the first center line LC1 serves as the central axis includes a curved surface and a flat surface. In addition, the bottom wall FB of the substantially cylindrical bottomed hole in which the axis line LL serves as the center also includes the curved surface and the flat surface. That is, as illustrated in FIG. 33, the bottom wall FB of the bottomed hole 8 of the present embodiment includes the curved surface and the flat surface.

In this way, the shape of the first positioning portion 13_e__1 is the bottomed hole instead of the through-hole. The bottom wall FB includes the curved surface, and an area of the bottom wall FB in a plan view when viewed in the direction along the Z-axis is smaller than a cross-sectional area of the first positioning pin 51_b__1 in a plan view when viewed in the direction along the Z-axis, the bottom wall FB is not provided in a range where the first positioning pin 51_b__1 of the first positioning portion 13_e__1 is inserted. Therefore, it is not preferable that the bottom wall FB is interpreted as the deepest position of the first positioning portion 13_e__1 into which the first virtual cylinder VC1 is inserted. Therefore, in this case, it is desirable that the deepest position of the first positioning portion 13_e__1 into which the first virtual cylinder VC1 is inserted is set to a tip of the first positioning pin 51_b__1 (end portion of the first positioning pin 51_b__1 in the Z1 direction).

When the deepest position of the first positioning portion 13_e__1 into which the first virtual cylinder VC1 is inserted is defined as described above, the first region RE1 comes into contact with the first positioning portion 13_e__1 on the side in the Y2 direction with respect to the first center line LC1, and does not come into contact with the first positioning portion 13_e__1 on the side in the Y1 direction. The second region RE2 does not come into contact with the first positioning portion 13_e__1 on the side in the Y2 direction, and comes into contact with the first positioning portion 13_e__1 on the side in the Y1 direction, with respect to the first center line LC1. The third region RE3 does not come into contact with the first positioning portion 13_e__1 on both the side in the Y2 direction and the side in the Y1 direction, with respect to the first center line LC1. In this way, the bottomed hole 8 is formed at a depth required for inserting the first positioning pin 51_b__1. In this manner, the first positioning portion 13_e__1 is obtained. As a result, there is an advantage in that rigidity of the holder 13D can be easily improved.

In addition, the wall surface of the bottomed hole 8 is provided with the first contact portion CT1 which comes into contact with the first region RE1, the second contact portion CT2 which comes into contact with the second region RE2, the first inclined surface FL1 continuous with the first contact portion CT1 and extending in the intersecting direction without being orthogonal to the direction along the Z-axis, and the second inclined surface FL2 continuous with the second contact portion CT2 and extending in the intersecting direction without being orthogonal to the direction along the Z-axis.

According to the fifth embodiment as described above, the attachability/detachability can also be improved while required positioning accuracy of the liquid ejecting head with respect to the support body 51 can be secured.

6. SIXTH EMBODIMENT

Hereinafter, a sixth embodiment of the present disclosure will be described. Hereinafter, differences from the first embodiment will be mainly described.

Figure 34:
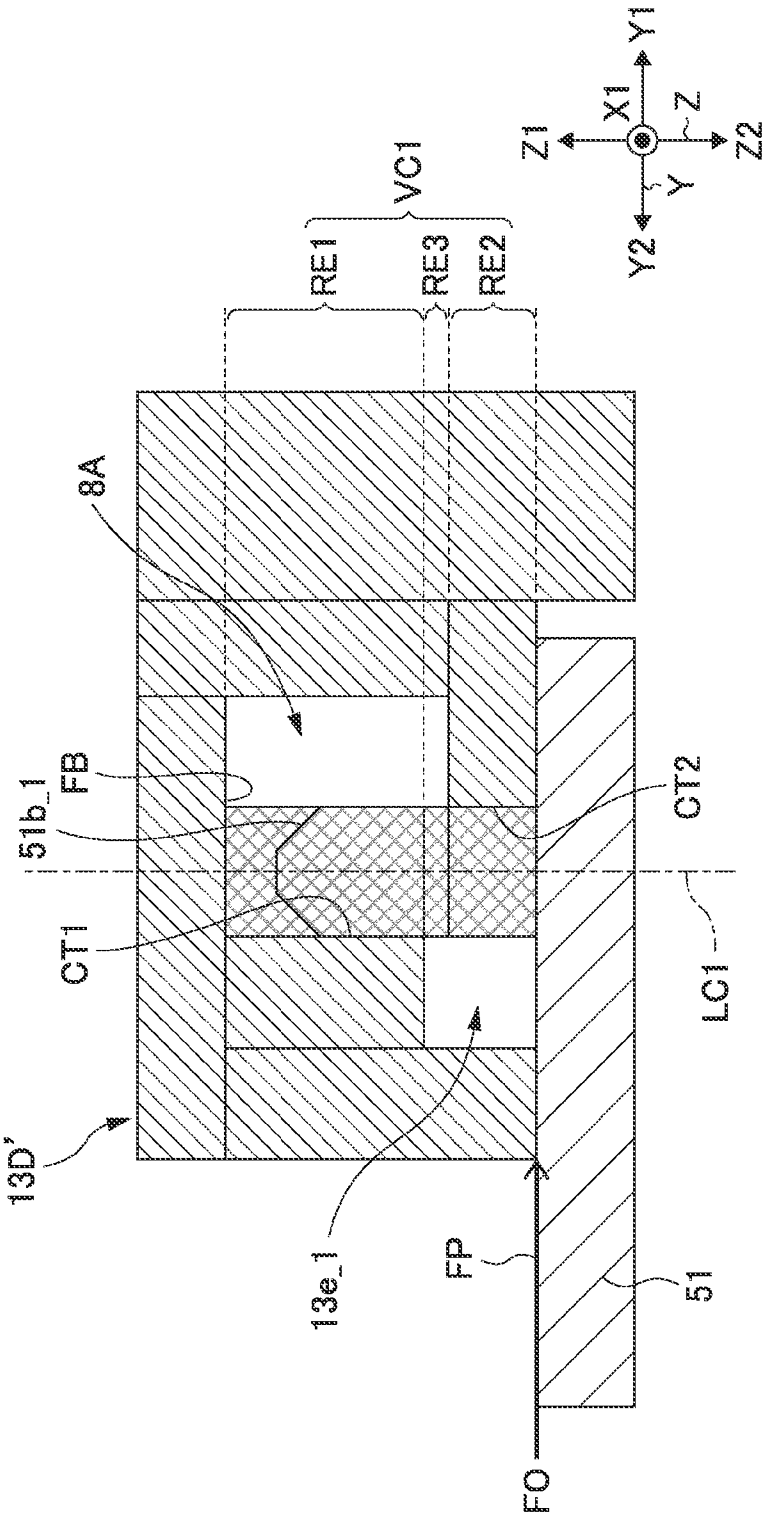
FIG. 34 is a sectional view illustrating a state where a first positioning pin is inserted into a first positioning portion of a liquid ejecting head according to a sixth embodiment.

FIG. 34 is a sectional view illustrating a state where the first positioning pin 51_b__1 is inserted into the first positioning portion 13_e__1 of the liquid ejecting head according to the sixth embodiment. The first positioning portion 13_e__1 of the present embodiment is configured in the same manner as the first positioning portion 13_e__1 of the first embodiment, except that the configuration includes a bottomed hole 8A having the bottom wall FB. FIG. 34 illustrates a portion of a holder 13D' having the bottomed hole 8A. In FIG. 34, the first virtual cylinder VC1 is illustrated by a diamond-shaped hatch.

The bottomed hole 8A is formed on the hole forming surface FO facing the protruding surface FP of the support body 51 of the holder 13D. The bottom wall FB of the present embodiment extends along an X-Y plane orthogonal to the Z-axis. The bottomed hole 8A has a recessed portion formed on the hole forming surface FO, a cylindrical hole recessed to the bottom wall FB, and a space which cannot be visually recognized by the hole forming surface FO when the hole forming surface FO is viewed in the Z1 direction. In the direction along the Y-axis, the cylindrical hole is located between the recessed portion and the invisible space. In addition, when viewed in the direction along the Y-axis, the recessed portion and the invisible space have portions overlapping each other.

The first region RE1 of the first virtual cylinder VC1 comes into contact with the first contact portion CT1 of the first positioning portion 13*e*_1 in a portion on the side in the Y2 direction with respect to the first center line LC1, and does not come into contact with the first positioning portion 13*e*_1 in a portion on the side in the Y1 direction. The second region RE2 comes into contact with the second contact portion CT2 of the first positioning portion 13*e*_1 in a portion on the side in the Y1 direction with respect to the first center line LC1, and does not come into contact with the first positioning portion 13*e*_1 in a portion on the side in the Y2 direction. The third region RE3 does not come into contact with the first positioning portion 13*e*_1 on both the side in the Y2 direction and the side in the Y1 direction, with respect to the first center line LC1.

The liquid ejecting head of the present embodiment includes the holder 13D' which is an example of a "first member", and the holder 13D' has the bottomed hole 8A having the bottom wall FB as the first positioning portion 13*e*_1. The deepest position at which the first virtual cylinder VC1 is inserted is the bottom wall FB.

According to the sixth embodiment as described above, the attachability/detachability can also be improved while required positioning accuracy of the liquid ejecting head with respect to the support body 51 can be secured.

The first through-hole 2 illustrated in the first embodiment is the through-hole into which the first positioning pin 51*b*_1 is inserted. Therefore, for example, when through-hole is formed at a position where the first positioning pin 51*b*_1 cannot be inserted on the bottom wall FB of the bottomed hole 8A, or when a small through-hole is formed to such an extent that the first positioning pin 51*b*_1 cannot be inserted into the bottom wall FB, the through-holes are not interpreted as a portion of the first through-hole 2. Therefore, when a through-hole different from this first through-hole 2 is formed on the bottom wall FB, it is desirable that the deepest position at which the first virtual cylinder VC1 is inserted is set as the bottom wall FB.

6. MODIFICATION EXAMPLES

The forms described above as example can be modified in various ways. Specific modification aspects that can be applied to the above-described forms will be described below as examples. Two or more aspects selected from the following examples in any desired way can be appropriately combined with each other within the scope in which the aspects do not contradict each other.

6-1. Modification Example 1

Figure 35:
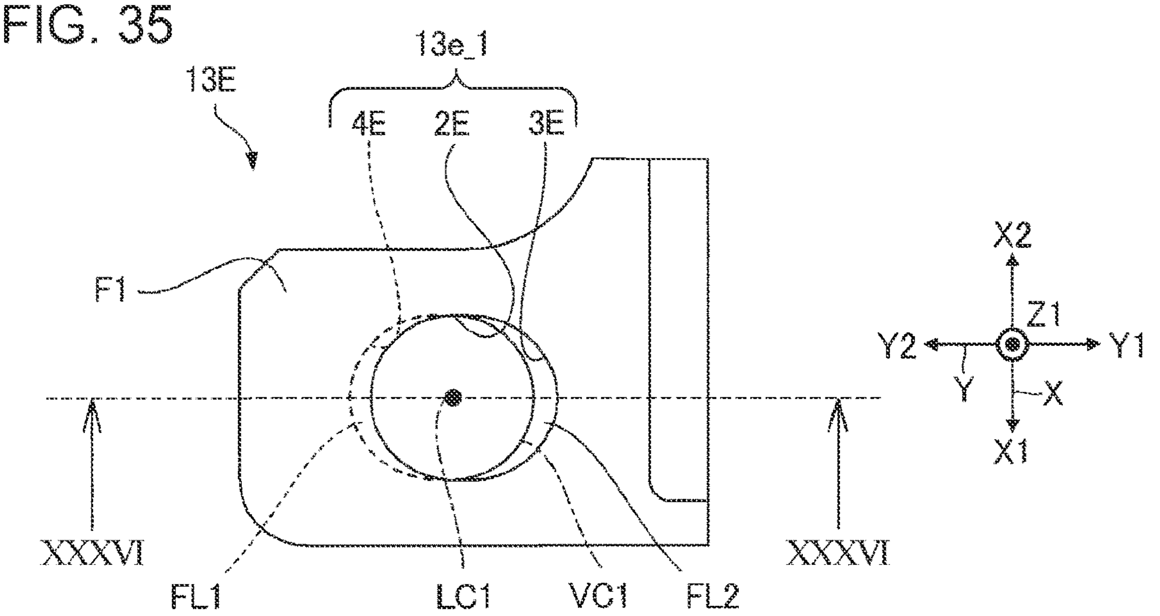
FIG. 35 is a view when a first positioning portion of a liquid ejecting head according to Modification Example 1 is viewed in the Z2 direction.
Figure 36:
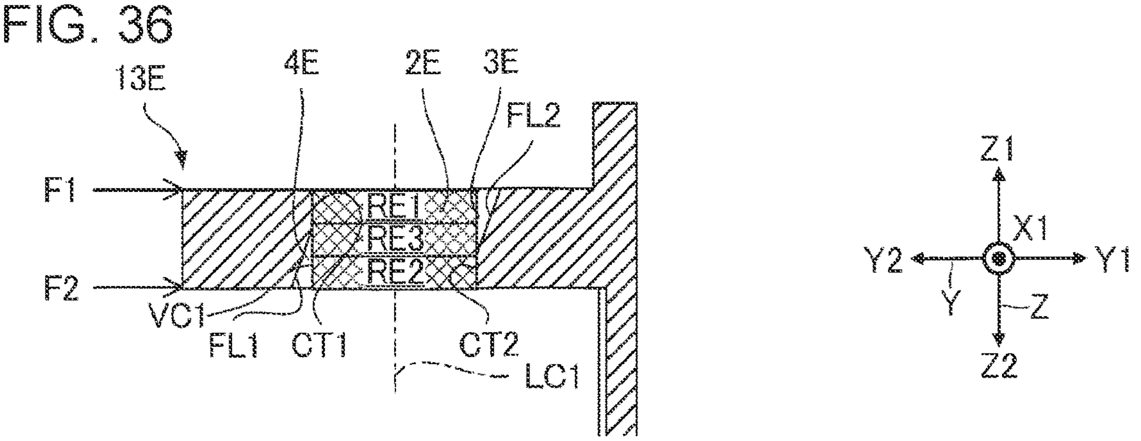
FIG. 36 is a sectional view taken along line XXXVI-XXXVI in FIG. 35.
Figure 37:
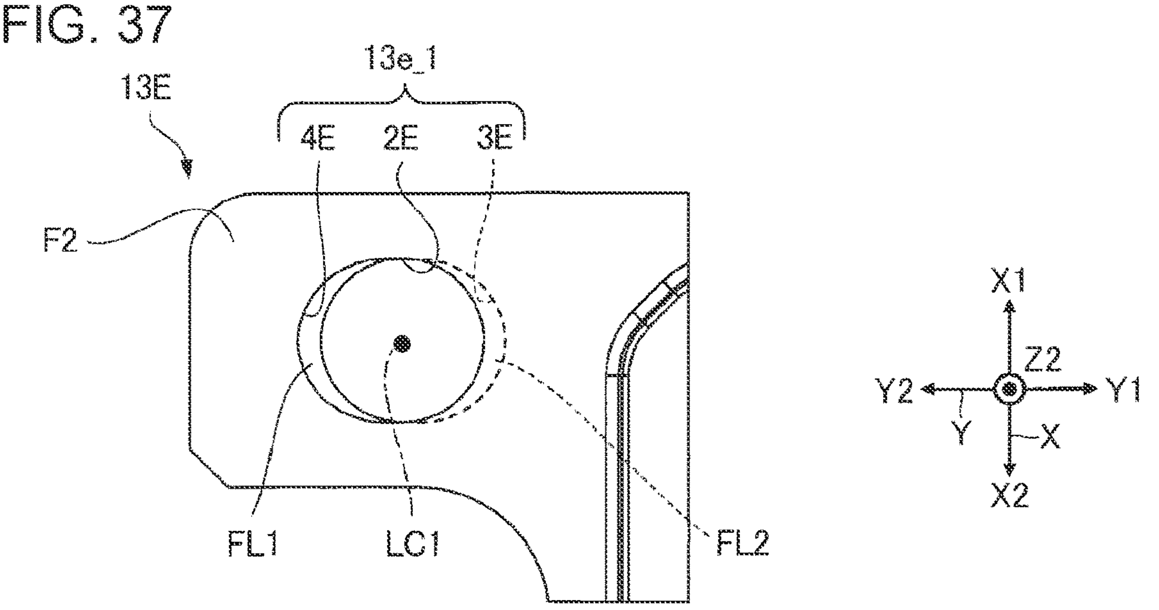
FIG. 37 is a view when a first positioning portion illustrated in FIG. 35 in the Z1 direction.

FIG. 35 is a view when the first positioning portion 13*e*_1 of the liquid ejecting head according to Modification Example 1 is viewed in the Z2 direction. FIG. 36 is a sectional view taken along line XXXVI-XXXVI in FIG. 35. FIG. 37 is a view when the first positioning portion 13*e*_1 illustrated in FIG. 35 is viewed in the Z1 direction. The first positioning portion 13*e*_1 of the present modification example is configured in the same manner as the first positioning portion 13*e*_1 of the fourth embodiment, except that the configuration has a first through-hole 2E, a first recessed portion 3E, and a second recessed portion 4E instead of the first through-hole 2, the first recessed portion 3C, and the second recessed portion 4C. FIGS. 35 to 37 illustrate a portion of a holder 13E having the first through-hole 2E, the first recessed portion 3E, and the second recessed portion 4E.

Specifically, the present modification example is different from the fourth embodiment in the following point. A shape of the second recessed portion 4E is changed so that the first inclined surface FL1 of the present Modification Example extends to the second surface F2 from a joining portion between the first contact portion CT1 and the first inclined surface FL1. Similarly, the present modification example is different from the fourth embodiment in the following point. The shape of the first recessed portion 3E is changed so that the second inclined surface FL2 of the present Modification Example extends to the first surface F1 from a joining portion between the second contact portion CT2 and the second inclined surface FL2.

Here, it is preferable that the length of the first inclined surface FL1 along the first direction (direction along the Z-axis) is equal to or longer than the total sum of the lengths of the second region RE2 and the third region RE3 along the first direction (direction along the Z-axis). In the present embodiment, the length of the first inclined surface FL1 along the first direction (direction along the Z-axis) is the same as the total sum of the lengths of the second region RE2 and the third region RE3 along the first direction (direction along the Z-axis). Therefore, there is an advantage in that the wall thickness of the member forming the first positioning portion 13*e*_1 is easily secured. In addition, the first inclined surface FL1 can be used as a guide for inserting the first positioning pin 51*b*_1 into the first positioning portion 13*e*_1. As a result, the attachability/detachability of the liquid ejecting head with respect to the support body 51 can be improved. Similarly, it is preferable that the length of the second inclined surface FL2 along the first direction (direction along the Z-axis) is equal to or longer than the total sum of the length of the first region RE1 and the third region RE3 along the first direction (direction along the Z-axis).

According to Modification Example 1 described above, the attachability/detachability can also be improved while required positioning accuracy of the liquid ejecting head with respect to the support body 51 can be secured.

6-2. Modification Example 2

Figure 38:
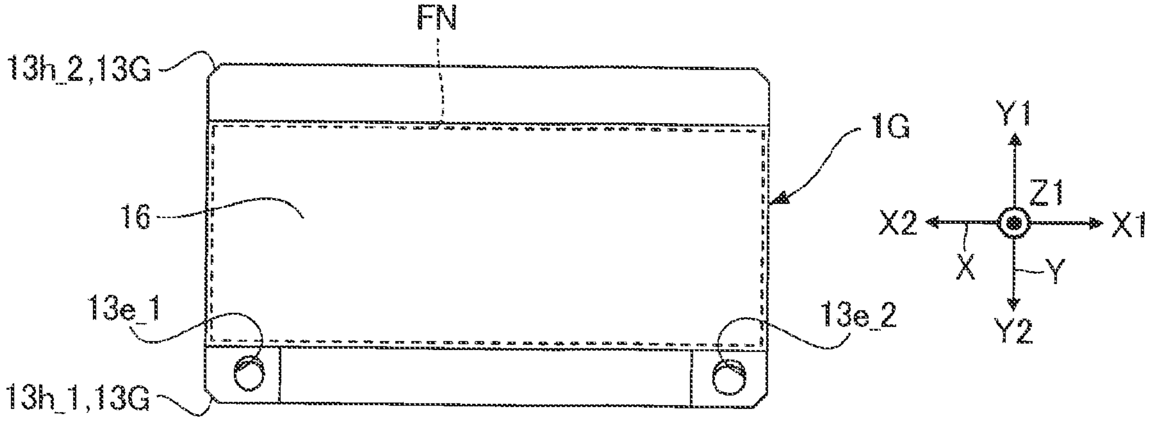
FIG. 38 is a plan view of a liquid ejecting head according to Modification Example 2.

FIG. 38 is a plan view of a liquid ejecting head 1G according to Modification Example 2. In FIG. 38, the liquid ejecting head 1G is schematically illustrated. The liquid ejecting head 1G is configured in the same manner as the liquid ejecting head 1 of the first embodiment described above, except that the configuration has a holder 13G instead of the holder 13.

The holder 13G has a pair of flange portions 13*h* protruding in the Y1 direction and the Y2 direction with respect to the ejecting surface FN in a plan view. The pair of flange portions 13*h* respectively extend in the direction along the X-axis, and the respective surfaces of the pair of flange portions 13*h* directed in the Z2 direction come into contact with the protruding surface FP which is a surface of the support body 51 directed in the Z1 direction. Out of the pair of flange portions 13*h*, a flange portion 13*h*_1 protruding from the ejecting surface FN in the Y2 direction is provided with the first positioning portion 13*e*_1 and the second positioning portion 13*e*_2, and a flange portion 13*h*_2 protruding from the ejecting surface FN in the Y1 direction is not provided with the first positioning portion 13*e*_1 and the second positioning portion 13*e*_2. Although not illustrated, the pair of flange portions 13*h* are appropriately provided with a plurality of holes 13*f*.

In Modification Example 2, the first positioning portion 13*e*_1 and the second positioning portion 13*e*_2 are aligned in the direction along the X-axis. Specifically, the first positioning portion 13_e__1 is provided near an end of the flange portion 13_h__1 in the X2 direction, and the second positioning portion 13_e__2 is provided near an end of the flange portion 13_h__1 in the X1 direction. The direction in which the first positioning portion 13_e__1 and the second positioning portion 13_e__2 are aligned is a direction orthogonal to the direction along the Z-axis and intersecting with the direction along the Y-axis (orthogonal in the present modification example). The direction along the X-axis of the present modification example is an example of a "third direction". In addition, the ejecting surface FN is elongated in the direction along the X-axis which is the direction in which the first positioning portion 13_e__1 and the second positioning portion 13_e__2 are aligned. Incidentally, for example, when the first positioning portion 13_e__1 is provided near the end of the flange portion 13_h__1 in the X2 direction and the second positioning portion 13_e__2 is provided near the end of the flange portion 13_h__2 in the X1 direction, the direction in which the first positioning portion 13_e__1 and the second positioning portion 13_e__2 are aligned is the direction orthogonal to the direction along the Z-axis and intersecting with the direction along the Y-axis without being orthogonal to the direction along the Y-axis.

Figure 39:
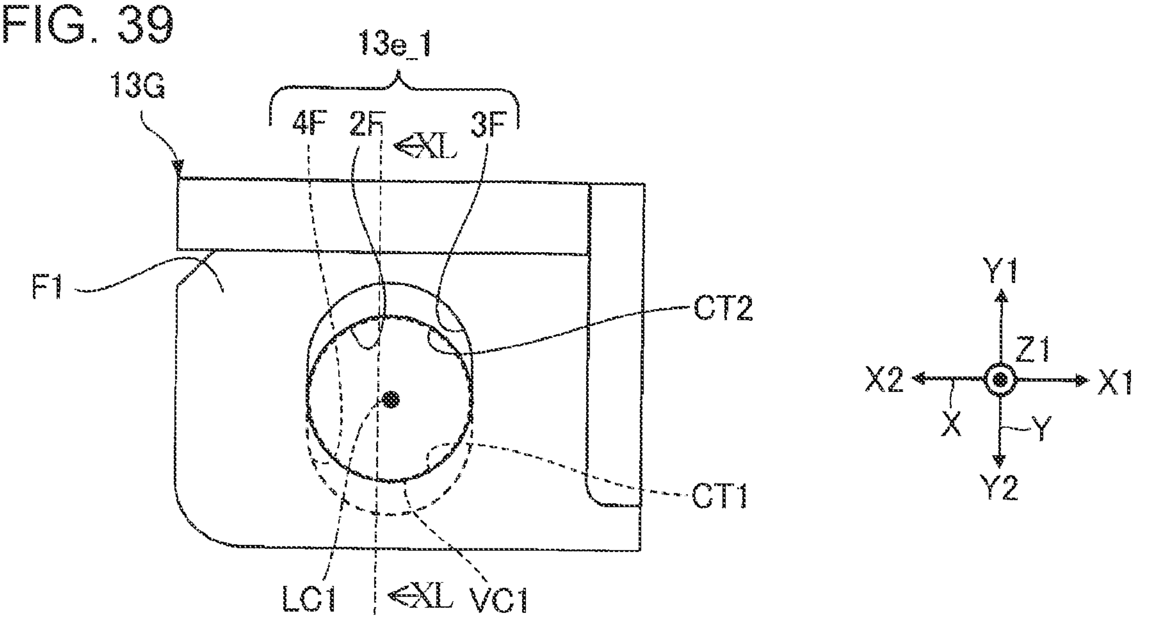
FIG. 39 is a view when a first positioning portion of the liquid ejecting head according to Modification Example 2 is viewed in the Z2 direction.
Figure 40:
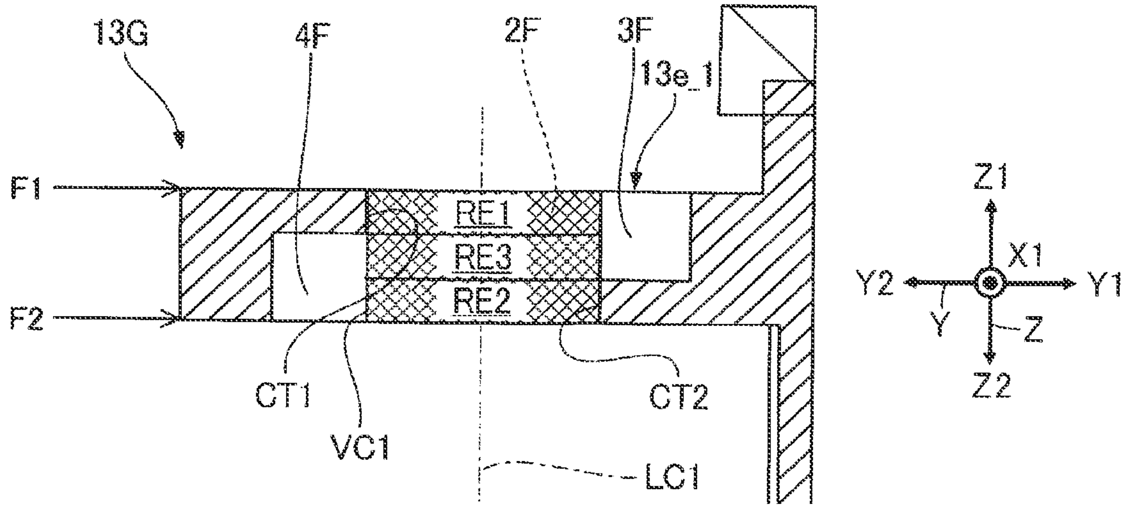
FIG. 40 is a sectional view taken along line XL-XL in FIG. 39.
Figure 41:
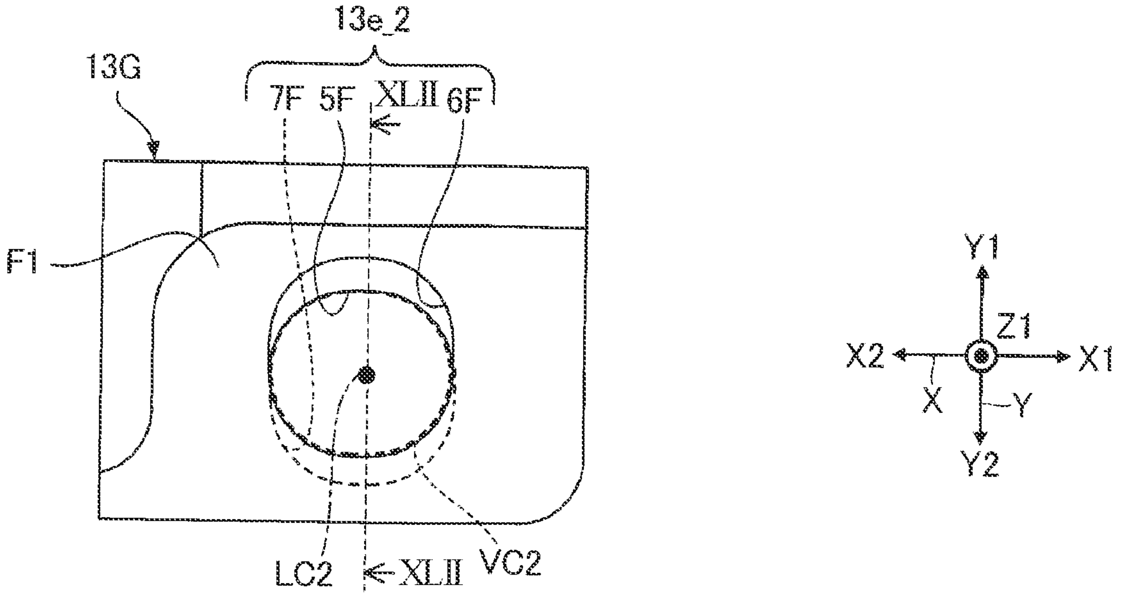
FIG. 41 is a view when a second positioning portion of the liquid ejecting head according to Modification Example 2 is viewed in the Z2 direction.
Figure 42:
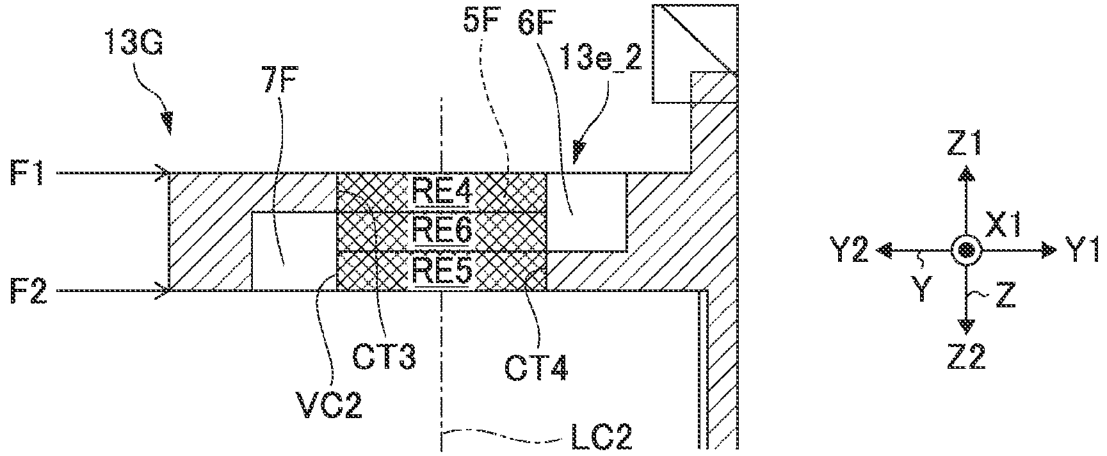
FIG. 42 is a sectional view taken along line XLII-XLII in FIG. 41.

Here, the first positioning portion 13_e__1 and the second positioning portion 13_e__2 of Modification Example 2 will be described. FIG. 39 is a view when the first positioning portion 13_e__1 of the liquid ejecting head 1G according to Modification Example 2 is viewed in the Z2 direction. FIG. 40 is a sectional view taken along line XL-XL in FIG. 39. FIG. 41 is a view when the second positioning portion 13_e__2 of the liquid ejecting head according to Modification Example 2 is viewed in the Z2 direction. FIG. 42 is a sectional view taken along line XLII-XLII in FIG. 41. The first positioning portion 13_e__1 of the present modification example is configured in the same manner as the first positioning portion 13_e__1 of the first embodiment, except that the directions around the Z-axis are different. In addition, the second positioning portion 13_e__2 of the present modification example is configured in the same manner as the second positioning portion 13_e__2 of the first embodiment, except that the directions around the Z-axis are different and the lengths in the directions along the X-axis and the Y-axis are different.

The first positioning portion 13_e__1 of Modification Example 2 is configured in the same manner as an example in which the first positioning portion 13_e__1 of the first embodiment is rotated by 90° counterclockwise around the first center line LC1 when viewed in the Z2 direction. The second positioning portion 13_e__2 of Modification Example 2 is configured in the same manner as an example in which the second positioning portion 13_e__2 of the first embodiment is rotated by 90° counterclockwise around the second center line LC2 and the longitudinal direction of the second through-hole 5 is set as the direction along the X-axis when viewed in the Z2 direction.

The first positioning portion 13_e__1 of Modification Example 2 has the first contact portion CT1 which comes into contact with the side of the first region RE1 in the Y2 direction with respect to the first center line LC1, and the second contact portion CT2 which comes into contact with the side of the second region RE2 in the Y1 direction with respect to the first center line LC1. The first positioning portion 13_e__1 does not come into contact with the portion of the first region RE1 on the side in the Y1 direction with respect to the first center line LC1, does not come into contact with the portion of the second region RE2 on the side in the Y2 direction with respect to the first center line LC1, and does not come into contact with both portions of the third region RE3 on the side in the Y1 direction and the Y2 direction. Here, the direction along the Y-axis is an example of the "second direction", the side in the Y2 direction is an example of the "first side" in the present modification example, and the side in the Y1 direction is an example of the "second side" in the present modification example. In addition, the direction along the Z-axis is an example of the "first direction".

The second positioning portion 13_e__2 of Modification Example 2 has the third contact portion CT3 which comes into contact with the side of the fourth region RE4 in the Y2 direction with respect to the second center line LC2, and the fourth contact portion CT4 which comes into contact with the side of the fifth region RE5 in the Y1 direction with respect to the second center line LC2. The second positioning portion 13_e__2 does not come into contact with the portion of the fourth region RE4 on the side in the Y1 direction with respect to the second center line LC2, does not come into contact with the portion of the fifth region RE5 on the side in the Y2 direction with respect to the second center line LC2, and does not come into contact with both portions of the sixth region RE6 on the side in the Y1 direction and the Y2 direction.

As in the first embodiment, the ejecting surface FN of the liquid ejecting head 1G of the present modification example is disposed on the side in the Y1 direction when viewed from the first positioning portion 13_e__1. In addition, the second region RE2 is disposed in the Z2 direction which is a direction in which the ejecting surface FN faces the first region RE1 in the direction along the Z-axis. In other words, the second region RE2 is closer to the protruding surface FP than the first region RE1 in the direction along the Z-axis. The ejecting surface FN is not disposed on the side in the Y2 direction when viewed from the first positioning portion 13_e__1.

In addition, the ejecting surface FN of the liquid ejecting head 1G is disposed on the side in the Y1 direction when viewed from the second positioning portion 13_e__2. In addition, the fifth region RE5 is disposed in the Z2 direction which is a direction in which the ejecting surface FN faces the fourth region RE4 in the direction along the Z-axis. In other words, the fifth region RE5 is closer to the protruding surface FP than the fourth region RE4 in the direction along the Z-axis. The ejecting surface FN is not disposed on the side in the Y2 direction when viewed from the second positioning portion 13_e__2. In other words, the direction from the second region RE2 toward the first region RE1 (Z1 direction) is the same as the direction from the fifth region RE5 toward the fourth region RE4 (Z1 direction).

According to Modification Example 2 described above, the attachability/detachability can also be improved while required positioning accuracy of the liquid ejecting head with respect to the support body 51 can be secured. In each of the above-described forms, a configuration in which the liquid ejecting head is attached to and detached from the support body 51 by inclining the liquid ejecting head around an axis along a short direction of the liquid ejecting head having a longitudinal shape in a plan view has been described as an example. In Modification Example 2, the liquid ejecting head 1G can be attached to and detached from the support body 51 by inclining the liquid ejecting head 1G around the X-axis along the longitudinal direction of the liquid ejecting head 1G.

6-3. Modification Example 3

Figure 43:
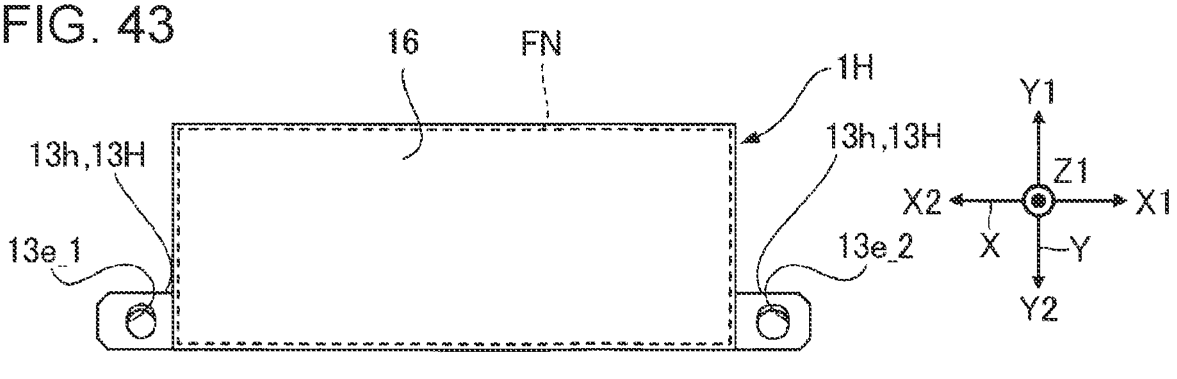
FIG. 43 is a plan view of a liquid ejecting head according to Modification Example 3.

FIG. 43 is a plan view of a liquid ejecting head 1H according to Modification Example 3. The liquid ejecting head 1H is configured in the same manner as the liquid ejecting head 1 of the first embodiment described above, except that the configuration has the holder 13H instead of the holder 13.

The holder 13H has a pair of flange portions 13*h* protruding in the X1 direction and the X2 direction with respect to the ejecting surface FN, near the end of the ejecting surface FN in the Y2 direction in a plan view. The respective surfaces of the pair of flange portions 13*h* directed in the Z2 direction come into contact with the protruding surface FP which is a surface of the support body 51 directed in the Z1 direction. Out of the pair of flange portions 13*h*, the flange portion 13*h* protruding in the X2 direction with respect to the ejecting surface FN is provided with the first positioning portion 13*e*_1, and the flange portion 13*h* protruding in the X1 direction with respect to the ejecting surface FN is provided with the second positioning portion 13*e*_2. Although not illustrated, the pair of flange portions 13*h* are appropriately provided with a plurality of holes 13*f*.

In Modification Example 3, the first positioning portion 13*e*_1 and the second positioning portion 13*e*_2 are aligned in the direction along the X-axis. The direction in which the first positioning portion 13*e*_1 and the second positioning portion 13*e*_2 are aligned is a direction orthogonal to the direction along the Z-axis and intersecting with the direction along the Y-axis (orthogonal in the present modification example). The direction along the X-axis of the present modification example is an example of a "third direction". In addition, the ejecting surface FN is elongated in the direction along the X-axis which is the direction in which the first positioning portion 13*e*_1 and the second positioning portion 13*e*_2 are aligned.

Here, the first positioning portion 13*e*_1 of Modification Example 3 is configured in the same manner as the first positioning portion 13*e*_1 of Modification Example 2 described above. In addition, the second positioning portion 13*e*_2 of Modification Example 3 is configured in the same manner as the second positioning portion 13*e*_2 of Modification Example 2 described above. That is, the first positioning portion 13*e*_1 of the present modification example is the same as the first positioning portion 13*e*_1 of Modification Example 2 illustrated in FIGS. 39 and 40, except that the position of the first positioning portion 13*e*_1 with respect to the ejecting surface FN is different. Specifically, the first region RE1, the third region RE3, and the second region RE2 of the present modification example are aligned in this order in the Z2 direction, and the first contact portion CT1 is located in the Y2 direction with respect to the second contact portion CT2. In addition, the second positioning portion 13*e*_2 of the present modification example is the same as the second positioning portion 13*e*_2 of Modification Example 2 illustrated in FIGS. 41 and 42, except that the position of the second positioning portion 13*e*_2 with respect to the ejecting surface FN is different. Specifically, the fourth region RE4, the sixth region RE6, and the fifth region RE5 of the present modification example are aligned in this order in the Z2 direction, and the third contact portion CT3 is located in the Y2 direction with respect to the fourth contact portion CT4.

The ejecting surface FN of the liquid ejecting head 1H of the present modification example is different from that of Modification Example 2 in that the ejecting surface FN is disposed on the side in the X1 direction when viewed from the first positioning portion 13*e*_1, and is disposed on the side in the X2 direction when viewed from the second positioning portion 13*e*_2. In addition, the second region RE2 is disposed in the Z2 direction which is a direction in which the ejecting surface FN faces the first region RE1 in the direction along the Z-axis, and the fifth region RE5 is disposed in the Z2 direction which is a direction in which the ejecting surface FN faces the fourth region RE4 in the direction along the Z-axis. In other words, the second region RE2 is closer to the protruding surface FP than the first region RE1 in the direction along the Z-axis, and the fifth region RE5 is closer to the protruding surface FP than the fourth region RE4 in the direction along the Z-axis. In other words, the direction from the second region RE2 toward the first region RE1 (Z1 direction) is the same as the direction from the fifth region RE5 toward the fourth region RE4 (Z1 direction). The positions of the first positioning portion 13*e*_1 and the second positioning portion 13*e*_2 on the Y-axis are located in the Y2 direction from the center of the ejecting surface FN in the direction along the Y-axis, and specifically, are positions the same as that of the end portion of the ejecting surface FN in the Y2 direction. The ejecting surface FN is not disposed on the side in the Y1 direction and on the side the Y2 direction when viewed from the first positioning portion 13*e*_1, and the ejecting surface FN is not disposed on the side in the Y1 direction and on the side in the Y2 direction when viewed from the second positioning portion 13*e*_2.

According to Modification Example 3 described above, the attachability/detachability can also be improved while required positioning accuracy of the liquid ejecting head 1H with respect to the support body 51 can be secured.

6-4. Modification Example 4

Figure 44:
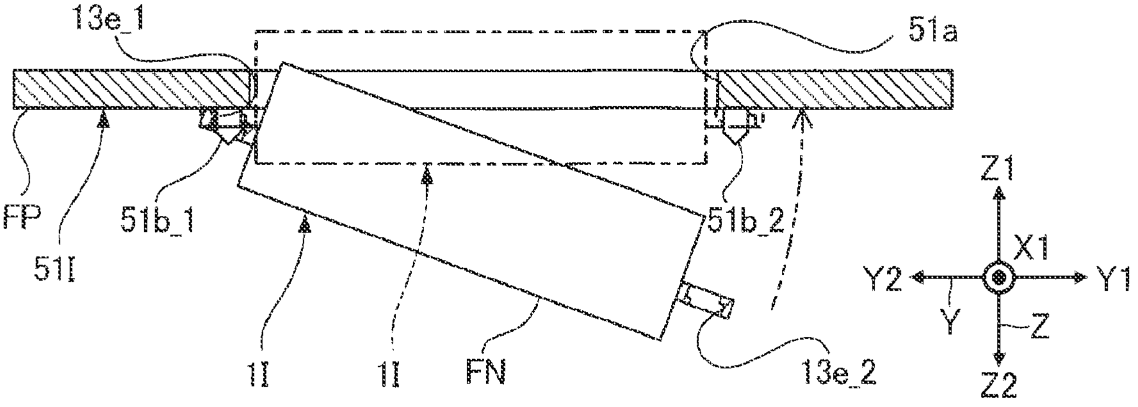
FIG. 44 is a schematic view for describing an example in which a liquid ejecting head according to Modification Example 4 is attached to and detached from a support body.

FIG. 44 is a schematic view for describing an example in which a liquid ejecting head 1I according to Modification Example 4 is attached to and detached from a support body 51I. In each of the above-described forms, a configuration in which the first positioning pin 51*b*_1 and the second positioning pin 51*b*_2 are provided on the protruding surface FP which is a surface directed in the direction opposite to the directed direction (Z2 direction) of the ejecting surface FN (Z1 direction) on the surface of the support body 51 has been described as an example. However, in Modification Example 4, the first positioning pin 51*b*_1 and the second positioning pin 51*b*_2 are provided on the surface directed in the direction the same as the directed direction of the ejecting surface FN on the surface of the support body 51I. The liquid ejecting head 1I is attached to the support body 51I so that the surface opposite to the ejecting surface FN is inserted into the opening portion 51*a* of the support body 51I.

Figure 45:
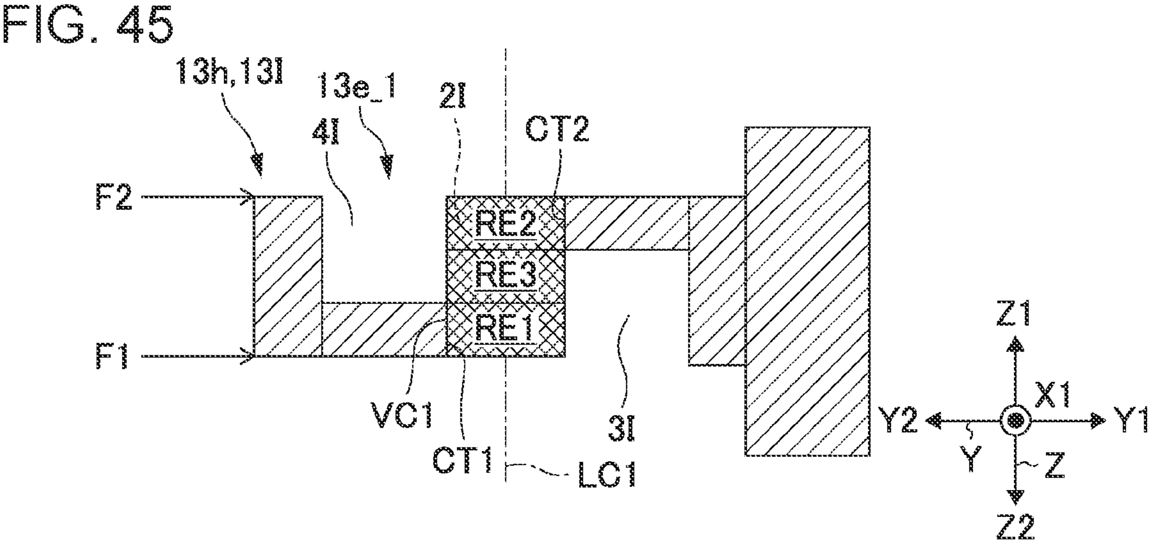
FIG. 45 is a sectional view of a first positioning portion according to Modification Example 4.
Figure 46:
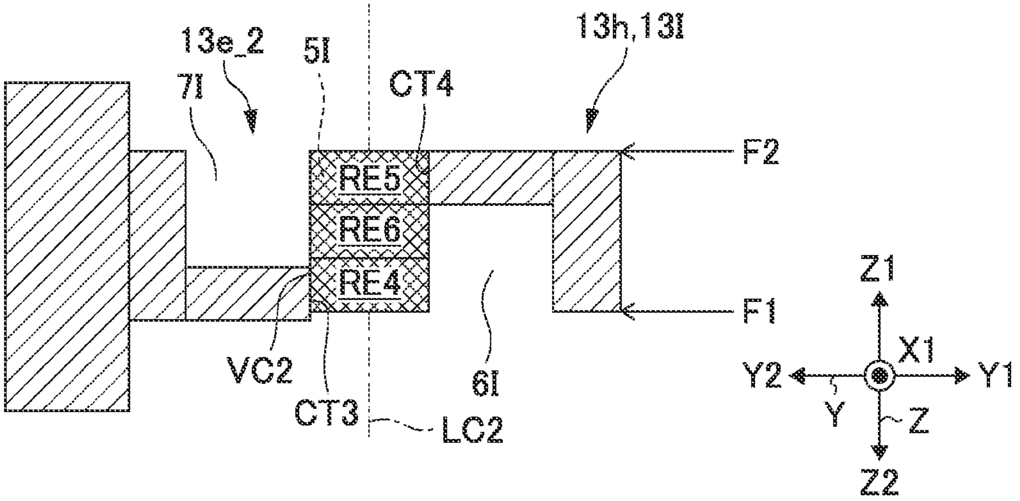
FIG. 46 is a sectional view of a second positioning portion according to Modification Example 4.

FIG. 45 is a sectional view of the first positioning portion 13*e*_1 according to Modification Example 4, and is a view corresponding to FIG. 11 of the first embodiment. FIG. 46 is a sectional view of the second positioning portion 13*e*_2 according to Modification Example 4, and is a view corresponding to FIG. 19 of the first embodiment. The first positioning portion 13*e*_1 and the second positioning portion 13*e*_2 are provided in the flange portion 13*h* of the holder 13I of the liquid ejecting head 1I of Modification Example 4. The first surface F1 of the flange portion 13*h* of the present modification example is directed in the Z2 direction the same as that of the ejecting surface FN. The second surface F2 of the flange portion 13*h* is directed in the Z1 direction which is the direction opposite to the directed direction of the ejecting surface FN. The second surface F2 is a surface of the support body 51I which faces the protruding surface FP.

Although details will be described later, the first positioning portion 13*e*_1 of Modification Example 4 has the configuration the same as that of the first positioning portion 13*e*_1 of the first embodiment, except that the second region RE2, the third region RE3, and the first region RE1 are aligned in this order in the directed direction of the ejecting surface FN (Z2 direction). The second positioning portion 13*e*_2 of Modification Example 4 also has the configuration the same as that of the second positioning portion 13*e*_2 of the first embodiment, except that the fifth region RE5, the sixth region RE6, and the fourth region RE4 are aligned in this order in the directed direction of the ejecting surface FN (Z2 direction).

The first positioning portion 13*e*_1 has a first through-hole 21 penetrating the flange portion 13*h* in the direction along the Z-axis, a first recessed portion 31 formed on the first surface F1, and a second recessed portion 41 formed on the second surface F2. The second recessed portion 41, the first through-hole 21, and the first recessed portion 31 are aligned in this order in the Y1 direction. In addition, the side surface of the first virtual cylinder VC1 set in the first positioning portion 13*e*_1 of the present modification example includes the first region RE1 and the first region RE1, the second region RE2, and the third region RE3 disposed between the first region RE1 and the second region RE2, as three regions divided in the first direction (direction along the Z-axis). The second region RE2, the third region RE3, and the first region RE1 are aligned in this order in the directed direction of the ejecting surface FN faces (Z2 direction). Although not illustrated, as in the first embodiment, a shape of the first virtual cylinder VC1 in a plan view is a perfect circle.

The first region RE1 comes into contact with the first contact portion CT1 of the first positioning portion 13*e*_1 in the portion on the first side (side in the Y2 direction) in the second direction (direction along the Y-axis) with respect to the first center line LC1, and does not come into contact with the first positioning portion 13*e*_1 in the portion on the second side (side in the Y1 direction) in the second direction (direction along the Y-axis) with respect to the first center line LC1. The second region RE2 comes into contact with the second contact portion CT2 of the first positioning portion 13*e*_1 in the portion on the second side (side in the Y1 direction) in the second direction (direction along the Y-axis) with respect to the first center line LC1, and does not come into contact with the first positioning portion 13*e*_1 in the portion on the first side (side in the Y2 direction) in the second direction (direction along the Y-axis) with respect to the first center line LC1. The third region RE3 does not come into contact with the first positioning portion 13*e*_1 in both portions on the second side (side in the Y1 direction) and the first side (side in the Y2 direction) with respect to the first center line LC1.

The second positioning portion 13*e*_2 has a second through-hole 51 penetrating the flange portion 13*h* in the direction along the Z-axis, a third recessed portion 61 formed on the first surface F1, and a fourth recessed portion 71 formed on the second surface F2. The fourth recessed portion 71, the second through-hole 51, and the third recessed portion 61 are aligned in this order in the Y1 direction. In addition, the side surface of the second virtual cylinder VC2 set in the second positioning portion 13*e*_2 of the present modification example includes the fourth region RE4, the fifth region RE5, and the sixth region RE6 disposed between the fourth region RE4 and the fifth region RE5, as three regions divided in the first direction (direction along the Z-axis). The fifth region RE5, the sixth region RE6, and the fourth region RE4 are aligned in this order in the directed direction of the ejecting surface FN (Z2 direction). Although not illustrated, as in the first embodiment, a shape of the second virtual cylinder VC2 in a plan view is an ellipse in which the direction along the Y-axis is set as the longitudinal direction.

The fourth region RE4 comes into contact with the third contact portion CT3 of the second positioning portion 13*e*_2 in the portion on the first side (side in the Y2 direction) with respect to the second center line LC2, and does not come into contact with the second positioning portion 13*e*_2 in the portion on the second side (side in the Y1 direction) with respect to the second center line LC2. The fifth region RE5 comes into contact with the fourth contact portion CT4 of the second positioning portion 13*e*_2 in the portion on the second side (side in the Y1 direction) with respect to the second center line LC2, and does not come into contact with the second positioning portion 13*e*_2 in the portion on the first side (side in the Y2 direction) with respect to the second center line LC2. The sixth region RE6 does not come into contact with the second positioning portion 13*e*_2 in both portions on the second side (side in the Y1 direction) and the first side (side in the Y2 direction) with respect to the second center line LC2.

Here, as illustrated in FIG. 44, the ejecting surface FN is disposed on the second side (side in the Y1 direction) when viewed from the first positioning portion 13*e*_1. The first region RE1 is disposed in the direction in which the ejecting surface FN faces the second region RE2 (Z2 direction) in the first direction (direction along the Z-axis). In other words, the second region RE2 is disposed closer to the protruding surface FP of the support body 51I than the first region RE1 in the first direction (direction along the Z-axis). Similarly, the ejecting surface FN is disposed on the first side (side in the Y2 direction) when viewed from the second positioning portion 13*e*_2, and the fourth region RE4 is disposed in the direction in which the ejecting surface FN faces the fifth region RE5 (Z2 direction) in the first direction (direction along the Z-axis). In other words, the fifth region RE5 is disposed closer to the protruding surface FP of the support body 51I than the fourth region RE4 in the first direction (direction along the Z-axis). According to Modification Example 5 described above, the attachability/detachability can also be improved while required positioning accuracy of the liquid ejecting head 1I with respect to the support body 51I can be secured.

6-5. Modification Example 5

Figure 47:
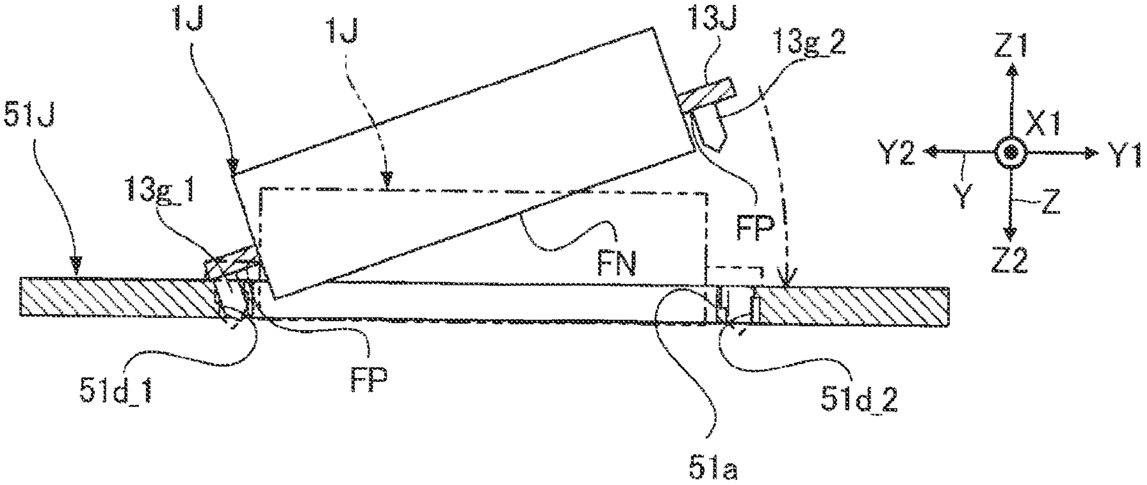
FIG. 47 is a schematic view for describing an example in which a liquid ejecting head according to Modification Example 5 is attached to and detached from a support body.

FIG. 47 is a schematic view for describing an example in which a liquid ejecting head 1J according to Modification Example 5 is attached to and detached from a support body 51J. The liquid ejecting head 1J is configured in the same manner as the liquid ejecting head 1 of the first embodiment, except that the configuration has a first positioning pin 13*g*_1 and a second positioning pin 13*g*_2 instead of the first positioning portion 13*e*_1 and the second positioning portion 13*e*_2. The support body 51J is configured in the same manner as the support body 51 of the first embodiment, except that the configuration has a first positioning portion 51*d*_1 and a second positioning portion 51*d*_2 instead of the first positioning pin 51*b*_1 and the second positioning pin 51*b*_2.

The X-axis, the Y-axis, and the Z-axis in Modification Example 5 are coordinate axes of a local coordinate system based on the three-dimensionally disposed support body 51J. Therefore, FIG. 47 illustrates the coordinate axes of the local coordinate system based on the support body 51J in a state where the liquid ejecting head 1J is supported by the support body 51J. In some cases, the liquid ejecting head 1J having the configuration other than the support body 51J may be described by using the local coordinate system based on the support body 51J in a state where the liquid ejecting head 1J is supported by the support body 51J.

The first positioning pin 13*g*_1 and the second positioning pin 13*g*_2 are configured in the same manner as the first positioning pin 51*b*_1 and the second positioning pin 51*b*_2. However, the first positioning pin 13*g*_1 and the second positioning pin 13*g*_2 respectively protrude from the protruding surface FP in the Z2 direction. The protruding surface FP is a surface directed in the Z2 direction which is the direction the same as that of the ejecting surface FN of the holder 13J.

The first positioning portion 51*d*_1 and the second positioning portion 51*d*_2 are configured in the same manner as the first positioning portion 13*e*_1 and the second positioning portion 13*e*_2. The first positioning pin 13*g*_1 is inserted into the first positioning portion 51*d*_1 with respect to the support body 51J in the Z2 direction. In addition, the second positioning pin 13*g*_2 is inserted into the second positioning portion 51*d*_2 with respect to the support body 51J in the Z2 direction.

Figure 48:
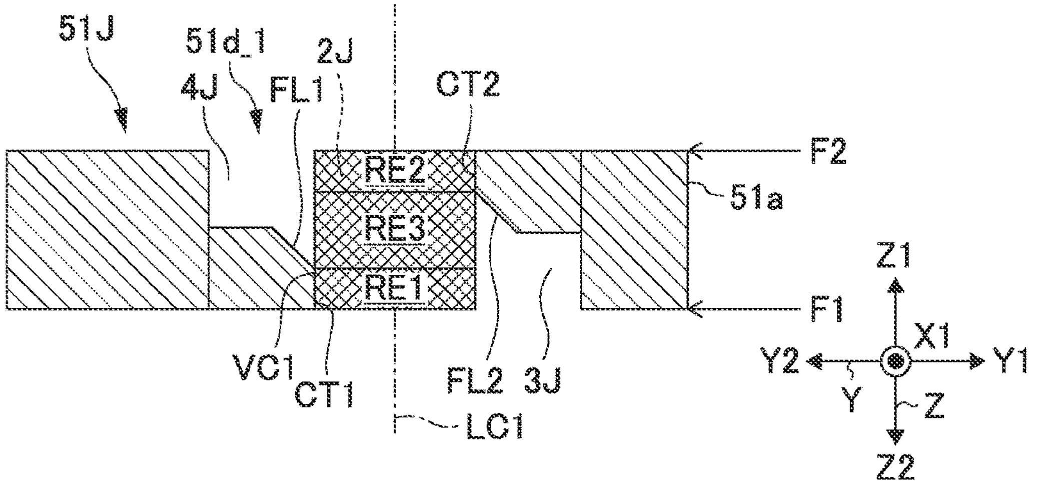
FIG. 48 is a sectional view of a first positioning portion according to Modification Example 5.
Figure 49:
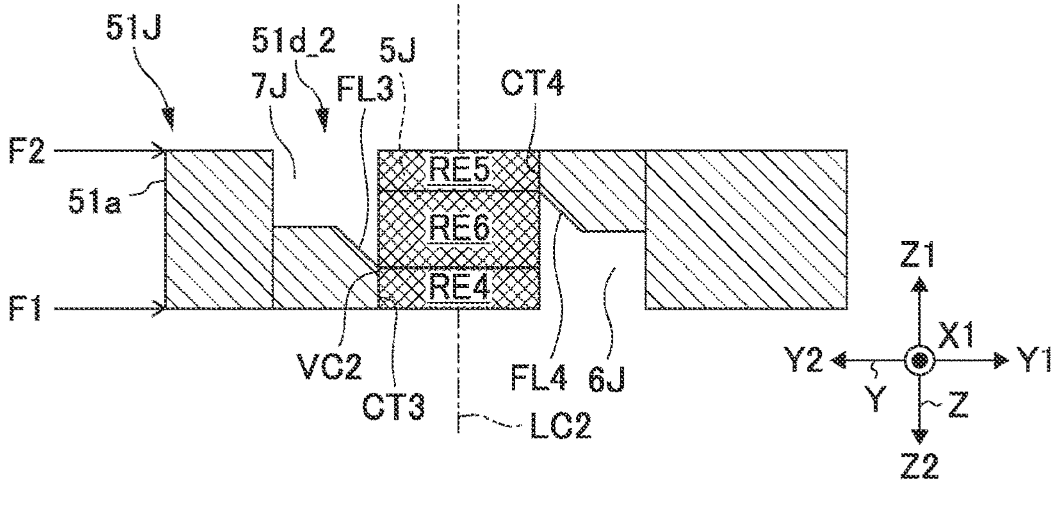
FIG. 49 is a sectional view of a second positioning portion according to Modification Example 5.

FIG. 48 is a sectional view of the first positioning portion 51*d*_1 according to Modification Example 5, and is a view corresponding to FIG. 11 of the first embodiment. FIG. 49 is a sectional view of the second positioning portion 51*d*_2 according to Modification Example 5, and is a view corresponding to FIG. 19 of the first embodiment. The support body 51J has the first surface F1 directed in the Z2 direction which is the direction the same as that of the ejecting surface FN, and the second surface F2 opposite to the first surface F1 and directed in the Z1 direction. The second surface F2 of the support body 51J is a surface facing the protruding surface FP of the liquid ejecting head 1J, and both faces come into contact with each other.

The first positioning portion 51*d*_1 has a first through-hole 2J penetrating the support body 51J in the direction along the Z-axis, a first recessed portion 3J formed on the first surface F1 of the support body 51J, and a second recessed portion 4J formed on the second surface F2 of the support body 51J. The second recessed portion 4J, the first through-hole 2J, and the first recessed portion 3J are aligned in this order in the Y1 direction.

The second positioning portion 51*d*_2 has a second through-hole 5J penetrating the support body 51J in the direction along the Z-axis, a third recessed portion 6J formed on the first surface F1 of the support body 51J, and a fourth recessed portion 7J formed on the second surface F2 of the support body 51J. The fourth recessed portion 7J, the second through-hole 5J, and the third recessed portion 6J are aligned in this order in the Y1 direction.

Here, the side surface of the first virtual cylinder VC1 set in the first positioning portion 51*d*_1 has the first region RE1, the second region RE2, and the third region RE3 disposed between the first region RE1 and the second region RE2, as three regions divided in the first direction (direction along the Z-axis). The first region RE1 comes into contact with the first positioning portion 51*d*_1 on the first side (side in the Y2 direction) which is one side in the second direction (direction along the Y-axis) orthogonal to the first direction (direction along the Z-axis) with respect to the first center line LC1 which is the center line of the first virtual cylinder VC1, and does not come into contact with the first positioning portion 51*d*_1 on the second side (side in the Y1 direction) which is the other side in the second direction (direction along the Y-axis). The second region RE2 does not come into contact with the first positioning portion 51*d*_1 on the first side (side in the Y2 direction) with respect to the first center line LC1, and comes into contact with the first positioning portion 51*d*_1 on the second side (side in the Y1 direction). The third region RE3 does not come into contact with the first positioning portion 51*d*_1 on both the first side (side in the Y2 direction) and the second side (side in the Y1 direction) with respect to the first center line LC1. Although not illustrated, as in the first embodiment, a shape of the first virtual cylinder VC1 in a plan view is a perfect circle.

In addition, the side surface of the second virtual cylinder VC2 set in the second positioning portion 51*d*_2 has the fourth region RE4, the fifth region RE5, and the sixth region RE6 disposed between the fourth region RE4 and the fifth region RE5, as three regions divided in the first direction (direction along the Z-axis). The fourth region RE4 comes into contact with the second positioning portion 51*d*_2 on the side in the Y2 direction, and does not come into contact with the second positioning portion 51*d*_2 on the side in the Y1 direction, with respect to the second center line LC2 which is the center line of the second virtual cylinder VC2. The fifth region RE5 does not come into contact with the second positioning portion 51*d*_2 on the side in the Y2 direction, and comes into contact with the second positioning portion 51*d*_2 on the side in the Y1 direction, with respect to the second center line LC2. The sixth region RE6 does not come into contact with the second positioning portion 51*d*_2 on both sides in the Y2 direction and the Y1 direction, with respect to the second center line LC2. Although not illustrated, as in the first embodiment, a shape of the second virtual cylinder VC2 in a plan view is an ellipse in which the direction along the Y-axis is set as the longitudinal direction.

In addition, the support body 51J includes the opening portion 51*a* into which a portion of the liquid ejecting head 1J is inserted. In the present modification example, a portion of the liquid ejecting head 1J including the ejecting surface FN is inserted into the opening portion 51*a*. The opening portion 51*a* is disposed on the second side (side in the Y1 direction) when viewed from the first positioning portion 51*d*_1. When the plurality of liquid ejecting heads 1J are inserted into one opening portion 51*a* as in the first embodiment, the "opening portion 51*a*" described here indicates only a space into which one liquid ejecting head 1J is inserted in the opening portion 51*a*. In other words, the opening portion 51*a* corresponding to the liquid ejecting head 1J is not disposed on the first side (side in the Y2 direction) when viewed from the first positioning portion 51*d*_1. The second region RE2 is disposed closer to the protruding surface FP on which the first positioning pin 13*g*_1 of the liquid ejecting head 1J protrudes than the first region RE1 in the first direction (direction along the Z-axis).

Similarly, the opening portion 51*a* is disposed on the first side (side in the Y2 direction) when viewed from the second positioning portion 51*d*_2. Although the description is repeated, when the plurality of liquid ejecting heads 1J are inserted into one opening portion 51*a*, the "opening portion 51*a*" described here indicates only the space into which one liquid ejecting head 1J is inserted in the opening portion 51*a*. In other words, the opening portion 51*a* corresponding to the liquid ejecting head 1J is not disposed on the second side (side in the Y1 direction) when viewed from the second positioning portion 51*d*_2. The fifth region RE5 is disposed closer to the protruding surface FP of the liquid ejecting head 1J than the fourth region RE4 in the first direction (direction along the Z-axis). In other words, the direction from the first region RE1 toward the second region RE2 (Z1 direction) and the direction from the fourth region RE4 toward the fifth region RE5 (Z1 direction) are the same as each other.

The first positioning portion 51*d*_1 may have the first inclined surface FL1 and the second inclined surface FL2, as in the first positioning portion 13*e*_1 of the fourth embodiment, the fifth embodiment, or Modification Example 1 which are described above. In this case, the first positioning portion 51*d*_1 includes the first contact portion CT1 which comes into contact with the portion of the first region RE1 on the first side (side in the Y2 direction) with respect to the first center line LC1, and the first inclined surface FL1 continuous with the first contact portion CT1 and extending in the direction intersecting with the first direction (direction along the Z-axis) without being orthogonal to the first direction. Furthermore, the first positioning portion 51*d*_1 includes the second contact portion CT2 which comes into contact with the portion of the second region RE2 on the second side (side in the Y1 direction) with respect to the first center line LC1, and the second inclined surface FL2 continuous with the second contact portion CT2 and extends in the direction intersecting with the first direction (direction along the Z-axis) without being orthogonal to the first direction.

Similarly, the second positioning portion 51*d*_2 may have the third inclined surface FL3 and the fourth inclined surface FL4, as in the second positioning portion 13*e*_2 of the fourth embodiment described above. In this case, the second positioning portion 51*d*_2 includes the third contact portion CT3 which comes into contact with the portion of the first region RE1 on the first side (side in the Y2 direction) with respect to the second center line LC2, the fourth contact portion CT4 which comes into contact with the portion of the fifth region RE5 on the second side (side in the Y1 direction) with respect to second center line LC2, third inclined surface FL3 continuous with the third contact portion CT3 and extending in the direction intersecting with the first direction (direction along the Z-axis) without being orthogonal to the first direction, and the fourth inclined surface FL4 continuous with the fourth contact portion CT4 and extending in the direction intersecting with the first direction (direction along the Z-axis) without being orthogonal to the first direction.

As described above, the support body 51J includes the second positioning portion 51*d*_2 that positions the liquid ejecting head 1J by being inserted into the second positioning pin 13*g*_2 provided in the liquid ejecting head 1J. The first positioning portion 51*d*_1 and the second positioning portion 51*d*_2 are aligned in the second direction (direction along the Y-axis). Specifically, the second positioning portion 51*d*_2 is disposed in the Y1 direction with respect to the first positioning portion 51*d*_1.

According to the liquid ejecting apparatus including the support body 51J and the liquid ejecting head 1J of Modification Example 5 described above, the attachability/detachability can also be improved while required positioning accuracy of the liquid ejecting head 1J with respect to the support body 51J can be secured.

A part or all of each of the above-described embodiments and each of the above-described modification examples, and combinations thereof may be applied to the support body 51J of the present modification example within the scope in which the combinations do not contradict each other.

6-6. Modification Example 6

In each of the above-described embodiments and each of the above-described modification examples, the positioning pin is press-fitted to the positioning portion by press-fitting, but the present disclosure is not limited thereto. The liquid ejecting head may be positioned with respect to the support body by inserting the positioning pin into the positioning portion by clearance-fitting. Here, the clearance-fitting when the positioning pin is inserted into the positioning portion indicates that the maximum length of the positioning pin when viewed in the depth direction of the positioning portion is smaller than the diameter of the cross section perpendicular to the depth direction of the virtual regular cylinder inserted to the deepest position of the positioning portion and having the maximum cross-sectional area when viewed in the depth direction of the positioning portion. That is, any insertion method may be used so that the positioning pin does not come into contact with the positioning portion or comes into contact with the positioning portion only at one location of the positioning pin. Even according to this insertion method, the attachability/detachability of the liquid ejecting head with respect to the support body can be improved by adopting the configuration of the positioning portion described in each embodiment and each modification example.

6-7. Modification Example 7

In each of the above embodiments and each of the above-described modification examples, a so-called serial printer has been adopted to perform a printing operation by ejecting the ink from the liquid ejecting head while a carriage including the support body reciprocates in a direction orthogonal to the transport direction DM of the medium M. However, the present disclosure is not limited to this aspect. For example, the present disclosure may adopt a line printer equipped with a line head having a printing region larger than the width in the direction orthogonal to the transport direction DM of the medium M by aligning the plurality of liquid ejecting heads in the direction orthogonal to the transport direction DM of the medium M. That is, the support body may be a print bar for supporting the plurality of liquid ejecting heads to form the line head.

6-8. Modification Example 8

The liquid ejecting apparatus described as an example in the above-described embodiment can be adopted in various types of apparatuses such as a facsimile apparatus and a copy machine, in addition to an apparatus dedicated to printing. However, the application of the liquid ejecting apparatus is not limited to the printing. For example, a liquid ejecting apparatus that ejects a solution of a coloring material is used as a manufacturing apparatus for forming a color filter of a display apparatus such as a liquid crystal display panel. In addition, a liquid ejecting apparatus that ejects a solution of a conductive material is used as a manufacturing apparatus for forming wires or electrodes on a wiring substrate. In addition, a liquid ejecting apparatus that ejects a solution of an organic substance related to a living body is used as a manufacturing apparatus for manufacturing a biochip, for example.

7. OTHER FORMS

The present disclosure is not limited to the above-described embodiments, and can be realized in various forms within the scope not departing from the concept of the present disclosure. For example, the present disclosure can also be realized by the following forms (aspects). In order to partially or entirely solve the problems of the present disclosure, or in order to partially or entirely achieve advantageous effects of the present disclosure, technical features in the above-described embodiments corresponding to technical features in each form described below can be replaced or combined with each other as appropriate. In addition, when the technical features are not described herein as essential elements, the technical features can be deleted as appropriate.

(1) According to a first aspect of the present disclosure, there is provided a liquid ejecting head supported by a support body having a first positioning pin and ejecting a liquid. The liquid ejecting head includes a first positioning portion that positions the liquid ejecting head with respect to the support body by inserting the first positioning pin. When a virtual cylinder inserted to a deepest position of the first positioning portion and having a maximum cross-sectional area when viewed in a first direction which is a depth direction of the first positioning portion is defined as a first virtual cylinder, a side surface of the first virtual cylinder includes a first region, a second region, and a third region disposed between the first region and the second region, as three regions divided in the first direction. The first region comes into contact with the first positioning portion on a first side which is one side in a second direction orthogonal to the first direction, and does not come into contact with the first positioning portion on a second side which is the other side in the second direction, with respect to a first center line which is a center line of the first virtual cylinder. The second region does not come into contact with the first positioning portion on the first side, and comes into contact with the first positioning portion on the second side, with respect to the first center line. The third region does not come into contact with the first positioning portion on both the first side and the second side, with respect to the first center line.

(2) In the above-described form, the liquid ejecting head may further include a first member having the first positioning portion. The first member may have a first surface and a second surface on a side opposite to the first surface. The first positioning portion may include a first through-hole penetrating from the second surface to the first surface in the first direction, a first recessed portion provided on the first surface, and a second recessed portion provided on the second surface. The first through-hole may be disposed between the first recessed portion and the second recessed portion in the second direction. The first virtual cylinder may extend from the first surface to the second surface along the first through-hole.

(3) In the above-described form, the liquid ejecting head may further include a first member having a bottomed hole having a bottom wall as the first positioning portion. The deepest position may be the bottom wall.

(4) In the above-described form, a length of the first region along the first direction and a length of the second region along the first direction may be equal to each other.

(5) In the above-described form, lengths of the first region and the second region along the first direction may be respectively 20% or more and 45% or less of a length of the first virtual cylinder along the first direction.

(6) In the above embodiment, the first positioning portion may have a first contact portion which comes into contact with the first side of the first region with respect to the first center line, and a second contact portion which comes into contact with the second side of the second region with respect to the first center line. The first contact portion and the second contact portion may respectively and continuously extend in the first direction.

(7) In the above-described form, the liquid ejecting head may further include an ejecting surface having a plurality of nozzles ejecting the liquid. The ejecting surface may be disposed on the second side when viewed from the first positioning portion. The second region may be disposed in a direction in which the ejecting surface faces the first region in the first direction.

(8) In the above-described form, the liquid ejecting head may further include an ejecting surface having a plurality of nozzles ejecting the liquid. The ejecting surface may be disposed on the second side when viewed from the first positioning portion. The first region may be disposed in a direction in which the ejecting surface faces the second region in the first direction.

(9) In the above-described form, the first positioning portion may include a first contact portion which comes into contact with the first side of the first region with respect to the first center line, and a first inclined surface which is a surface continuous with the first contact portion and extends in a direction intersecting with the first direction without being orthogonal to the first direction.

(10) In the above-described form, a length of the first inclined surface along the first direction may be equal to or longer than a sum of lengths of the second region and the third region along the first direction.

(11) In the above-described form, the first positioning portion may have a second contact portion which comes into contact with the second side of the second region with respect to the first center line, and a second inclined surface which is a surface continuous with the second contact portion and extends in a direction intersecting with the first direction without being orthogonal to the first direction. The first inclined surface and the second inclined surface may be parallel to each other.

(12) In the above-described form, the first inclined surface and the second inclined surface may have portions overlapping each other when viewed in the second direction.

(13) In the above embodiment, the first positioning portion may have a second contact portion which comes into contact with the second side of the second region with respect to the first center line. In a cross section obtained by cutting the first positioning portion on a plane parallel to both the first direction and the second direction at a position where the first virtual cylinder has a maximum length along the second direction when viewed in the first direction, at positions in a third direction orthogonal to the first direction and the second direction, an angle formed by a line segment joining the first contact portion and the second contact portion at a shortest distance and the first inclined surface may be 90 degrees or larger.

(14) In the above-described form, the liquid ejecting head may further include a second positioning portion that positions the liquid ejecting head with respect to the support body by inserting a second positioning pin provided in the support body. The first positioning portion and the second positioning portion may be aligned in the second direction.

(15) In the above embodiment, the second positioning portion may be disposed on the second side with respect to the first positioning portion. The second region may be disposed closer to a protruding surface on which the first positioning pin of the support body protrudes from the first region in the first direction.

(16) In the above-described form, when a virtual cylinder inserted to a deepest position of the second positioning portion and having a maximum cross-sectional area when viewed in the first direction is defined as a second virtual cylinder, a side surface of the second virtual cylinder may include a fourth region, a fifth region, and a sixth region disposed between the fourth region and the fifth region, as three regions divided in the first direction. The fourth region may come into contact with the second positioning portion on the first side, and may not come into contact with the second positioning portion on the second side, with respect to a second center line which is a center line of the second virtual cylinder. The fifth region may not come into contact with the second positioning portion on the first side, and may come into contact with the second positioning portion on the second side, with respect to the second center line. The sixth region may not come into contact with the second positioning portion on both the first side and the second side with respect to the second center line. A direction from the second region toward the first region may be the same as a direction from the fifth region toward the fourth region.

(17) In the above-described form, the liquid ejecting head may further include a second positioning portion that positions the liquid ejecting head with respect to the support body by inserting a second positioning pin provided in the support body. The first positioning portion and the second positioning portion may be aligned in a third direction orthogonal to the first direction and intersecting with the second direction. When a virtual cylinder inserted to a deepest position of the second positioning portion and having a maximum cross-sectional area when viewed in the first direction is defined as a second virtual cylinder, a side surface of the second virtual cylinder may include a fourth region, a fifth region, and a sixth region disposed between the fourth region and the fifth region, as three regions divided in the first direction. The fourth region may come into contact with the second positioning portion on the first side, and may not come into contact with the second positioning portion on the second side, with respect to a second center line which is a center line of the second virtual cylinder. The fifth region may not come into contact with the second positioning portion on the first side, and may come into contact with the second positioning portion on the second side, with respect to the second center line. The sixth region may not come into contact with the second positioning portion on both the first side and the second side, with respect to the second center line. A direction from the second region toward the first region may be the same as a direction from the fifth region toward the fourth region.

(18) According to a second aspect of the present disclosure, it is possible to provide a liquid ejecting apparatus including the liquid ejecting head according to the above-described forms and a support body including the first positioning pin.

(19) In the above-described form, the first positioning portion may have a first contact portion which comes into contact with the first side of the first region with respect to the first center line and a second contact portion which comes into contact with the second side of the second region with respect to the first center line. In a cross section obtained by cutting the first positioning portion on a plane along both the first direction and the second direction at a position where the first virtual cylinder has a maximum length along the second direction when viewed in the first direction, at positions in a third direction orthogonal to the first direction and the second direction, a shortest distance between the first contact portion and the second contact portion may be equal to or longer than a maximum length of the first positioning pin along the second direction.

(20) According to a third aspect of the present disclosure, there is provided a support body for supporting a liquid ejecting head ejecting a liquid. The support body includes a first positioning portion that positions the liquid ejecting head with respect to the support body by inserting a first positioning pin provided in the liquid ejecting head. When a virtual cylinder inserted to a deepest position of the first positioning portion and having a maximum cross-sectional area when viewed in a first direction which is a depth direction of the first positioning portion is defined as a first virtual cylinder, a side surface of the first virtual cylinder may include a first region, a second region, and a third region disposed between the first region and the second region, as three regions divided in the first direction. The first region may come into contact with the first positioning portion on a first side which is one side in a second direction orthogonal to the first direction, and may not come into contact with the first positioning portion on a second side which is the other side in the second direction, with respect to a first center line which is a center line of the first virtual cylinder. The second region may not come into contact with the first positioning portion on the first side, and comes into contact with the first positioning portion on the second side, with respect to the first center line. The third region may not come into contact with the first positioning portion on both the first side and the second side, with respect to the first center line.

(21) According to the above-described form, the support may further include an opening portion into which a portion of the liquid ejecting head is inserted. The opening portion may be disposed on the second side when viewed from the first positioning portion.

(22) According to the above-described form, the first positioning portion may include a first contact portion which comes into contact with the first side of the first region with respect to the first center line, and a first inclined surface which is a surface continuous with the first contact portion and extends in a direction intersecting with the first direction without being orthogonal to the first direction.

(23) According to the above-described form, the support body may further include a second positioning portion that positions the liquid ejecting head with respect to the support body by inserting a second positioning pin provided in the liquid ejecting head. The first positioning portion and the second positioning portion may be aligned in the second direction.

(24) According to a fourth aspect of the present disclosure, it is possible to provide a liquid ejecting apparatus including the support body according to the above-described form and a liquid ejecting head including the first positioning pin.

(25) According to a fifth aspect of the present disclosure, there is provided a liquid ejecting head supported by a support body having a first positioning pin and ejecting a liquid. The liquid ejecting head includes a first member having a first positioning portion that positions the liquid ejecting head with respect to the support body by inserting the first positioning pin. The first member may have a first surface and a second surface on a side opposite to the first surface. The first positioning portion may include a first through-hole penetrating from the second surface to the first surface in a first direction, a first recessed portion provided on the first surface, and a second recessed portion provided on the second surface. The first through-hole may be disposed between the first recessed portion and the second recessed portion in a second direction orthogonal to the first direction. A portion of the first recessed portion and a portion of the second recessed portion may overlap each other when viewed in the second direction.

What is claimed is:

1. A liquid ejecting head configured to be supported by a support body having a first positioning pin and configured to eject a liquid, comprising:

a first positioning portion that positions the liquid ejecting head with respect to the support body by inserting the first positioning pin, wherein when a virtual cylinder inserted to a deepest position of the first positioning portion and having a maximum cross-sectional area when viewed in a first direction which is a depth direction of the first positioning portion is defined as a first virtual cylinder, a side surface of the first virtual cylinder includes a first region, a second region, and a third region disposed between the first region and the second region, as three regions divided in the first direction, the first region comes into contact with the first positioning portion on a first side which is one side in a second direction orthogonal to the first direction, and does not come into contact with the first positioning portion on a second side which is the other side in the second direction, with respect to a first center line which is a center line of the first virtual cylinder, the second region does not come into contact with the first positioning portion on the first side, and comes into contact with the first positioning portion on the second side, with respect to the first center line, and the third region does not come into contact with the first positioning portion on both the first side and the second side, with respect to the first center line.

2. The liquid ejecting head according to claim 1, further comprising:

a first member having the first positioning portion, wherein the first member has a first surface and a second surface that is opposite from the first surface, the first positioning portion includes a first through-hole penetrating from the second surface to the first surface in the first direction, a first recessed portion provided on the first surface, and a second recessed portion provided on the second surface, the first through-hole is disposed between the first recessed portion and the second recessed portion regarding the second direction, and the first virtual cylinder extends from the first surface to the second surface along the first through-hole.

3. The liquid ejecting head according to claim 1, further comprising:

a first member having a bottomed hole having a bottom wall as the first positioning portion, wherein the deepest position is the bottom wall.

4. The liquid ejecting head according to claim 1, wherein a length of the first region along the first direction and a length of the second region along the first direction are equal to each other.

5. The liquid ejecting head according to claim 1, wherein lengths of the first region and the second region along the first direction are respectively 20% or more and 45% or less of a length of the first virtual cylinder along the first direction.

6. The liquid ejecting head according to claim 1, further comprising:

an ejecting surface having nozzles configured to eject the liquid, wherein the ejecting surface is disposed on the second side when viewed from the first positioning portion, and the second region is disposed in a direction in which the ejecting surface faces with respect to the first region regarding the first direction.

7. The liquid ejecting head according to claim 1, further comprising:

an ejecting surface having nozzles configured to eject the liquid, wherein the ejecting surface is disposed on the second side when viewed from the first positioning portion, and the first region is disposed in a direction in which the ejecting surface faces with respect to the second region regarding the first direction.

8. The liquid ejecting head according to claim 1, wherein the first positioning portion includes a first contact portion which comes into contact with the first side of the first region with respect to the first center line, and a first inclined surface which is a surface continuous with the first contact portion and extends in a direction intersecting with the first direction without being orthogonal to the first direction.

9. The liquid ejecting head according to claim 8, wherein a length of the first inclined surface along the first direction is equal to or longer than a sum of lengths of the second region and the third region along the first direction.

10. The liquid ejecting head according to claim 8, wherein the first positioning portion has a second contact portion which comes into contact with the second side of the second region with respect to the first center line, and a second inclined surface which is a surface continuous with the second contact portion and extends in a direction intersecting with the first direction without being orthogonal to the first direction, and the first inclined surface and the second inclined surface are parallel to each other.

11. The liquid ejecting head according to claim 1, further comprising:

a second positioning portion that positions the liquid ejecting head with respect to the support body by inserting a second positioning pin provided in the support body, wherein the first positioning portion and the second positioning portion are aligned in the second direction.

12. The liquid ejecting head according to claim 11, wherein the second positioning portion is disposed on the second side with respect to the first positioning portion, and the second region is closer to a protruding surface on which the first positioning pin of the support body protrudes than is the first region regarding the first direction.

13. The liquid ejecting head according to claim 11, wherein when a virtual cylinder inserted to a deepest position of the second positioning portion and having a maximum cross-sectional area when viewed in the first direction is defined as a second virtual cylinder, a side surface of the second virtual cylinder includes a fourth region, a fifth region, and a sixth region disposed between the fourth region and the fifth region, as three regions divided in the first direction, the fourth region comes into contact with the second positioning portion on the first side, and does not come into contact with the second positioning portion on the second side, with respect to a second center line which is a center line of the second virtual cylinder, the fifth region does not come into contact with the second positioning portion on the first side, and comes into contact with the second positioning portion on the second side, with respect to the second center line, the sixth region does not come into contact with the second positioning portion on both the first side and the second side with respect to the second center line, and a direction from the second region toward the first region is the same as a direction from the fifth region toward the fourth region.

14. A liquid ejecting apparatus comprising:

the liquid ejecting head according to claim 1; and a support body including the first positioning pin.

15. A support body for supporting a liquid ejecting head configured to eject a liquid, comprising:

a first positioning portion that positions the liquid ejecting head with respect to the support body by inserting a first positioning pin provided in the liquid ejecting head, wherein when a virtual cylinder inserted to a deepest position of the first positioning portion and having a maximum cross-sectional area when viewed in a first direction which is a depth direction of the first positioning portion is defined as a first virtual cylinder, a side surface of the first virtual cylinder includes a first region, a second region, and a third region disposed between the first region and the second region, as three regions divided in the first direction, the first region comes into contact with the first positioning portion on a first side which is one side in a second direction orthogonal to the first direction, and does not come into contact with the first positioning portion on a second side which is the other side in the second direction, with respect to a first center line which is a center line of the first virtual cylinder, the second region does not come into contact with the first positioning portion on the first side, and comes into contact with the first positioning portion on the second side, with respect to the first center line, and the third region does not come into contact with the first positioning portion on both the first side and the second side, with respect to the first center line.

16. The support body according to claim 15, further comprising:

an opening portion into which a portion of the liquid ejecting head is inserted, wherein the opening portion is disposed on the second side when viewed from the first positioning portion.

17. The support body according to claim 15, wherein the first positioning portion includes a first contact portion which comes into contact with the first side of the first region with respect to the first center line, and a first inclined surface which is a surface continuous with the first contact portion and extends in a direction intersecting with the first direction without being orthogonal to the first direction.

18. The support body according to claim 15, further comprising:

a second positioning portion that positions the liquid ejecting head with respect to the support body by inserting a second positioning pin provided in the liquid ejecting head, wherein the first positioning portion and the second positioning portion are aligned in the second direction.

19. A liquid ejecting apparatus comprising:

the support body according to claim 15; and a liquid ejecting head including the first positioning pin.

20. A liquid ejecting head configured to be supported by a support body having a first positioning pin and configured to eject a liquid, comprising:

a first member having a first positioning portion that positions the liquid ejecting head with respect to the support body by inserting the first positioning pin, wherein the first member has a first surface and a second surface that is opposite from the first surface, the first positioning portion includes a first through-hole penetrating from the second surface to the first surface in a first direction, the first direction being orthogonal to the first surface and the second surface, a first recessed portion provided on the first surface, and a second recessed portion provided on the second surface, the first through-hole is disposed between the first recessed portion and the second recessed portion regarding a second direction orthogonal to the first direction, and a portion of the first recessed portion and a portion of the second recessed portion overlap each other when viewed in the second direction.

* * * * *